United States Patent
Taoka et al.

(10) Patent No.: US 9,309,431 B2
(45) Date of Patent: Apr. 12, 2016

(54) VINYL ALCOHOL POLYMER, AQUEOUS SOLUTION, COATING AGENT, INK JET RECORDING MATERIAL, THERMAL RECORDING MATERIAL AND BASE PAPER FOR RELEASE PAPER CONTAINING SAME

(75) Inventors: Yuta Taoka, Kurashiki (JP); Shinsuke Nii, Tainai (JP); Masato Nakamae, Kurashiki (JP)

(73) Assignee: KURARAY CO., LTD., Kurashiki-shi (JP)

(*) Notice: Subject to any disclaimer, the term of this patent is extended or adjusted under 35 U.S.C. 154(b) by 0 days.

(21) Appl. No.: 14/126,147

(22) PCT Filed: Jun. 12, 2012

(86) PCT No.: PCT/JP2012/065050
§ 371 (c)(1),
(2), (4) Date: Dec. 13, 2013

(87) PCT Pub. No.: WO2012/173127
PCT Pub. Date: Dec. 20, 2012

(65) Prior Publication Data
US 2014/0121099 A1 May 1, 2014

(30) Foreign Application Priority Data

| | | |
|---|---|---|
| Jun. 14, 2011 | (JP) | 2011-132498 |
| Sep. 22, 2011 | (JP) | 2011-207885 |
| Sep. 22, 2011 | (JP) | 2011-207889 |
| Sep. 22, 2011 | (JP) | 2011-207892 |
| Sep. 22, 2011 | (JP) | 2011-207894 |
| May 23, 2012 | (JP) | 2012-117840 |

(51) Int. Cl.
| | |
|---|---|
| C09D 129/02 | (2006.01) |
| C09J 7/04 | (2006.01) |
| C08F 18/04 | (2006.01) |
| C08L 43/04 | (2006.01) |
| B41M 5/52 | (2006.01) |
(Continued)

(52) U.S. Cl.
CPC ............ C09D 129/02 (2013.01); B41M 5/5254 (2013.01); C08F 218/08 (2013.01); C08F 230/08 (2013.01); C09D 129/04 (2013.01); C09D 143/04 (2013.01); C09J 7/048 (2013.01); D21H 17/36 (2013.01); D21H 19/20 (2013.01); D21H 19/60 (2013.01); D21H 27/001 (2013.01); *B41M 5/3372* (2013.01); *B41M 5/44* (2013.01); *B41M 5/443* (2013.01); *B41M 5/506* (2013.01); *B41M 5/529* (2013.01); *B41M 2205/04* (2013.01); *B41M 2205/38* (2013.01); *B41M 2205/40* (2013.01); *D21H 21/16* (2013.01); *Y10T 428/2839* (2015.01); *Y10T 428/31895* (2015.04)

(58) Field of Classification Search
CPC ... C09D 129/04; C09D 131/04; C09D 133/26
USPC .............. 524/547; 525/330.3; 526/279, 304, 526/307.5, 330
See application file for complete search history.

(56) References Cited

U.S. PATENT DOCUMENTS

| | | | |
|---|---|---|---|
| 4,617,239 A | * | 10/1986 | Maruyama et al. ........... 428/452 |
| 7,439,311 B2 | | 10/2008 | Kato et al. |
(Continued)

FOREIGN PATENT DOCUMENTS

| | | |
|---|---|---|
| CN | 1644633 A | 7/2005 |
| EP | 0 076 490 A1 | 4/1983 |
(Continued)

OTHER PUBLICATIONS

Extended European Search Report issued May 27, 2015 in Patent Application No. 12801271.3.
(Continued)

*Primary Examiner* — Vu A Nguyen
(74) *Attorney, Agent, or Firm* — Oblon, McClelland, Maier & Neustadt, L.L.P.

(57) ABSTRACT

Provided is a vinyl alcohol polymer that provides a coating film having superior water resistance and binder performances, and has sufficient solubility in water and viscosity stability even in a neutral pH region. Further provided are an aqueous solution, a coating agent, an ink jet recording material, a thermal recording material and a base paper for a release paper that comprise the vinyl alcohol polymer, and a method for producing same, and the like. The vinyl alcohol polymer includes a monomer unit represented by the following formula (1), with the following inequality (I) being satisfied. Preferably, the following inequalities (II) and (III) are further satisfied according to the PVA:

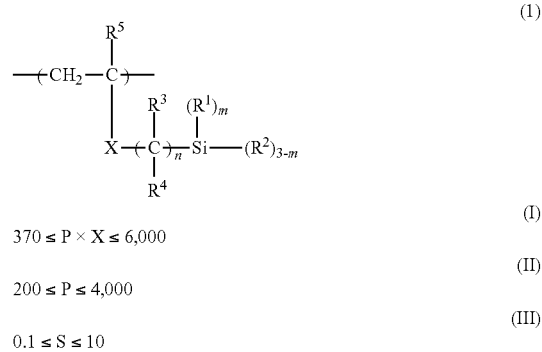

wherein, P represents the viscosity average degree of polymerization; and S represents the content (mol %) of the monomer unit.

14 Claims, No Drawings

(51) Int. Cl.

| | | |
|---|---|---|
| *C08F 230/08* | (2006.01) | |
| *C09D 129/04* | (2006.01) | |
| *D21H 27/00* | (2006.01) | |
| *D21H 17/36* | (2006.01) | |
| *D21H 19/20* | (2006.01) | |
| *D21H 19/60* | (2006.01) | |
| *C09D 143/04* | (2006.01) | |
| *C08F 218/08* | (2006.01) | |
| *B41M 5/44* | (2006.01) | |
| *B41M 5/50* | (2006.01) | |
| *D21H 21/16* | (2006.01) | |
| *B41M 5/337* | (2006.01) | |

(56) References Cited

U.S. PATENT DOCUMENTS

| | | |
|---|---|---|
| 2004/0009357 A1 | 1/2004 | Kusudou et al. |
| 2005/0148736 A1 | 7/2005 | Kato et al. |

FOREIGN PATENT DOCUMENTS

| | | |
|---|---|---|
| EP | 1 380 600 A1 | 1/2004 |
| EP | 1 553 107 A1 | 7/2005 |
| JP | 58-59203 A | 4/1983 |
| JP | 58-65096 | 4/1983 |
| JP | 58-214596 A | 12/1983 |
| JP | 59-179605 A | 10/1984 |
| JP | 59-179683 A | 10/1984 |
| JP | 2-11151 A | 1/1990 |
| JP | 2004-43644 A | 2/2004 |
| JP | 2005-194437 A | 7/2005 |
| JP | 2005-194672 A | 7/2005 |
| JP | 2005-220348 A | 8/2005 |
| JP | 2010-83141 A | 4/2010 |
| JP | 2011-51266 A | 3/2011 |
| TW | 1226891 | 1/2005 |
| TW | 201014872 | 4/2010 |

OTHER PUBLICATIONS

International Search Report issued Oct. 2, 2012, in PCT/JP2012/065050.

* cited by examiner

VINYL ALCOHOL POLYMER, AQUEOUS SOLUTION, COATING AGENT, INK JET RECORDING MATERIAL, THERMAL RECORDING MATERIAL AND BASE PAPER FOR RELEASE PAPER CONTAINING SAME

TECHNICAL FIELD

The present invention relates to a vinyl alcohol polymer having a silyl group, and an aqueous solution, a coating agent, an ink jet recording material, a thermal recording material and a base paper for a release paper containing same.

BACKGROUND ART

Vinyl alcohol polymers (hereinafter, may be abbreviated as "PVAs") typified by polyvinyl alcohol are known as water-soluble synthetic macromolecules, and are widely used in intended usages including raw materials for vinylon, which is a synthetic fiber, paper coating agents, fiber coating agents, adhesives, stabilizers for emulsion polymerization and suspension polymerization, binders for inorganic substance, and films. In particular, PVA is superior in strength characteristics and film-forming property as compared with other water-soluble synthetic macromolecules, and based on these properties, PVA is successfully utilized as coating agents for improving surface properties of substrates such as papers (clear coating agents, binders in pigment coating, coating agents (sealing agent) for a paper surface of release papers, and the like), materials for forming an ink-receiving layer in ink jet recording materials, materials for forming a coating layer such as a thermal coloring layer or an overcoat layer in thermal recording materials.

In order to further enhance the characteristics of such PVA, various types of modified PVAs have been developed. As one example of the modified PVAs, silyl group-containing PVA is exemplified. The silyl group-containing PVA has high water resistance and binder force to inorganic substances. However, the silyl group-containing PVA is accompanied by the following disadvantages that: (a) in the preparation of aqueous solutions of thereof, the silyl group-containing PVA is less likely to be sufficiently dissolved unless an alkali such as sodium hydroxide or an acid is added; (b) viscosity stability of the prepared aqueous solutions tends to be readily deteriorated; (c) in the formation of a coating film containing inorganic substances, it is difficult to obtain a coating film having the water resistance and the binder force to the inorganic substance both being satisfactory; and the like.

In addition, when an inkjet recording material is produced using such silyl group-containing PVAs in an ink-receiving layer, a disadvantage is observed that strength and water resistance of the coating film are insufficient, and unevenness (printing unevenness) is likely to be caused in printing.

Further, thermal recording materials produced using the PVA in the coating layer fail to exhibit water resistance and resistance to plasticizers sufficient to satisfy a high level of requirements for thermal recording materials in recent years.

In addition, sealability (low gas-permeability and/or superior solvent-barrier properties) and water resistance of the coating film obtained from an aqueous solution of the silyl group-containing PVA are insufficient.

In light of the foregoing, there have been proposed a silyl group-containing PVA having an improved solubility in water and the like by adjusting a product (P×S) of a viscosity average degree of polymerization (P) and a content (S: mold) of monomer units having a silyl group to fall within a predetermined range, and the like (see Japanese Unexamined Patent Application, Publication No. 2004-43644), a coating agent containing the silyl group-containing PVA, an ink jet recording material produced from the coating agent, and a thermal recording material (see Japanese Unexamined Patent Application, Publication No. 2005-194437), and a base paper for a release paper including a coating layer containing a silyl group-containing PVA that has improved barrier properties and water resistance and the like by adjusting a product (Pw× S) of a weight average degree of polymerization (Pw) and a percentage content (S: mol %) of monomer units having a silyl group to fall within a predetermined range, and the like (see Japanese Unexamined Patent Application, Publication No. 2005-194672). However, in the silyl group-containing PVAs, the upper limit of the product (P×S) has been proposed to be 370, and a trade-off relationship between enhancing the characteristics as the silyl group-containing PVA through an increase of the content of the monomer units having a silyl group and enhancing a solubility in water and the like thereof has not been overcome. More specifically, the silyl group-containing PVA has a disadvantage in handling that in a case where the product (P×S) is 370 or greater, in preparing an aqueous solution of the silyl group-containing PVA, it is occasionally impossible to dissolve the silyl group-containing PVA unless an alkali or an acid is added, as disclosed in paragraph 0009 of Japanese Unexamined Patent Application, Publication No. 2004-43644 cited above. Accordingly, the silyl group-containing PVA also has not sufficiently solved the aforementioned disadvantages.

PRIOR ART DOCUMENTS

Patent Documents

Patent Document 1: Japanese Unexamined Patent Application, Publication No. 2004-43644
Patent Document 2: Japanese Unexamined Patent Application, Publication No. 2005-194437
Patent Document 3: Japanese Unexamined Patent Application, Publication No. 2005-194672

SUMMARY OF THE INVENTION

Problems to be Solved by the Invention

The present invention was made in view of the foregoing circumstances, and an object of the present invention is to provide a vinyl alcohol polymer that provides a coating film having superior water resistance and binder performances, and has a sufficient solubility in water and viscosity stability even in a neutral pH region, and an aqueous solution containing the vinyl alcohol polymer. In addition, another object of the present invention is to provide a coating agent being capable of providing a coating film that has superior water resistance, binder force to inorganic substances, surface strength and sealability, and having sufficient handleability and viscosity stability, as well as a coated article produced by applying the coating agent, and a method for producing the same. Still another object of the present invention is to provide an ink jet recording material having superior coating film strength and water resistance and allowing for reduced occurrence of the printing unevenness, a method for producing the ink jet recording material, and a method for producing a printed article using the ink jet recording material. Yet another object of the present invention is to provide a thermal recording material having superior water resistance and resistance to plasticizers, a method for producing the thermal recording material, and a method for producing a printed article using the thermal recording material. Other object of the present invention is to provide a base paper for a release paper having superior sealability and water resistance, a method for producing the base paper for a release paper, as well as a release paper and a peelable laminate using the base paper for a release paper.

Means for Solving the Problems

According to a first aspect of the present invention made for solving the aforementioned problems, a vinyl alcohol polymer comprises a monomer unit represented by the following formula (1):

[Chemical Formula 1]

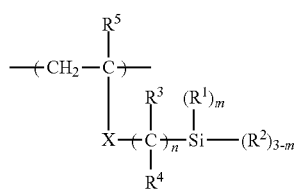

(1)

wherein in the formula (1), X represents a direct bond, a divalent hydrocarbon group, or a divalent organic group having an oxygen atom or a nitrogen atom; $R^1$ represents a hydrogen atom or an alkyl group having 1 to 5 carbon atoms; $R^2$ represents an alkoxyl group, an acyloxyl group or a group represented by OM, wherein M represents a hydrogen atom, an alkali metal or an ammonium group; $R^3$ and $R^4$ each independently represent a hydrogen atom or an alkyl group, wherein hydrogen atoms included in the alkyl group, the alkoxyl group and the acyloxyl group represented by $R^1$ to $R^4$ are unsubstituted or substituted with a substituent having an oxygen atom or a nitrogen atom; $R^5$ represents a hydrogen atom or a methyl group; m is an integer of 0 to 2; and n is an integer of 3 or greater, wherein in a case where $R^1$ to $R^5$ are each present in a plurality of number, a plurality of $R^1$s to $R^5$s are each independently as defined above, and wherein the following inequality (I) is satisfied:

$$370 \leq P \times S \leq 6,000 \quad \text{(I)}$$

wherein, P represents the viscosity average degree of polymerization of the vinyl alcohol polymer; and S represents the percentage content (mol %) of the monomer unit.

The PVA according to the aspect of the present invention comprises a monomer unit having a group represented by the above formula (1), and more specifically a structure in which a silyl group is bound to the main chain via an alkylene group having 3 or more carbon atoms. Therefore, according to the PVA, even when the degree of modification with the silyl group is increased, deterioration of the solubility in water and the viscosity stability can be inhibited. In addition, according to the PVA, since the product (P×S) of the viscosity average degree of polymerization (P) and the percentage content (S) of the monomer unit falls within the above range, the degree of modification with silyl group can be increased, whereby a coating film having superior water resistance and binder performances can be obtained.

It is preferred that the following inequalities (II) and (III) are further satisfied:

$$200 \leq P \leq 4,000 \quad \text{(II)}$$

$$0.1 \leq S \leq 10 \quad \text{(III)}$$

wherein, P represents the viscosity average degree of polymerization; and S represents the percentage content (mol %) of the monomer unit, and that n in the above formula (1) is an integer of 6 or greater and 20 or less.

When the viscosity average degree of polymerization (P) and the percentage content (S) of the monomer unit thus fall within the above range, the solubility in water and the viscosity stability of the PVA as well as the water resistance and the binder performances of the resultant coating film can be improved. When n falls within the above range, the content of a crosslinking agent used in combination with the vinyl alcohol polymer can be reduced, and also in a case where the crosslinking agent is not used, the water resistance and the binder performances of the resultant coating film can be sufficiently exhibited.

It is preferred that X in the above formula (1) is represented by —CO—NR$^6$—*, wherein, R$^6$ represents a hydrogen atom or an alkyl group having 1 to 5 carbon atoms; and * denotes a binding site on a side where a Si atom is included shown in the above formula (1), and n is an integer of 12 or less. When the monomer unit thus has an amide structure at a position away from the silyl group, the solubility in water and the viscosity stability can be more improved while maintaining the performances resulting from the silyl group. When the monomer unit has such a structure, the performances of the PVA such as the solubility in water and the viscosity stability can be further improved, and the production of the PVA can be easily carried out.

The aqueous solution according to another aspect of the present invention comprises the vinyl alcohol polymer in an amount of 4% by mass or more and 20%, by mass or less, and has a pH of 4 or higher and 8 or lower. The aqueous solution contains a high concentration of the modified PVA, and can provide a coating film having superior water resistance and binder performances. In addition, the aqueous solution has superior viscosity stability and a pH falling within the above range, leading to superior handleability.

In addition, a coating agent comprising the PVA is also encompassed within the scope of the present invention. The PVA comprised in the coating agent includes a monomer unit having a group represented by the above formula (1), and more specifically a structure in which a silyl group is bound to the main chain via an alkylene group having 3 or more carbon atoms. Accordingly, in the coating agent, the degree of modification with the silyl group can be increased, and therefore a coating film having superior water resistance, binder force, surface strength and sealability, and the like can be provided, as described above.

In addition, the coated article according to another aspect of the present invention is produced by applying the coating agent on the surface of a substrate. The coated article comprises a coating film that exhibits superior water resistance, binder force to inorganic substances, surface strength and sealability.

Further, a method for producing the coated article according to an aspect of the present invention comprises applying the coating agent on the surface of a substrate. The method for production enables the coated article to be easily provided.

Furthermore, an ink jet recording material comprising the vinyl alcohol polymer is also encompassed within the scope of the present invention. The PVA comprised in the ink jet recording material includes a monomer unit having a group represented by the above formula (1), and more specifically a structure in which a silyl group is bound to the main chain via an alkylene group having 3 or more carbon atoms. Accordingly, for example, in producing an ink-receiving layer of the ink jet recording material using a coating agent for an ink jet recording material comprising the PVA, even when the degree of modification with the silyl group of the PVA comprised in the coating agent for an ink jet recording material is increased, handleability of the coating agent for an ink jet recording material is favorable, and deterioration of the viscosity stability is also inhibited, since the PVA has a high solubility in water in a neutral pH region. Therefore, according to the ink jet recording material, the degree of modification with the silyl group of the PVA comprised can be increased, and improvement of strength and water resistance of the coating film and reduction of the generation of printing unevenness can be achieved.

The ink jet recording material preferably comprises a substrate and an ink-receiving layer provided on the surface of the substrate, and the ink-receiving layer is preferably formed by applying a coating agent for an ink jet recording material comprising the PVA. According to such a configuration, the ink-receiving layer of the ink jet recording material can be produced from the PVA and the like, whereby the coating film strength and the water resistance can be more effectively improved, and the printing unevenness can be reduced.

The present method for producing the ink jet recording material comprises applying on a substrate a coating agent for an ink jet recording material comprising the PVA. According to the method for production, the ink jet recording material can be easily provided.

Furthermore, the present invention encompasses a method for producing a printed article comprising subjecting the ink jet recording material to ink jet printing. According to the method for production, due to using the aforementioned ink jet recording material, superior coating film strength and high-speed printing can be achieved, and in addition, printed articles accompanied by reduced generation of printing unevenness and having superior water resistance can be obtained.

Furthermore, a thermal recording material comprising the vinyl alcohol polymer is also encompassed within the scope of the present invention. The PVA comprised in the thermal recording material has a monomer unit having a group represented by the above formula (1), and more specifically a structure in which a silyl group is bound to the main chain via an alkylene group having 3 or more carbon atoms. Accordingly, for example, in producing a coating layer (a thermal coloring layer, an overcoat layer, and the like) of the thermal recording material using a coating agent for a thermal recording material comprising the PVA, even when the degree of modification with the silyl group of the PVA comprised in the coating agent for a thermal recording material is increased, handleability of the coating agent for a thermal recording material is favorable, and deterioration of the viscosity stability is also inhibited, since the PVA has a high solubility in water in a neutral pH region. Therefore, according to the thermal recording material, the degree of modification with the silyl group of the PVA comprised can be increased, and the water resistance, the resistance to plasticizers, and the like can be improved.

It is preferred that the thermal recording material comprises a substrate, a thermal coloring layer provided on the surface of the substrate, and an overcoat layer provided on the surface of the thermal coloring layer, and at least one of the thermal coloring layer and the overcoat layer are formed by applying a coating agent for a thermal recording material comprising the PVA. According to such a configuration, the layers of the thermal recording material can be produced from the PVA and the like, the water resistance and the resistance to plasticizers can be more effectively improved.

The present method for producing the thermal recording material comprises applying a coating agent for a thermal recording material comprising the PVA on a substrate. According to the method for production, the thermal recording material can be easily provided.

Furthermore, the present invention encompasses a method for producing a printed article, the method comprising subjecting the thermal recording material to printing. According to the method for production, since the thermal recording material is used, a printed article having superior water resistance and resistance to plasticizers can be obtained.

In addition, a base paper for a release paper comprising the vinyl alcohol polymer is also encompassed within the scope of the present invention. The PVA comprised in the base paper for a release paper includes a monomer unit having a group represented by the above formula (1), and more specifically a structure in which a silyl group is bound to the main chain via an alkylene group having 3 or more carbon atoms. Accordingly, for example, in producing a coating layer of the base paper for a release paper using a coating agent for a base paper for a release paper comprising the PVA, even when the degree of modification with the silyl group of the PVA comprised in the coating agent is increased, handleability of the coating agent for a base paper for a release paper is favorable, and deterioration of the viscosity stability is also inhibited, since the PVA has a high solubility in water in a neutral pH region. Therefore, according to the thermal recording material, the degree of modification with the silyl group of the PVA comprised can be increased, whereby the sealability and the water resistance can be improved.

It is preferred that the base paper for a release paper comprises a paper substrate, and a coating layer provided on the surface of the paper substrate, and the coating layer is provided by applying a coating agent for a base paper for a release paper comprising the PVA. According to such a configuration, the coating layer of the base paper for a release paper can be produced from the PVA and the like, and the sealability and the water resistance can be more effectively improved.

The present method for producing the base paper for a release paper comprises applying a coating agent for a base paper for a release paper comprising the PVA on a paper substrate. According to the method for production, the base paper for a release paper can be easily provided.

Furthermore, the present invention encompasses a release paper comprising the base paper for a release paper, and a release layer provided on the surface of the base paper for a release paper. In the release paper, the release layer is provided on the surface of the base paper for a release paper, and therefore penetration of a varnish used in the formation of the release layer into the paper is effectively prevented, whereby peeling performances of the release paper are improved.

Furthermore, the present invention encompasses a laminate comprising the base paper for a release paper, a release layer provided on the surface of the base paper for a release paper, and a tacky layer provided on the surface of the release layer. The laminate has superior peelability between the release layer and the tacky layer.

Effects of the Invention

As explained in the foregoing, the vinyl alcohol polymer according to the present invention provides a coating film having superior water resistance and binder performances, and has sufficient solubility in water and viscosity stability even in a neutral pH region. In addition, the aqueous solution according to the present invention has high viscosity stability, and can provide a coating film having superior water resistance and binder performances. In addition, the coating agent according to the present invention exhibits sufficient handleability and viscosity stability, and can provide a coating film having high water resistance, binder force to inorganic substances, surface strength and sealability; the ink jet recording material according to the present invention comprises a coating film having high strength and water resistance, and allows for reduced generation of printing unevenness; the thermal recording material according to the present invention can exhibit high water resistance and resistance to plasticizers due to containing the aforementioned specific PVA; and the base paper for a release paper according to the present invention exhibits high sealability and water resistance due to containing the specific PVA.

DESCRIPTION OF EMBODIMENTS

Hereinafter, the vinyl alcohol polymer, and the aqueous solution, the coating agent, the ink jet recording material, the thermal recording material and the base paper for a release paper containing same according to embodiments of the present invention will be explained in more detail.

PVA

The PVA according to an embodiment of the present invention comprises a monomer unit having a group represented by the above formula (1). More specifically, the PVA is a copolymer comprising a monomer unit having a group represented by the above formula (1) and a vinyl alcohol unit (—CH$_2$—CHOH—), and may further comprise other monomer units.

In the above formula (1), $R^1$ represents a hydrogen atom or an alkyl group having 1 to 5 carbon atoms. Examples of the alkyl group include a methyl group, an ethyl group, a propyl group, and the like.

$R^2$ represents an alkoxyl group, an acyloxyl group or a group represented by OM. M represents a hydrogen atom, an alkali metal or an ammonium group ($^+$NH$_4$). Examples of the alkoxyl group include a methoxy group, an ethoxy group, and the like. Examples of the acyloxyl group include an acetoxy group, a propionyloxy group, and the like. Examples of the alkali metal include sodium, potassium, and the like. Among these groups which may be represented by $R^2$, an alkoxyl group and a group represented by OM are preferred; an alkoxyl group having 1 to 5 carbon atoms and a group represented by OM in which M represents a hydrogen atom or an alkali metal atom are more preferred; and a methoxy group, an ethoxy group and a group represented by OM in which M represents sodium or potassium are still more preferred.

$R^3$ and $R^4$ each independently represent a hydrogen atom or an alkyl group. The alkyl group is exemplified by the aforementioned alkyl group having 1 to 5 carbon atoms. $R^3$ and $R^4$ are preferably a hydrogen atom or a methyl group. $R^5$ represents a hydrogen atom or a methyl group.

Hydrogen atoms included in the alkyl group, the alkoxyl group and the acyloxyl group represented by $R^1$ to $R^4$ are unsubstituted or substituted with a substituent having an oxygen atom or a nitrogen atom. Examples of the substituent having an oxygen atom include an alkoxyl group, an acyloxyl group, and the like. In addition, examples of the substituent having a nitrogen atom include an amino group, a cyano group, and the like.

It is to be noted that in a case where $R^1$ to $R^5$ are each present in a plurality of number, a plurality of $R^1$s to $R^5$s are each independently as defined above.

m is an integer of 0 to 2, and preferably 0. When m is 0, in other words, the monomer unit has three $R^2$ groups, the effects exerted by the modification can be more enhanced.

n is an integer of 3 or greater. Although the upper limit of n is not particularly limited, the upper limit of n is 20 for example, and preferably 12. When n in the above formula (1) is 3 or greater, and more specifically the PVA comprises a structure in which a silyl group is bound to the main chain via an alkylene group having 3 or more carbon atoms, deterioration of solubility in water and viscosity stability of the PVA can be inhibited even when the degree of modification with the silyl group is increased. Although the reasons for the exertion of such effects are not sufficiently clarified, it is presumed, for example, that the alkylene group having 3 or more carbon atoms that exhibits hydrophobicity reduces the rate of hydrolysis of Si—$R^2$ in an aqueous solution, whereby the reaction is inhibited.

Furthermore, n is more preferably an integer of 6 or greater. When n falls within such a range, the content of a crosslinking agent typically used in combination with the vinyl alcohol polymer can be reduced, and also in a case where the crosslinking agent is not used, water resistance and binder performances of the resultant coating film can be sufficiently exhibited.

X represents a direct bond, a divalent hydrocarbon group, or a divalent organic group having an oxygen atom or a nitrogen atom. When the monomer unit has a structure represented by the above formula (1), various performances such as the solubility in water and the viscosity stability of the PVA, as well as the water resistance and the binder performances of the resultant coating film can be more improved.

Examples of the divalent hydrocarbon group include a divalent aliphatic hydrocarbon group having 1 to 10 carbon atoms, a divalent aromatic hydrocarbon group having 6 to 10 carbon atoms, and the like. Examples of the aliphatic hydrocarbon group having 1 to 10 carbon atoms include a methylene group, an ethylene group, a propylene group, and the like. Examples of the divalent aromatic hydrocarbon group having 6 to 10 carbon atoms include a phenylene group, and the like. Examples of the divalent organic group having an oxygen atom include an ether group, an ester group, a carbonyl group, an amide group, a group derived by linking these groups with a divalent hydrocarbon group, and the like. Examples of the divalent organic group having a nitrogen atom include an imino group, an amide group, a group derived by linking these groups with a divalent hydrocarbon group, and the like.

Among the groups represented by X, a divalent organic group having an oxygen atom or a nitrogen atom is preferred, a group having an amide group is more preferred, and a group represented by —CO—NR$^6$—*, wherein, $R^6$ represents a hydrogen atom or an alkyl group having 1 to 5 carbon atoms; and * denotes a binding site on a side where a Si atom is included shown in the above formula (1) is still more preferred. When the monomer unit thus has a polar structure, preferably an amide structure, at a position away from the silyl group, the solubility in water, the viscosity stability and the like can be more improved while maintaining the performances resulting from the silyl group. It is to be noted that $R^6$ preferably represents a hydrogen atom in light of more enhancing the aforementioned functions, and allowing the PVA to be easily produced; and it is more preferred that $R^6$ represents a hydrogen atom and n is an integer of 3 to 12.

The monomer unit is still more preferably represented by the following formula (2).

[Chemical Formula 2]

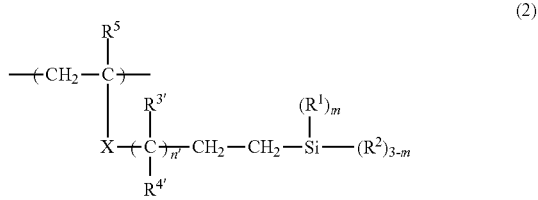

In the above formula (2), $R^1$, $R^2$, $R^5$, X and m are as defined in the above formula (1). In addition, preferred groups or numerical ranges thereof are also identical to those of the above formula (1).

In the above formula (2), $R^{3'}$ and $R^{4'}$ each independently represent a hydrogen atom or an alkyl group. The alkyl group is exemplified by the aforementioned alkyl group having 1 to 5 carbon atoms. $R^{3'}$ and $R^{4'}$ preferably represent a hydrogen atom or a methyl group, and more preferably a hydrogen atom. Hydrogen atoms included in the alkyl group represented by $R^{3'}$ and $R^{4'}$ are unsubstituted or substituted with a substituent having an oxygen atom or a nitrogen atom. Examples of the substituent having an oxygen atom include an alkoxyl group, an acyloxy group, and the like. In addition, examples of the substituent having a nitrogen atom include an amino group, a cyano group, and the like. It is to be noted that in a case where $R^{3'}$ and $R^{4'}$ are each present in a plurality of number, a plurality of $R^{3'}$'s and $R^{4'}$'s are each independently as defined above.

In the above formula (2), n' is an integer of 1 or greater. Although the upper limit of n' is not particularly limited, the upper limit of n' is 18 for example, and preferably 10. Furthermore, n' is more preferably an integer of 4 or greater. When n' falls within such a range, the content of a crosslinking agent typically used in combination with the vinyl alcohol polymer can be reduced, and also in a case where the crosslinking agent is not used, the water resistance and the binder performances of the resultant coating film can be sufficiently exhibited.

When the monomer unit is represented by the above formula (2), various functions of the PVA can be exhibited more effectively. Although the reasons for this effect are also unclear, it is presumed that the aforementioned functions of reducing the rate of hydrolysis of Si—$R^2$ in the aqueous solution and inhibiting the reaction are exerted more effectively.

According to the PVA, the following inequality (I) is satisfied:

$$370 \leq P \times S \leq 6,000 \quad \text{(I)}$$

wherein, P represents the viscosity average degree of polymerization; and S represents the percentage content (mol %) of the monomer unit.

The viscosity average degree of polymerization (P) is determined in accordance with JIS-K6726. More specifically, in the case of the PVA having a degree of saponification of lower than 99.5 mol %, the PVA is resaponified such that the degree of saponification thereof is 99.5 mol % or higher, and purified. Thereafter, the viscosity average degree of polymerization (P) can be determined according to the following formula based on a limiting viscosity [η] (unit: deciliter/g) as determined in water at 30° C.

$$P = ([\eta] \times 1000/8.29)^{(1/0.62)}$$

The percentage content (S: mol %) of the monomer unit is determined based on proton NMR of the vinyl ester polymer before the saponification. In measuring proton NMR of the vinyl ester polymer before the saponification, the vinyl ester polymer is purified by reprecipitation with hexane-acetone to sufficiently remove the unreacted monomer having a silyl group from the polymer, dried under reduced pressure at 90° C. for 2 days, then dissolved in a $CDCl_3$ solvent, and thereafter analyzed.

The product (P×S) of the viscosity average degree of polymerization (P) and the percentage content (S) of the monomer unit corresponds to the number (average) of the monomer units with respect to 100 molecules. When the product (P×S) is less than the lower limit, various characteristics resulting from the silyl group such as the water resistance and the binder performances of the coating film produced from the PVA cannot be sufficiently exhibited. To the contrary, when the product (P×S) exceeds the upper limit, the solubility in water and the viscosity stability of the PVA may be deteriorated. The product (P×S) preferably satisfies the following inequality (I'), more preferably the following inequality (I").

$$400 \leq P \times S \leq 3,000 \quad \text{(I')}$$

$$500 \leq P \times S \leq 2,000 \quad \text{(I")}$$

It is preferred that the following inequalities (II) and (III) are further satisfied according to the PVA:

$$200 \leq P \leq 4,000 \quad \text{(II)}$$

$$0.1 \leq S \leq 10 \quad \text{(III)}$$

wherein, P represents the viscosity average degree of polymerization; and S represents the percentage content (mol %) of the monomer unit.

When the viscosity average degree of polymerization (P) and the percentage content (S) of the monomer unit each thus fall within the above range, the solubility in water and the viscosity stability of the PVA, as well as the water resistance and binder performances of the resultant coating film can be increased.

Furthermore, the viscosity average degree of polymerization (P) preferably satisfies the following inequality (II'), and more preferably the following inequality (II").

$$500 \leq P \leq 3,000 \quad \text{(II')}$$

$$1,000 \leq P \leq 2,400 \quad \text{(II")}$$

When the viscosity average degree of polymerization (P) is less than the lower limit, the water resistance and the binder performances of the resultant coating film and the like may be deteriorated. To the contrary, when the viscosity average degree of polymerization (P) exceeds the upper limit, the solubility in water, the viscosity stability and the like may be deteriorated.

In addition, the percentage content (S) of the monomer unit more preferably satisfies the following inequality (III'), and still more preferably the following inequality (III").

$$0.25 \leq S \leq 6 \quad \text{(III')}$$

$$0.5 \leq S \leq 5 \quad \text{(III")}$$

When the percentage content (S) of the monomer unit is less than the lower limit, the water resistance and the binder performances of the resultant coating film may be deteriorated. To the contrary, when the viscosity average degree of polymerization (P) exceeds the upper limit, the solubility in water, the viscosity stability and the like may be deteriorated.

Although the degree of saponification of the PVA is not particularly limited, the degree of saponification of the PVA is preferably 80 mol % or higher, more preferably 90 mol % or higher, still more preferably 95 mol % or higher, and particularly preferably 97 mol % or higher. When the degree of saponification of the PVA is less than the lower limit, the water resistance and the like of the resultant coating film may be deteriorated. It is to be noted that, although the upper limit of the degree of saponification of the PVA is not particularly limited, the upper limit is, for example, 99.9 mol % in light of productivity of the PVA and the like. The degree of saponification of the PVA as referred to herein means a value determined in accordance with the method specified in JIS-K6726.

Method for Producing PVA

Although the method for producing the PVA is not particularly limited, for example, the PVA can be produced by copolymerizing a vinyl ester monomer with a monomer that gives a unit represented by the above formula (1), and saponifying the resultant copolymer (vinyl ester polymer).

The vinyl ester monomer is exemplified by vinyl formate, vinyl acetate, vinyl propionate, vinyl valerate, vinyl caprate, vinyl laurate, vinyl stearate, vinyl benzoate, vinyl pivalate, vinyl versatate, and the like, and among these, vinyl acetate is preferred.

In addition, upon the copolymerization of the monomer that gives a unit represented by the above formula (1) with the vinyl ester monomer, for the purpose of regulating the viscosity average degree of polymerization (P) of the resultant PVA, and the like, the polymerization may be carried out in the presence of a chain transfer agent within a range not leading to impairment of the gist of the present invention. Examples of the chain transfer agent includes: aldehydes such as acetaldehyde and propionaldehyde; ketones such as acetone and methyl ethyl ketone; mercaptans such as 3-mercaptopropyltrimethoxysilane, 3-mercaptopropyltriethoxysilane, 2-hydroxyethanethiol, n-dodecanethiol, mercaptoacetic acid and 3-mercaptopropionic acid; halogens such as tetrachloromethane, bromotrichloromethane, trichloroethylene and perchloroethylene; and the like.

The monomer that gives the unit represented by the above formula (1) is exemplified by a compound represented by the following formula (3). When the compound represented by the following formula (3) is used, PVA comprising the monomer unit having the group represented by the above formula (2) can be eventually obtained easily.

[Chemical Formula 3]

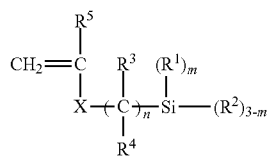

(3)

In the above formula (3), $R^1$ to $R^5$, X, m and n are as defined in the above formula (1). In addition, preferred groups or numerical ranges thereof are also identical to those of the above formula (1).

Examples of the compound represented by the above formula (3) include 3-(meth)acrylamidopropyltrimethoxysilane, 4-(meth)acrylamidobutyltrimethoxysilane, 8-(meth)acrylamidooctyltrimethoxysilane, 6-(meth)acrylamidohexyltrimethoxysilane, 12-(meth)acrylamidododecyltrimethoxysilane, 18-(meth)acrylamidooctadecyltrimethoxysilane, 3-(meth)acrylamidopropyltriethoxysilane, 3-(meth)acrylamidopropyltributoxysilane, 3-(meth)acrylamidopropylmethyldimethoxysilane, 3-(meth)acrylamidopropyldimethylmethoxysilane, 3-(meth)acrylamido-3-methylbutyltrimethoxysilane, 4-(meth)acrylamido-4-methylbutyltrimethoxysilane, 4-(meth)acrylamido-3-methylbutyltrimethoxysilane, 5-(meth)acrylamido-5-methylhexyltrimethoxysilane, 4-pentenyltrimethoxysilane, 5-hexenyltrimethoxysilane, and the like.

The method for copolymerizing the vinyl ester monomer with the monomer that gives a unit represented by the above formula (1) is exemplified by a well-known process such as a bulk polymerization process, a solution polymerization process, a suspension polymerization process and an emulsion polymerization process. In particular, when a polymerization temperature below 30° C. is desired, the emulsion polymerization process is preferred, whereas when a polymerization temperature of 30° C. or higher is desired, the bulk polymerization process in which the polymerization is carried out in the absence of a solvent or the solution polymerization process in which the polymerization is carried out using a solvent such as an alcohol is typically employed.

In the case of the emulsion polymerization process, the solvent is exemplified by water, and a lower alcohol such as methanol and ethanol may be used in combination therewith. In addition, well-known emulsifying agents can be used as the emulsifying agent. As an initiator in the copolymerization, a redox type initiator provided by a combination of an iron ion, an oxidizing agent and a reducing agent is preferably used for the purpose of controlling the polymerization. In the case of the bulk polymerization process and the solution polymerization process, the copolymerization reaction can be carried out in either a batchwise system or a continuous system. When the solution polymerization process is employed for carrying out the copolymerization reaction, the alcohol used as the solvent is exemplified by a lower alcohol such as methanol, ethanol and propanol. The initiator used in this copolymerization reaction is exemplified by well-known initiators which may include azo initiators such as 2,2'-azobisisobutyronitrile, 2,2'-azobis(2,4-dimethylvaleronitrile), 1,1'-azobis(cyclohexane-1-carbonitrile) and 2,2'-azobis(N-butyl-2-methylpropionamide); peroxide initiators such as benzoyl peroxide and n-propyl peroxycarbonate. Although the temperature at which the copolymerization is carried out is not particularly limited, a range of 5° C. to 50° C. is suitable.

In the copolymerization reaction, a copolymerizable monomer can be copolymerized, as needed, within a range not leading to impairment of the gist of the present invention. Examples of the monomer include: α-olefins such as ethylene, propylene, 1-butene, isobutene and 1-hexene; carboxylic acids such as fumaric acid, maleic acid, itaconic acid, maleic anhydride and itaconic anhydride, or derivatives thereof; (meth)acrylic acid or salts or esters thereof; acrylamide derivatives such as acrylamide, N-methylacrylamide and N-ethylacrylamide; methacrylamide derivative such as methacrylamide, N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxy group-containing vinyl ethers such as ethylene glycol vinyl ether, 1,3-propanediol vinyl ether and 1,4-butanediol vinyl ether; allyl acetate; allyl ethers such as propyl allyl ether, butyl allyl ether and hexyl allyl ether; monomers having an oxyalkylene group; isopropenyl acetate; hydroxy group-containing α-olefins such as 3-buten-1-ol, 4-penten-1-ol, 5-hexen-1-ol, 7-octen-1-ol, 9-decen-1-ol and 3-methyl-3-buten-1-ol; monomers having a sulfonic acid group such as ethylenesulfonic acid, allylsulfonic acid, methallylsulfonic acid and 2-acrylamido-2-methylpropanesulfonic acid; monomers having a cationic group such as vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride and dimethylallylamine and allylethylamine; and the like. The amount of these monomers used may vary depending on their purposes of use and intended usages and the like, and is typically 20 mol % or less, and preferably 10 mol % or less with respect to all the monomers used in the copolymerization.

The vinyl ester polymer produced by the copolymerization is then saponified in a solvent according to a well-known method, and derived to PVA.

An alkaline substance is typically used as a catalyst for the saponification reaction, and examples thereof include alkali metal hydroxides such as potassium hydroxide and sodium hydroxide, and alkali metal alkoxides such as sodium methoxide, and the like. The amount of the alkaline substance used, in terms of molar ratio with respect to the vinyl ester monomer unit in the vinyl ester polymer, falls preferably within a range of 0.004 to 0.5, and more preferably within a range of 0.005 to 0.05. In addition, the total amount of the catalyst may be added in the initial stage of the saponification reaction, or a portion of the catalyst may be added in the initial stage of the saponification reaction, followed by the addition of the rest of the catalyst during the saponification reaction.

The solvent that may be used in the saponification reaction is exemplified by methanol, methyl acetate, dimethyl sulfoxide, dimethylformamide, and the like. Among these solvents, methanol is preferred. In addition, when methanol is used, a moisture content of methanol is preferably adjusted to 0.001 to 1% by mass, more preferably 0.003 to 0.9% by mass, and particularly preferably 0.005 to 0.8% by mass.

The saponification reaction is preferably carried out at a temperature of 5 to 80° C., and more preferably at a temperature of 20 to 70° C. The period of time required for the saponification reaction is preferably 5 min to 10 hours, and more preferably 10 min to 5 hours. The saponification reaction can be carried out in either a batchwise system or a continuous system. After completion of the saponification reaction, the remaining saponification catalyst may be neutralized, as needed, and examples of a neutralizing agent that can be used include organic acids such as acetic acid and lactic acid, and ester compounds such as methyl acetate, and the like.

The PVA produced by the saponification reaction may be washed, as needed. Examples of a washing liquid used in the washing include lower alcohols such as methanol, lower fatty acid esters such as methyl acetate, mixtures thereof, and the like. A small amount of water, an alkali, an acid, or the like may be added to the washing liquid.

Intended Usages etc.

The PVA can be stored and transported in a powdery state. In addition, the PVA may be used directly in the powdery state, or in a state of being dissolved or dispersed in a liquid such as water. When the PVA is used as an aqueous solution, a homogeneous aqueous solution can be prepared by dispersing the PVA in water, followed by heating the dispersion with stirring. It is to be noted that according to the PVA, the homogeneous aqueous solution can be prepared without particularly adding an alkali such as sodium hydroxide or an acid to water.

The PVA exhibits the following characteristic features that: (1) in the preparation of the aqueous solution, the PVA can be dissolved in water without adding an alkali such as sodium hydroxide or an acid; (2) the PVA exhibits superior viscosity stability in a state of an aqueous solution; (3) when being blended with an inorganic substance and formed into a coating film, the PVA exhibits superior binder force to the inorganic substance; (4) a coating film formed exhibits superior water resistance; and the like. Therefore, the PVA may be used, for example, as a coating agent for papers. As other usages, the PVA may be used in various intended usages utilizing the function of the functional groups such as the hydroxyl group, the vinyl ester group and the silyl group. Examples of the intended usages include: internal sizing agents for papers, fiber coating agents, dyes, coating agents for glass fibers, surface coating agents for metals and glass, and coating materials such as anti-fogging agents; adhesives for woods, papers, aluminum foils, plastics and the like; binders for nonwoven fabrics, fibrous binders, binders for building materials such as gypsum boards and fiberboards; thickening agents for various types of emulsion adhesives; additives for urea resin adhesives; additives for cement and mortar; various types of adhesives such as hot melt adhesives and pressure-sensitive adhesives; dispersants for emulsion polymerization of various types of ethylenic unsaturated monomers such as ethylene, vinyl acetate and vinyl chloride; stabilizers for dispersing a pigment in paints, adhesives and the like; dispersion stabilizers for suspension polymerization of various types of ethylenic unsaturated monomers such as vinyl chloride, vinylidene chloride, styrene, (meth)acrylic acid esters and vinyl acetate; molded articles such as fibers, films, sheets, pipes, tubes, water-soluble fibers and temporary coating films; agents for imparting hydrophilicity to hydrophobic resins; compounding agents for synthetic resins such as additives for composite fibers, films and other molded articles; soil conditioners, soil stabilizers, and the like.

In addition, vinyl acetal polymers obtained by acetalizing the PVA with an aldehyde compound such as acetaldehyde and butyraldehyde are useful for intended usages such as safety glass interlayers, binders for ceramics, ink dispersants and photosensitive materials.

Aqueous Solution

The aqueous solution according to an embodiment of the present invention comprises the PVA according to the embodiment of the present invention in an amount of 4% by mass or more and 20% by mass or less, and has a pH of 4 or higher and 8 or lower. The preparation method of the aqueous solution is as described above in regard to the intended usages of the PVA.

The aqueous solution may contain other components in addition to the PVA and water. Examples of the other components include: alcohols such as ethanol; other solvents such as diethyl ether; alkalis such as sodium hydroxide and ammonia; acids such as hydrochloric acid; inorganic particles such as silica, titanium dioxide, clay and calcium carbonate, and the like.

The aqueous solution contains a high concentration of the modified PVA, and can provide a coating film having superior water resistance and binder performances. In addition, the aqueous solution also has superior viscosity stability. Furthermore, the aqueous solution has superior handleability, since its pH falls within the above range. Therefore, the aqueous solution may be preferably used in the respective intended usages described above as the intended usages of the PVA.

Coating Agent

The coating agent according to an embodiment of the present invention comprises the PVA.

In the above formula (1), preferred structures and numerical ranges thereof as well as the method for production of the PVA are as described above.

When the monomer unit has the aforementioned structure, various performances such as the solubility in water and the viscosity stability of the PVA, as well as the water resistance and the binder performances of the resultant coating film can be more improved.

The monomer unit is more preferably a unit represented by the above formula (2).

When the monomer unit is represented by the above formula (2), various functions of the coating agent can be exhibited more effectively. Although the reasons for this effect are also unclear, it is presumed that the aforementioned functions of reducing the rate of hydrolysis of Si—$R^2$ in the aqueous solution and inhibiting the reaction are exerted more effectively.

According to the PVA, the above inequality (I) is satisfied, preferably the above inequality (I') is satisfied, and more preferably the above inequality (I'') is satisfied.

The product (P×S) of the viscosity average degree of polymerization (P) and the percentage content (S) of the monomer unit corresponds to the number (average) of the monomer units with respect to 100 molecules. When the product (P×S) is less than the lower limit, various characteristics resulting from the silyl group such as the water resistance and the binder performances of the coating film produced from the coating agent cannot be sufficiently exhibited. To the contrary, when the product (P×S) exceeds the upper limit, the solubility in water and the viscosity stability may be deteriorated.

It is preferred that the above inequalities (II) and (III) are further satisfied according to the PVA.

When the viscosity average degree of polymerization (P) and the percentage content (S) of the monomer unit each thus fall within the above range, the solubility in water and the viscosity stability of the PVA, as well as the water resistance, the binder performances, the surface strength, the sealability and the like of the resultant coating film can be improved.

Furthermore, the viscosity average degree of polymerization (P) more preferably satisfies the above inequality (II'), and still more preferably the above inequality (II'').

When the viscosity average degree of polymerization (P) is less than the lower limit, the water resistance and the binder performances and the like of the resultant coating film may be deteriorated. To the contrary, when the viscosity average degree of polymerization (P) exceeds the upper limit, the solubility in water, the viscosity stability and the like may be deteriorated.

In addition, the percentage content of the monomer unit more preferably satisfies the above inequality (III'), and still more preferably the above inequality (III'').

When the percentage content (S) of the monomer unit is less than the lower limit, the water resistance and the binder performances and the like of the resultant coating film may be deteriorated. To the contrary, when the viscosity average degree of polymerization (P) exceeds the upper limit, the solubility in water, the viscosity stability and the like may be deteriorated.

Although the degree of saponification of the PVA is not particularly limited, the degree of saponification of the PVA is preferably 80 mol % or higher, more preferably 90 mol % or higher, and still more preferably 95 mol % or higher, and particularly preferably 97 mol % or higher. When the degree of saponification of the PVA is less than the lower limit, the water resistance and the like of the resultant coating film may be deteriorated. It is to be noted that, although the upper limit of the degree of saponification of the PVA is not particularly limited, the upper limit is, for example, 99.9 mol % in light of the productivity of the PVA and the like. The degree of saponification of the PVA as referred to herein means a value determined in accordance with the method specified in JIS-K6726.

Although the proportion of the PVA contained in the coating agent is not particularly limited, the proportion of the PVA is preferably 4% by mass or higher and 20% by mass or lower. Since such a comparatively high concentration can be attained in the coating agent, strength and water resistance and the like of the resultant coating film can be effectively improved.

The coating agent is typically an aqueous solution of the PVA. However, the coating agent may be a solution prepared using other solvent. The coating agent may additionally contain:

other solvent such as an alcohol such as ethanol, and ether such as diethyl ether;

an alkali such as sodium hydroxide and ammonia;

an acid such as hydrochloric acid and acetic acid;

a water-soluble resin such as albumin, gelatin, casein, starch, cationized starch, gum arabic, a polyamide resin, a melamine resin, poly(meth)acrylamide, polyvinylpyrrolidone, sodium poly(meth)acrylate, anion-modified PVA, sodium alginate and a water-soluble polyester, as well as a cellulose derivative such as methylcellulose, hydroxyethylcellulose, and carboxymethylcellulose (CMC);

a water dispersible resin such as SBR, NBR, a vinyl acetate-based resin such as an ethylene-vinyl acetate copolymer, a (meth)acrylic acid ester-based resin and a vinyl chloride-based resin;

inorganic particles such as kaolin, clay, talc, calcium carbonate particles, calcined clay, titanium oxide particles, diatomaceous earth, precipitated silica, gelled silica, colloidal silica, aluminum oxide particles and aluminum hydroxide particles; and a crosslinking agent such as an aldehyde compound such as glyoxal and glutaraldehyde, a zirconium compound such as ammonium zirconium carbonate, a titanium compound such as titanium lactate, an epoxy compound such as polyamidoamine-epichlorohydrin, and polyoxazoline; and the like.

Although the pH of the coating agent is not particularly limited, the pH is preferably 4 or higher and 8 or lower. In the coating agent, a homogeneous aqueous solution can be prepared without particularly adding an alkali such as sodium hydroxide or an acid to water, leading to superior handleability, since the PVA used has superior solubility in water. In addition, according to the coating agent, sufficient viscosity stability can be exhibited even in a neutral pH region.

Specifically, the coating agent can be used as fiber coating agents, coating agents for glass fibers, surface coating agents for metals or glass, and coating materials such as anti-fogging agents; agents for imparting hydrophilicity to hydrophobic resins; clear coating agents; white or colored coating agents containing a pigment and the like; as well as coating agents for forming an ink-receiving layer in ink jet recording materials; coating agents for forming an overcoat layer or a thermal heat generation layer and the like in thermal recording materials; coating agents for forming a coating layer in a base paper for a release paper; and the like.

Coated Article and Method for Production Thereof

The coated article according to an embodiment of the present invention is a coated article provided by applying the coating agent on the surface of a substrate. The coated article has a coating film that exhibits superior water resistance, binder force to inorganic substances, surface strength and sealability. In addition, a method for producing the coated article according to the present invention comprises applying the coating agent on the surface of a substrate. The method for production enables the coated article to be easily provided. After the coating agent is applied on the substrate, the coating agent is typically dried.

Although the substrate is not particularly limited, examples thereof include papers (including synthetic papers), fabrics, wooden boards, metal plates, films, and the like. Among these, papers are preferred in light of a possibility of allowing the coating agent to penetrate into the interior of the substrate paper, and preferably enhancing, for example, water resistance, and the like.

Although the method for application is not particularly limited, well-known means such as size presses, air knife coaters, roll coaters, bar coaters, blade coaters, curtain coaters and cast coaters can be employed.

The coated article typically comprises a substrate, and coating layer (coating film) provided by applying the coating agent on at least one face of the substrate; however, other layer may be further provided between the substrate and the coating layer, or on the surface of the coating layer. In this regard, in order for superior water resistance and the like of the coated article to be preferably exhibited, it is preferred that the coating layer is provided on the outermost surface.

Specifically, the coated article can be used as a coated paper as generally referred to such as art papers, coated papers and cast coated papers; thermal recording materials; ink jet recording materials; base papers for a release paper; and the like.

Ink Jet Recording Material

The ink jet recording material according to an embodiment of the present invention comprises the PVA. The ink jet recording material preferably comprises a substrate and an ink-receiving layer provided on the surface of the substrate, and the ink-receiving layer is preferably provided by applying a coating agent for an ink jet recording material comprising the PVA.

Substrate

Any conventionally well-known transparent or opaque supporting base material can be used as the substrate of the ink jet recording material. Examples of the transparent supporting base material include: films made of polyesters, polystyrene, polyvinyl chloride, polymethyl methacrylate, cellulose acetate, polycarbonates, polyimides, cellophanes, celluloids or the like; sheets; highly transparent papers; and the like. Examples of the opaque supporting base material include normal papers, pigment-coated papers, fabrics, woods, metal plates, synthetic papers, opacified synthetic resin-based films, sheets, and the like. Among these, papers are preferred in light of a possibility of allowing the coating agent for an ink jet recording material to penetrate into the interior of the substrate paper, and preferably enhancing, for example, the water resistance, and the like.

Coating Agent for Ink Jet Recording Material

The coating agent for an ink jet recording material is typically an aqueous solution of the PVA, and may contain other components as described later.

In the above formula (1), preferred structures and numerical ranges thereof as well as the method for production of the PVA are as described above.

When the monomer unit has the aforementioned structure, various performances such as the solubility in water and the viscosity stability of the PVA, as well as the water resistance and the binder performances and the like of the resultant ink-receiving layer can be more improved.

The monomer unit is still more preferably a unit represented by the above formula (2).

When the monomer unit is represented by the above formula (2), various functions of the ink jet recording material can be exhibited more effectively. Although the reasons for this effect are also unclear, it is presumed that the aforementioned functions of reducing the rate of hydrolysis of Si—$R^2$ in the coating agent for an ink jet recording material (aqueous solution) that contains the PVA, and inhibiting the reaction are exerted more effectively.

According to the PVA, the above inequality (I) is satisfied, preferably the inequality (I') is satisfied, and more preferably the inequality (I") is satisfied.

The product (P×S) of the viscosity average degree of polymerization (P) and the percentage content (S) of the monomer unit corresponds to the number (average) of the monomer units with respect to 100 molecules. When the product (P×S) is less than the lower limit, various characteristics resulting from the silyl group such as coating film strength and water resistance of the ink jet recording material cannot be sufficiently exhibited. To the contrary, when the product (P×S) exceeds the upper limit, solubility in water of the PVA and viscosity stability of the aqueous solution may be deteriorated, and printing unevenness is likely to occur on the resultant ink jet recording material.

It is preferred that the above inequalities (II) and (III) are further satisfied according to the PVA.

When the viscosity average degree of polymerization (P) and the percentage content (S) of the monomer unit each thus fall within the above range, the solubility in water, the viscosity stability and the like can be improved, the coating film strength, the water resistance and the like of the resultant ink jet recording material can be improved, and the generation of printing unevenness can be further reduced.

Furthermore, the viscosity average degree of polymerization (P) more preferably satisfies the above inequality (II'), and still more preferably the above inequality (II").

When the viscosity average degree of polymerization (P) is less than the lower limit, the coating film strength, the water resistance and the like of resultant ink jet recording material may be deteriorated. To the contrary, when the viscosity average degree of polymerization (P) exceeds the upper limit, the solubility in water, the viscosity stability and the like may be deteriorated.

In addition, the percentage content of the monomer unit more preferably satisfies the above inequality (III'), and still more preferably the above inequality (III").

When the percentage content (S) of the monomer unit is less than the lower limit, the coating film strength, the water resistance and the like of the resultant ink jet recording material may be deteriorated. To the contrary, when the viscosity average degree of polymerization (P) exceeds the upper limit, the solubility in water, the viscosity stability and the like may be deteriorated.

Although the degree of saponification of the PVA is not particularly limited, the degree of saponification of the PVA is preferably 80 mol % or higher, more preferably 90 mol % or higher, still more preferably 95 mol % or higher, and particularly preferably 97 mol % or higher. When the degree of saponification of the PVA is less than the lower limit, the coating film strength, the water resistance and the like of the resultant ink jet recording material may be deteriorated. It is to be noted that although the upper limit of the degree of saponification of the PVA is not particularly limited, the upper limit is, for example, 99.9 mol % in light of the productivity of the PVA, and the like. The degree of saponification of the PVA as referred to herein means a value determined in accordance with the method specified in JIS-K6726.

Although the proportion of the PVA contained in the coating agent for an ink jet recording material is not particularly limited, the proportion of the PVA is preferably 4% by mass or higher and 20% by mass or lower. Since such a comparatively high concentration can be attained in the coating agent for an ink jet recording material, the coating film strength, the water resistance and the like of the resultant ink jet recording material can be effectively improved.

The coating agent for an ink jet recording material may contain, in addition to the PVA and water as the solvent, other component such as a water-soluble resin, a water dispersible resin, a filler, and a fixative for inks.

Water-soluble organic solvents, and aqueous solutions that contain dissolved acids, bases, salts and the like may also be used as the solvent.

Examples of the water-soluble resin include albumin, gelatin, casein, starch, cationized starch, gum arabic, polyamide resins, melamine resins, poly(meth)acrylamide, polyvinylpyrrolidone, sodium poly(meth)acrylate, anion-modified PVA, sodium alginate, water-soluble polyesters, as well as cellulose derivatives such as methylcellulose, hydroxyethylcellulose and carboxymethylcellulose (CMC), and the like.

Examples of the water dispersible resin include SBR, NBR, vinyl acetate-based resins such as ethylene-vinyl acetate copolymers, (meth)acrylic acid ester-based resins, vinyl chloride-based resins, and the like.

Examples of the filler include precipitated silica, gelled silica, vapor-phase silica, colloidal silica, colloidal alumina, aluminum hydroxide, pseudoboehmite, clay, talc, diatomaceous earth, zeolites, calcium carbonate, alumina, zinc oxide, satin white, organic pigments, and the like. In this regard, although the proportion of the PVA with respect to the filler is not particularly limited, typically the mass ratio of PVA/filler preferably falls within a range of 3/100 or higher and 100/100 or lower, more preferably within a range of 5/100 or higher and 80/100 or lower, still more preferably within a range of 6/100 or higher and 30/100 or lower, and particularly preferably within a range of 7/100 or higher and 20/100 or lower. According to the ink jet recording material, when the amount of the PVA used with respect to the filler is thus reduced, the coating film strength and the water resistance are favorable, and the generation of printing unevenness can be also inhibited. It is to be noted that when the mass ratio of PVA/filler is too large or too small, the printing unevenness are likely to occur. In addition, when the mass ratio of PVA/filler is small, the coating film strength may be deteriorated.

The fixative is exemplified by cationic resins. The cationic resins refer to a monomer, an oligomer or a polymer, preferably an oligomer or a polymer, that has a primary to tertiary amine or a quaternary ammonium salt that is dissociated and develops a cationic character when being dissolved in water. Specific examples of the fixative include dimethylamine-epichlorohydrin polycondensates, acrylamide-diallylamine copolymers, polyvinylamine copolymers, dime thyldiallylammonium chloride polymers, polyethylene imine, and the like.

Although the pH of the coating agent for an ink jet recording material is not particularly limited, the pH is preferably 4 or higher and 8 or lower. In the coating agent for an ink jet recording material, since the PVA used has superior solubility in water, a homogeneous aqueous solution can be prepared without particularly adding an alkali such as sodium hydroxide or an acid to water, leading to superior handleability. In addition, according to the coating agent for an ink jet recording material, sufficient viscosity stability can be exhibited even in a neutral pH region. Therefore, reduction of the printing unevenness in the ink jet recording material can be achieved.

The method for producing the ink jet recording material is exemplified by a method involving: preparing a coating agent for an ink jet recording material comprising the PVA by dissolving or dispersing the PVA and filler, fixative for inks and the like, as needed, in an aqueous medium; and applying the obtained coating agent for an ink jet recording material on a substrate. The applying can be carried out using size presses, air knife coaters, roll coaters, bar coaters, blade coaters, curtain coaters, cast coaters or the like. Although the amount of the applied coating agent for an ink jet recording material is not particularly limited, the amount of the coating agent in terms of solid content equivalent is preferably 3 $g/m^2$ or more and 30 $g/m^2$ or less, and more preferably 5 $g/m^2$ or more and 20 $g/m^2$ or less. By thus applying the coating agent for an ink jet recording material on the substrate, and impregnating the substrate with the PVA or providing a coating layer containing the PVA on one side or both sides of the substrate, an ink jet recording material having superior water resistance, coating film strength and the like can be produced. After the application of the coating agent for an ink jet recording material on the substrate, drying is typically carried out.

It is to be noted that the ink jet recording material may comprise, in addition to the substrate and the ink-receiving layer, other layer or the like, for example, between the substrate and the ink-receiving layer. In addition, the ink jet recording material may comprise the PVA in the substrate. Even in such a case, the ink jet recording material can exhibit superior coating film strength, water resistance and the like.

Method for Producing Printed Article

By subjecting the ink jet recording material to ink jet printing, a printed article having reduced generation of printing unevenness and superior water resistance can be obtained. Examples of the ink used in the ink jet printing include aqueous ink jet inks containing water and a small amount of an organic solvent.

Thermal Recording Material

The thermal recording material according to an embodiment of the present invention comprises the PVA. The thermal recording material has a layer structure in which, for example, a substrate, a thermal coloring layer and an overcoat layer are laminated in this order, and at least any one of the thermal coloring layer and the overcoat layer is provided is formed as a coating layer by applying the coating agent for a thermal recording material comprising the PVA. In this regard, the overcoat layer is preferably provided by applying the coating agent for a thermal recording material comprising the PVA. According to such a configuration, the layer of the thermal recording material can be formed from the PVA and the like, and the water resistance and the resistance to plasticizers can be more effectively improved.

Substrate

Any conventionally well-known transparent or opaque supporting base material can be used as the substrate of the thermal recording material. Examples of the transparent supporting base material include: films made of polyesters, polystyrene, polyvinyl chloride, polymethyl methacrylate, cellulose acetate, polycarbonates, polyimides, cellophanes, celluloids, or the like; sheets; highly transparent papers; and the like. Examples of the opaque supporting base material include normal papers, pigment-coated papers, fabrics, woods, metal plates, synthetic papers, opacified synthetic resin-based films, sheets, and the like. Among these, papers are preferred in light of a possibility of allowing the coating agent for a thermal recording material to penetrate into the interior of the substrate paper, and suitably enhancing, for example, the water resistance, and the like.

Coating Agent for Thermal Recording Material

The coating agent for a thermal recording material is typically an aqueous solution of the PVA, and may contain other components. Examples of the other components in a case where the overcoat layer is provided include a crosslinking agent, a water-soluble polymer, a polymer dispersion, a lubricant and a filler, and the like, whereas examples of the other components in a case where the thermal coloring layer is provided include a thermal dye, a color developer, a crosslinking agent, a water-soluble polymer, a polymer dispersion, a lubricant and a filler, and the like.

In the above formula (1), preferred structures and numerical ranges thereof as well as the method for production of the PVA are as described above.

When the monomer unit has the aforementioned structure, various performances such as the solubility in water and the viscosity stability of the PVA, as well as the water resistance and the resistance to plasticizers of the resultant thermal recording material can be more improved.

The monomer unit is still more preferably a unit represented by the above formula (2).

When the monomer unit is represented by the above formula (2), various functions of the thermal recording material can be exhibited more effectively. Although the reasons for this effect are also unclear, it is presumed that the aforementioned functions of reducing the rate of hydrolysis of Si—$R^2$ in the coating agent for a thermal recording material (aqueous solution) that comprises the PVA, and inhibiting the reaction are exerted more effectively.

The above inequality (I) is satisfied according to the PVA, preferably the inequality (I') is satisfied, and more preferably the inequality (I") is satisfied.

The product (P×S) of the viscosity average degree of polymerization (P) and the percentage content (S) of the monomer unit corresponds to the number (average) of the monomer units with respect to 100 molecules. When the product (P×S) is less than the lower limit, various characteristics resulting from the silyl group such as coating film strength and water resistance of the thermal recording material cannot be sufficiently exhibited. To the contrary, when the product (P×S) exceeds the upper limit, solubility in water of the PVA and viscosity stability of the aqueous solution may be deteriorated, and various performances of the resulting thermal recording material is likely to be deteriorated.

It is preferred that the PVA further satisfies the above inequalities (II) and (III).

When the viscosity average degree of polymerization (P) and the percentage content (S) of the monomer unit each thus fall within the above range, the solubility in water, the viscosity stability and the like can be improved, and the water resistance, the resistance to plasticizers and the like of the resulting thermal recording material can be improved.

Furthermore, the viscosity average degree of polymerization (P) more preferably satisfies the above inequality (II'), and still more preferably the above inequality (II").

When the viscosity average degree of polymerization (P) is less than the lower limit, the water resistance, the resistance to plasticizers and the like of the resulting thermal recording material may be deteriorated. To the contrary, when the viscosity average degree of polymerization (P) exceeds the upper limit, the solubility in water, the viscosity stability and the like may be deteriorated.

In addition, the percentage content of the monomer unit more preferably satisfies the above inequality (III'), and still more preferably the above inequality (III").

When the percentage content (S) of the monomer unit is less than the lower limit, the water resistance, the resistance to plasticizers and the like of the resultant thermal recording material may be deteriorated. To the contrary, when the viscosity average degree of polymerization (P) exceeds the upper limit, the solubility in water, the viscosity stability, the like may be deteriorated.

Although the degree of saponification of the PVA is not particularly limited, the degree of saponification of the PVA is preferably 80 mol % or higher, more preferably 90 mol % or higher, still more preferably 95 mol % or higher, and particularly preferably 97 mol % or higher. When the degree of saponification of the PVA is less than the lower limit, the water resistance, the resistance to plasticizers and the like of the resultant thermal recording material may be deteriorated. It is to be noted that although the upper limit of the degree of saponification of the PVA is not particularly limited, the upper limit is, for example, 99.9 mol % in light of the productivity of the PVA and the like. The degree of saponification of the PVA as referred to herein means a value determined in accordance with the method specified in JIS-K6726.

Although the proportion of the PVA contained in the coating agent for a thermal recording material is not particularly limited, the proportion of the PVA is preferably 4% by mass or higher and 20% by mass or lower. Since such a comparatively high concentration can be attained in the coating agent for a thermal recording material, the water resistance, the resistance to plasticizers and the like of the resultant thermal recording material can be effectively improved.

The crosslinking agent is exemplified by an aldehyde compound such as glyoxal and glutaraldehyde, a zirconium compound such as ammonium zirconium carbonate, a titanium compound such as titanium lactate, an epoxy compound such as polyamidoamine-epichlorohydrin, polyoxazoline, and the like. When the coating agent for a thermal recording material for use in forming the thermal coloring layer, the overcoat layer or the like contains the crosslinking agent in addition to the PVA, the water resistance, the resistance to plasticizers and the like of the resultant thermal recording material can be more improved.

Examples of the water-soluble polymer or the polymer dispersion include: starch and derivatives thereof; cellulose derivatives such as hydroxymethylcellulose, hydroxyethylcellulose, carboxymethylcellulose, methylcellulose and ethylcellulose; water-soluble polymers such as gum arabic, polyvinyl alcohol, alkali salts (sodium salt and the like) of polyacrylic acid, polyvinylpyrrolidone, (meth)acrylamide-(meth)acrylic acid ester copolymers, (meth)acrylamide-(meth)acrylic acid ester-(meth)acrylic acid ternary copolymers, alkali salts (sodium salts and the like) of styrene-maleic anhydride copolymers, alkali salts (sodium salt and the like) of isobutylene-maleic anhydride copolymers, polyacrylamide, sodium alginate soda, gelatin and casein; emulsions of polyvinyl acetate, polyurethanes, polyacrylic acid, polyacrylic acid esters, vinyl chloride-vinyl acetate copolymers, polybutyl methacrylate, ethylene-vinyl acetate copolymers and the like; latexes such as styrene-butadiene copolymers and styrene-butadiene-acrylic acid copolymers; and the like.

Examples of the filler include kaolin, clay, talc, calcium carbonate particles, calcined clay, titanium oxide particles, diatomaceous earth, precipitated silica, gelled silica, colloidal silica, aluminum oxide particles, aluminum hydroxide particles, synthetic aluminum silicate particles, synthetic magnesium silicate particles, polystyrene fine particles, polyvinyl acetate-based fine particles, urea-formalin resin fine particles, and the like.

In addition, examples of the lubricant include higher aliphatic acids, higher aliphatic acid amides, higher aliphatic acid metal salts such as zinc stearate, paraffin waxes, microcrystalline waxes, and the like.

Although the thermal dye is not particularly limited, examples thereof include: triarylmethane compounds such as 3,3-bis(p-dimethylaminophenyl)-6-dimethylaminophthalide (crystal violet lactone), 3-(p-dimethylaminophenyl)-3-(1,2-dimethylindol-3-yl)phthalide, 3-(p-dimethylaminophenyl)-3-(2-phenylindol-3-yl)phthalide and 3,3-bis-(9-ethylcarbazol-3-yl)-5-dimethylaminophthalide; diphenylmethane compounds such as 4,4'-bisdimethylaminobenzhydrin benzyl ether and N-halophenylleucoauramine; xanthene compounds such as rhodamine B-anilinolactam, 3-diethylamino-7-benzylaminofluoran, 3-diethylamino-7-butylaminofluoran, 3-diethylamino-7-(chloroanilino) fluoran, 3-diethylamino-6-methyl-7-anilinofluoran, 3-piperidino-6-methyl-7-anilinofluoran, 3-ethyl-tolylamino-6-methyl-7-anilinofluoran, 3-cyclohexyl-methylamino-6-methyl-7-anilinofluoran, 3-diethylamino-6-chloro-7-(β-ethoxyethyl)aminofluoran, 3-diethylamino-6-chloro-7-(γ-chloropropyl)aminofluoran, 3-(N-ethyl-N-isoamyl)-6-methyl-7-phenylaminofluoran and 3-dibutylamino-6-methyl-7-anilinofluoran; thiazine compounds such as benzoyl leuco methylene blue and p-nitrobenzoyl leuco methylene blue; spiro compounds such as 3-methyl-spiro-dinaphthopyran, 3-ethyl-spiro-dinaphthopyran, 3-benzyl-spiro-dinaphthopyran, 3-methylnaphtho-(3-methoxy-benzo)-spiropyran; and the like. These thermal dyes may be appropriately selected in accordance with intended usages of the thermal recording material, or the like, and may be used either alone or as a mixture of two or more types thereof.

Although the color developer is not particularly limited, phenol derivatives and aromatic carboxylic acid derivatives are preferred, and bisphenols are particularly preferred. Specific examples of phenol derivatives include p-octylphenol, p-tert-butylphenol, p-phenylphenol, 1,1-bis(p-hydroxyphenyl)propane, 2,2-bis(p-hydroxyphenyl)propane, 1,1-bis(p-hydroxyphenyl)pentane, 1,1-bis(p-hydroxyphenyl)hexane, 2,2-bis(p-hydroxyphenyl)hexane, 1,1-bis(p-hydroxyphenyl)-2-ethyl-hexane, 2,2-bis(4-hydroxy-3,5-dichlorophenyl) propane, dihydroxydiphenyl ether, and the like. Specific examples of the aromatic carboxylic acid derivatives include p-hydroxybenzoic acid, ethyl p-hydroxybenzoate, butyl p-hydroxybenzoate, 3,5-di-tert-butylsalicylic acid, 3,5-di-α-methylbenzylsalicylic acid, multivalent metal salts of the aforementioned carboxylic acids, and the like.

Although the solid content concentration of the coating agent for a thermal recording material is not particularly limited, the solid content concentration is preferably 5% by mass or higher and 20% by mass or lower in light of coating characteristics thereof and the like.

Although the pH of the coating agent for a thermal recording material is not particularly limited, the pH is preferably 4 or higher and 8 or lower. In the coating agent for a thermal recording material, since the PVA used has superior solubility in water, a homogeneous aqueous solution can be prepared without particularly adding an alkali such as sodium hydroxide or an acid to water, leading to superior handleability. In addition, according to the coating agent for a thermal recording material, sufficient viscosity stability can be exhibited even in a neutral pH region. Therefore, various performances of the thermal recording material can be effectively exhibited.

The method for producing the thermal recording material by applying the coating agent for a thermal recording material on a substrate is not particularly limited, and the production may be carried out using well-known methods. Specifically, in a case where the thermal coloring layer is provided by applying the coating agent for a thermal recording material, examples of the method of production include a method of applying the coating agent for a thermal recording material on the surface of a substrate, and the like, whereas in a case where the overcoat layer is provided by applying the coating agent for a thermal recording material, examples of the method of production include a method of applying the coating agent for a thermal recording material on the surface of the thermal coloring layer provided on the substrate, and the like. As the application method, methods such as an air knife coating method, a blade coating method, a gravure coating method, a roll coating method, a spray coating method, a dip coating method, a bar coating method and an extrusion method may be employed.

For example, in a case where the overcoat layer is provided, the amount of the coating agent for a thermal recording material applied may be appropriately selected within a range not leading to inhibition of heat transfer from a thermal head of a thermal recording apparatus to the thermal coloring layer of the thermal recording material, and is typically 1 to 10 $g/m^2$ and preferably 2 to 7 $g/m^2$ in terms of solid content equivalent. Alternatively, for example in a case where the thermal coloring layer is provided, the amount of the coating agent is typically 3 to 10 $g/m^2$ and preferably 4 to 8 $g/m^2$ in terms of solid content equivalent.

It is to be noted that the thermal recording material may comprise other layer in addition to the substrate, the thermal coloring layer and the overcoat layer. The other layer is exemplified by an undercoat layer provided between the substrate and the thermal coloring layer. In addition, the thermal recording material may contain the PVA in the substrate. Even in such a case, the thermal recording material can exhibit high water resistance and resistance to plasticizers.

Method for Producing Printed Article

By subjecting the thermal recording material to printing, a printed article having superior water resistance and resistance to plasticizers can be produced. The printer used in the printing is not particularly limited, and conventionally well-known thermal recording apparatuses equipped with a thermal head may be used.

Base Paper for Release Paper

The base paper for a release paper according to an embodiment of the present invention comprises the PVA. The base paper for a release paper comprises, for example, a paper substrate, wherein a coating layer provided on the surface of the paper substrate, and the coating layer is provided by applying a coating agent for a base paper for a release paper comprising the PVA. According to such a configuration, the coating layer of the base paper for a release paper can be provided from the PVA and the like, and the sealability and the water resistance can be improved more effectively.

Paper Substrate

As the paper substrate of the base paper for a release paper, a well-known paper or synthetic paper prepared using a chemical pulp such as a hardwood kraft pulp and a softwood kraft pulp, a mechanical wood pulp such as GP, RGP and TMP, and the like may be used. The paper substrate includes premium quality papers, medium quality papers, alkaline papers, glassine papers, semi-glassine papers and the like, and the semi-glassine papers are preferred.

Although the grammage of the paper substrate is not particularly limited, the grammage is preferably 10 $g/m^2$ or higher and 120 $g/m^2$ or lower, and more preferably 40 $g/m^2$ or higher and 100 $g/m^2$ or lower in light of sealability and handleability and the like of the resultant base paper for a release paper.

Coating Agent for Base Paper for Release Paper

The coating agent for a base paper for a release paper is typically an aqueous solution of the PVA. The coating agent for a base paper for a release paper may contain other components within a range not leading to significant inhibition of the effects of the present invention. In addition, a solvent other than water (for example, an alcohol, an ether, or the like) may be also used.

In the above formula (1), preferred structures and numerical ranges thereof as well as the method for production of the PVA are as described above.

When the monomer unit has the aforementioned structure, solubility in water and viscosity stability of the PVA, and various performances such as the sealability and the water resistance of the resultant base paper for a release paper can be more improved, and the production of the PVA can be easily performed.

The monomer unit is still more preferably a unit represented by the above formula (2).

When the monomer unit is represented by the above formula (2), various functions of the thermal recording material can be exhibited more effectively. Although the reasons for this effect are also unclear, it is presumed that the aforementioned functions of reducing the rate of hydrolysis of Si—$R^2$ in the coating agent for a base paper for a release paper (aqueous solution) that comprises the PVA, and inhibiting the reaction are exerted more effectively.

The above inequality (I) is satisfied according to the PVA, preferably the inequality (I') is satisfied, and more preferably the inequality (I") is satisfied.

The product (P×S) of the viscosity average degree of polymerization (P) and the percentage content (S) of the monomer unit corresponds to the number (average) of the monomer units with respect to 100 molecules. When the product (P×S) is less than the lower limit, various characteristics resulting from the silyl group such as the sealability and the water resistance of the base paper for a release paper cannot be sufficiently exhibited. To the contrary, when the product (P×S) exceeds the upper limit, the solubility in water of the PVA and the viscosity stability of the aqueous solution are likely to be impaired, leading to deterioration of various performances of the resultant base paper for a release paper.

It is preferred that the above inequalities (II) and (III) are further satisfied according to the PVA.

When the viscosity average degree of polymerization (P) and the percentage content (S) of the monomer unit thus fall within the above range, the solubility in water, the viscosity stability and the like can be improved, and the sealability, the water resistance and the like of the resultant base paper for a release paper can be improved.

Furthermore, the viscosity average degree of polymerization (P) more preferably satisfies the above inequality (II'), and still more preferably the above inequality (II").

When the viscosity average degree of polymerization (P) is less than the lower limit, the sealability, the water resistance and the like of the resultant base paper for a release paper may be deteriorated. To the contrary, when the viscosity average degree of polymerization (P) exceeds the upper limit, the solubility in water, the viscosity stability and the like may be deteriorated.

In addition, the percentage content of the monomer unit more preferably satisfies the above inequality (III'), still more preferably the above inequality (III").

When the percentage content (S) of the monomer unit is less than the lower limit, the sealability, the water resistance and the like of the resultant base paper for a release paper may be deteriorated. To the contrary, when the viscosity average degree of polymerization (P) exceeds the upper limit, the solubility in water, the viscosity stability and the like may be deteriorated.

Although the degree of saponification of the PVA is not particularly limited, the degree of saponification of the PVA is preferably 80 mol % or higher, more preferably 90 mol % or higher, still more preferably 95 mol % or higher, and particularly preferably 97 mol % or higher. When the degree of saponification of the PVA is less than the lower limit, the sealability, the water resistance and the like of the resultant base paper for a release paper may be deteriorated. It is to be noted that although the upper limit of the degree of saponification of the PVA is not particularly limited, the upper limit is, for example, 99.9 mol % in light of the productivity of the PVA and the like. The degree of saponification of the PVA as referred to herein means a value determined in accordance with the method specified in JIS-K6726.

Although the proportion of the PVA contained in the coating agent for a base paper for a release paper is not particularly limited, the proportion of the PVA is preferably 4% by mass or higher and 20% by mass or lower. Since such a comparatively high concentration can be attained in the coating agent for a base paper for a release paper, the sealability, the water resistance and the like of the resultant base paper for a release paper can be effectively improved.

Examples of components other than the PVA which may be contained in the coating agent for a base paper for a release paper include various types of polymers (water-soluble polymers, polymer dispersions, and the like), a filler, a water proofing agent, a surfactant (nonionic, anionic, and the like), a lubricant, a defoaming agent, a dispersant, a humectant, a pH adjusting agent, an ultraviolet ray absorbing agent, and the like.

Examples of the water-soluble polymers and the polymer dispersions include: starch and derivatives thereof; cellulose derivatives such as hydroxymethylcellulose, hydroxyethylcellulose, carboxymethylcellulose, methylcellulose and ethylcellulose; water-soluble polymers such as gum arabic, polyvinyl alcohol, alkali salts (sodium salts and the like) of polyacrylic acid, polyvinylpyrrolidone, (meth)acrylamide-(meth)acrylic acid ester copolymers, (meth)acrylamide-(meth)acrylic acid ester-(meth)acrylic acid ternary copolymers, alkali salts (sodium salts and the like) of styrene-maleic anhydride copolymers, alkali salts (sodium salts and the like) of isobutylene-maleic anhydride copolymers, alkali salts (sodium salts and the like) of diisobutylene-maleic anhydride copolymers, polyacrylamide, sodium alginate, gelatin and casein; emulsions of polyvinyl acetate, polyurethanes, polyacrylic acid, polyacrylic acid esters, vinyl chloride-vinyl acetate copolymers, polybutyl methacrylate, ethylene-vinyl acetate copolymers and the like; latexes such as styrene-butadiene copolymers and styrene-butadiene-acrylic acid copolymers; and the like.

Examples of the filler include kaolin, clay, calcium carbonate particles, calcined clay, titanium oxide particles, diatomaceous earth, silica, colloidal silica, aluminum oxide particles, aluminum hydroxide particles, synthetic aluminum silicate particles, synthetic magnesium silicate particles, polystyrene fine particles, polyvinyl acetate-based fine particles, urea-formalin resin fine particles, flour, and the like.

Examples of the water proofing agent include glyoxal, urea resins, melamine resins, multivalent metal salts, water-soluble polyamide resins, and the like.

Although the solid content concentration of the coating agent for a base paper for a release paper is not particularly limited, the solid content concentration of the coating agent is preferably 1% by mass or higher and 20% by mass or lower in light of coating characteristics thereof and the like.

Although the pH of the coating agent for a base paper for a release paper is not particularly limited, the pH is preferably 4 or higher and 8 or lower. In the coating agent for a base paper for a release paper, since the PVA used has superior solubility in water, a homogeneous aqueous solution can be prepared without particularly adding an alkali such as sodium hydroxide or an acid to water, leading to superior handleability. In addition, according to the coating agent for a base paper for a release paper, sufficient viscosity stability can be exhibited even in a neutral pH region. Therefore, various performances of the base paper for a release paper can be effectively exhibited.

The method for producing the base paper for a release paper by applying the coating agent for a base paper for a release paper on a paper substrate is not particularly limited, and the production may be carried out using well-known methods. As a specific application method, methods such as an air knife coating method, a blade coating method, a gravure coating method, a roll coating method, a spray coating method, a dip coating method, a bar coating method and an extrusion method may be employed.

Although the amount of the coating agent for a base paper for a release paper applied is not particularly limited, the amount of the coating agent is preferably 0.1 g/m² or more and 3 g/m² or less, and more preferably 0.2 g/m² or more and 2 g/m² or less (per side in a case where the applying is carried out on both sides) in terms of solid content equivalent. When the amount of the coating agent is less than the lower limit, sufficient sealability and water resistance may be unlikely to be exhibited. To the contrary, when the amount of the coating agent exceeds the upper limit, coating characteristics of the coating agent may be deteriorated, and/or the applying process may be uneconomical.

After the application of the coating agent for a base paper for a release paper, a drying treatment is typically carried out. The drying may be executed using a method involving, for example, a hot air, an infrared light, a heating cylinder or a combination thereof. In addition, the sealability and the like of the dried base paper for a release paper may be further improved by subjecting the dried base paper for a release paper to humidity conditioning and a calendar treatment, particularly supercalendar treatment. The humidity conditioning is preferably carried out so as to result in a moisture content in paper of 10 to 30% by mass. In addition, calendar treatment conditions involving a roll temperature of normal temperature to 200° C. and a linear pressure between the rolls of 20 to 350 kg/cm are preferred.

The air resistance (hereinafter, may be also abbreviated as "air permeance") of the base paper for a release paper is preferably 10,000 sec or higher, more preferably 30,000 sec or higher, still more preferably 50,000 sec or higher, and particularly preferably 100,000 sec or higher. When the air permeance is lower than 10,000 sec, the sealability against an overcoating agent (the aforementioned varnish, and the like) to be applied on the base paper for a release paper may be insufficient. The air permeance is determined in accordance with JIS-P8117 using an Oken type smoothness and air-permeability tester.

It is to be noted that the base paper for a release paper may comprise, in addition to the paper substrate and the coating layer, other layer or the like, for example, between the paper substrate and the coating layer. In addition, the base paper for a release paper may comprise the PVA in the paper substrate. Even in such a case, the base paper for a release paper can exhibit high sealability and water resistance.

Release Paper

The release paper according to an embodiment of the present invention comprises the base paper for a release paper, and a release layer provided on the surface of the base paper for a release paper. The base paper for a release paper in the release paper typically comprises a paper substrate and a coating layer provided on the surface of the paper substrate, as described above. The release layer of the release paper is provided on the surface of the coating layer in the base paper for a release paper. The release paper can be produced by applying on the base paper for a release paper, as the overcoating agent, a releasing agent for providing the release layer. Examples of the releasing agent include solvent type silicones, and non-solvent type (emulsion type, oligomer type) silicones. Examples of the solvent contained in the releasing agent include organic solvents such as toluene.

Laminate

Furthermore, the laminate according to an embodiment of the present invention at least comprises the base paper for a release paper, a release layer provided on the surface of the base paper for a release paper, and a tacky layer provided on the surface of the release layer. In the laminate, it is preferred that a substrate layer such as a paper layer or a plastic layer is further provided on the face of the tacky layer opposite to the face in contact with the release layer. Such a laminate has superior peelability between the release layer and the tacky layer. The laminate can be produced by applying on the release layer in the release paper, as the overcoating agent, a tacky material for providing the tacky layer. The tacky material is exemplified by solvent type tacky materials and emulsion type tacky materials.

EXAMPLES

Hereinafter, the embodiments of the present invention will be explained in detail by way of Examples, but the present invention is not in any way limited thereto. In addition, in the following Examples, Comparative Examples and Synthesis Examples, parts and percentages indicate parts by mass and % by mass, respectively, unless otherwise specified.

It is to be noted that each monomer having a silyl group (monomer A) used in Examples and Comparative Examples is as follows:

MAmPTMS: 3-methacrylamidopropyltrimethoxysilane
MAmPTES: 3-methacrylamidopropyltriethoxysilane
MAmBTMS: 4-methacrylamidobutyltrimethoxysilane
MAmOTMS: 8-methacrylamidooctyltrimethoxysilane
MAmDDTMS: 12-methacrylamidododecyltrimethoxysilane
MAmODTMS: 18-methacrylamidooctadecyltrimethoxysilane
AMBTMS: 3-acrylamido-3-methylbutyltrimethoxysilane
4-PTMS: 4-pentenyltrimethoxysilane
VMS: vinyltrimethoxysilane
MAmMTMS: methacrylamidomethyltrimethoxysilane
AMPTMS: 2-acrylamido-2-methylpropyltrimethoxysilane

PVA

Production of Silyl Group-Containing PVA

PVAs were produced according to the following method, and the degree of saponification, the percentage content (S) of the monomer unit having a group represented by the above formula (1) (in several Examples, corresponding to the percentage content of the monomer unit having a silyl group), and the viscosity average degree of polymerization (P) thereof were determined. In addition, according to the following evaluation methods, performances of the coating films and binder force between the PVA and an inorganic substance were evaluated.

Method of Analysis of PVAs

Analysis of the PVAs was carried out in accordance with the method specified in JIS-K6726, unless otherwise specified.

Example 1-1

Production of PVA1-1

Into a 6 L separable flask equipped with a stirrer, a reflux condenser, a nitrogen inlet tube, a comonomer dripping port and an addition port of the initiator were charged 1,500 g of vinyl acetate, 500 g of methanol and 1.87 g of MAmPTMS as the monomer having a group represented by the above formula (1) (monomer A), and replacement with nitrogen gas in the system was carried out for 30 min by nitrogen bubbling. Also, a comonomer solution was prepared as a delay solution by dissolving MAmPTMS in methanol to give a concentration of 8%, and subjected to replacement with nitrogen by bubbling of nitrogen gas. An elevation of the temperature of the reaction vessel was started, and 0.8 g of 2,2'-azobisisobutyronitrile (AIBN) was added to initiate the polymerization when an internal temperature of 60° C. was attained. The polymerization was allowed to proceed at 60° C. for 2.7 hours while adding the delay solution dropwise such that the monomer composition (proportion of vinyl acetate and the monomer A (MAmPTMS)) was kept constant in the polymerization solution, followed by cooling to stop the polymerization. The total amount of the comonomer solution added until the polymerization was stopped (sequentially added liquid) was 99 g. In addition, the solid content concentration was 29.0% when the polymerization was stopped. Subsequently, unreacted vinyl acetate monomer was eliminated while adding methanol at 30° C. under a reduced pressure at intervals to obtain a methanol solution of polyvinyl acetate (PVAc) having a group represented by the above formula (1) at a concentration of 40%. Furthermore, to this methanol solution were added methanol and a methanol solution containing sodium hydroxide at a concentration of 10% by mass in this order with stirring so that the molar ratio of sodium hydroxide to the vinyl acetate unit in the PVAc was 0.04 and the solid content concentration of PVAc was 30% by mass, to start a saponification reaction at 40° C. Gelatinous matter was produced about 5 min after the alkali solution was added. The gelatinous matter was ground with a grinder, and left to stand at 40° C. for 1 hour to allow the saponification to proceed. Thereafter, methyl acetate was added to neutralize remaining alkali. After confirming the completion of the neutralization using a phenolphthalein indicator, the mixture was filtered to obtain a white solid. Methanol was added to the white solid, and the mixture was left to stand at room temperature for 3 hours to permit washing. After this washing operation was repeated three times, a white solid obtained by deliquoring through centrifugation was left to stand in a dryer at 65° C. for 2 days to obtain PVA1-1 having a group represented by the above formula (1). PVA1-1 had a viscosity average degree of polymerization (P) of 1,700 and a degree of saponification of 98.6 mol %.

The percentage content of the monomer unit having a group represented by the above formula (1) (percentage content of the monomer unit having a silyl group) in PVA1-1 thus obtained was determined by proton NMR of the PVAc which was a precursor of the PVA. More specifically, the obtained PVAc was subjected to thorough purification by reprecipitation in n-hexane/acetone at least three times, and dried at 50° C. under a reduced pressure for 2 days to prepare PVAc for analysis. The PVAc was dissolved in $CDCl_3$, and subjected to measurement using a proton NMR (JEOL GX-500) at 500 MHz at room temperature. The percentage content (S) of the monomer unit having a group represented by the formula (1) was calculated based on a peak a derived from the main chain methine of the vinyl acetate unit (4.7 to 5.2 ppm) and a peak 13 derived from the methyl of the methoxy group in the monomer A unit (3.4 to 3.8 ppm) using the following formula. In PVA1-1, the percentage content (S) was 0.5 mol %. Results of the analysis of the obtained PVAs are shown in Table 1.

percentage content (S: mol %) of the monomer unit having a group represented by the formula (1)

$$=\{(\text{peak area of } \beta/9)/(\text{peak area of } \alpha+(\text{peak area of } \beta/9))\} \times 100$$

Examples 1-2 to 1-31 and Comparative Examples 1-1 to 1-22

Production of PVA1-2 to PVA1-53

PVA1-2 to PVA1-53 were produced in a similar manner to Example 1-1 except that: polymerization conditions such as the amount of vinyl acetate and methanol charged, and the type and amount of addition of the monomer A; and saponification conditions such as the concentration of PVAc and the molar ratio of sodium hydroxide to the vinyl acetate unit in saponification were changed as shown in Table 1 and Table 2. Results of analyses of each PVA obtained are shown in Table 1 and Table 2.

TABLE 1

| | | Polymerization conditions | | | | | | | |
| | | | | | | | modifier | | |
| | Type of PVA | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) |
| --- | --- | --- | --- | --- | --- | --- | --- | --- | --- |
| Example 1-1 | PVA1-1 | 1,500 | 500 | 0.8 | 2.7 | MAmPTMS | 1.87 | 8 | 99 |
| Example 1-2 | PVA1-2 | 1,500 | 500 | 0.8 | 2.7 | MAmPTMS | 0.93 | 5 | 79 |
| Example 1-3 | PVA1-3 | 1,500 | 500 | 0.8 | 2.7 | MAmPTMS | 15.49 | 50 | 131 |
| Example 1-4 | PVA1-4 | 1,500 | 500 | 0.8 | 2.7 | MAmPTMS | 11.5 | 40 | 122 |
| Example 1-5 | PVA1-5 | 1,500 | 500 | 0.8 | 2.7 | MAmPTMS | 5.66 | 25 | 96 |
| Example 1-6 | PVA1-6 | 1,500 | 70 | 0.8 | 1.0 | MAmPTMS | 5.66 | 50 | 24 |
| Example 1-7 | PVA1-7 | 1,500 | 70 | 0.8 | 1.0 | MAmPTMS | 1.87 | 50 | 8 |
| Example 1-8 | PVA1-8 | 1,500 | 70 | 0.8 | 1.0 | MAmPTMS | 0.37 | 1 | 80 |
| Example 1-9 | PVA1-9 | 1,500 | 167 | 0.8 | 1.8 | MAmPTMS | 3.75 | 50 | 25 |

TABLE 1-continued

| Example | PVA | | | | | Monomer | | | |
|---|---|---|---|---|---|---|---|---|---|
| Example 1-10 | PVA1-10 | 1,500 | 167 | 0.8 | 1.9 | MAmPTMS | 1.87 | 50 | 13 |
| Example 1-11 | PVA1-11 | 1,500 | 265 | 0.8 | 2.1 | MAmPTMS | 3.75 | 20 | 70 |
| Example 1-12 | PVA1-12 | 1,500 | 265 | 0.8 | 2.1 | MAmPTMS | 2.87 | 58 | 12 |
| Example 1-13 | PVA1-13 | 1,500 | 320 | 0.8 | 2.5 | MAmPTMS | 11.5 | 40 | 102 |
| Example 1-14 | PVA1-14 | 1,500 | 1,000 | 1.5 | 3.0 | MAmPTMS | 23.75 | 30 | 41 |
| Example 1-15 | PVA1-15 | 1,500 | 1,000 | 1.5 | 3.0 | MAmPTMS | 11.5 | 30 | 203 |
| Example 1-16 | PVA1-16 | 1,500 | 1,000 | 1.5 | 3.0 | MAmPTMS | 7.58 | 25 | 161 |
| Example 1-17 | PVA1-17 | 1,500 | 1,000 | 1.5 | 3.0 | MAmPTMS | 1.87 | 8 | 124 |
| Example 1-18 | PVA1-18 | 1,500 | 2,250 | 3.0 | 3.8 | MAmPTMS | 23.75 | 80 | 201 |
| Example 1-19 | PVA1-19 | 1,500 | 2,250 | 3.0 | 3.8 | MAmPTMS | 3.75 | 50 | 51 |
| Example 1-20 | PVA1-20 | 1,500 | 6,000 | 6.0 | 4.4 | MAmPTMS | 19.58 | 80 | 177 |
| Example 1-21 | PVA1-21 | 1,500 | 500 | 0.8 | 2.7 | MAmPTMS | 1.87 | 8 | 99 |
| Example 1-22 | PVA1-22 | 1,500 | 500 | 0.8 | 2.7 | MAmPTMS | 1.87 | 8 | 99 |
| Example 1-23 | PVA1-23 | 1,500 | 500 | 0.8 | 2.7 | MAmPTMS | 1.87 | 8 | 99 |
| Example 1-24 | PVA1-24 | 1,500 | 1,000 | 1.5 | 3.0 | MAmPTMS | 1.87 | 8 | 124 |
| Example 1-25 | PVA1-25 | 2,500 | 500 | 0.8 | 2.7 | MAmPTES | 2.18 | 10 | 93 |
| Example 1-26 | PVA1-26 | 1,500 | 500 | 0.8 | 2.7 | MAmBTMS | 1.97 | 10 | 84 |
| Example 1-27 | PVA1-27 | 1,500 | 500 | 0.8 | 2.7 | MAmOTMS | 2.34 | 10 | 100 |
| Example 1-28 | PVA1-28 | 1,500 | 500 | 0.8 | 2.7 | MAmDDTMS | 2.82 | 10 | 119 |
| Example 1-29 | PVA1-29 | 1,500 | 500 | 0.8 | 2.7 | MAmODTMS | 3.45 | 15 | 98 |
| Example 1-30 | PVA1-30 | 1,500 | 500 | 0.8 | 2.7 | AMBTMS | 1.97 | 10 | 83 |
| Example 1-31 | PVA1-31 | 1,500 | 500 | 0.8 | 2.7 | 4-PTMS | 14.49 | 1 | 65 |

| | Saponification conditions | | Results of analyses | | | |
|---|---|---|---|---|---|---|
| | PVAc concentration (%) | NaOH molar ratio | viscosity average degree of polymerization (P) | percentage content (S) (mol %) | P × S | degree of saponification (mol %) |
| Example 1-1 | 30 | 0.04 | 1,700 | 0.5 | 850 | 98.6 |
| Example 1-2 | 30 | 0.04 | 1,700 | 0.25 | 425 | 98.4 |
| Example 1-3 | 30 | 0.04 | 1,700 | 3.5 | 5,950 | 98.6 |
| Example 1-4 | 30 | 0.04 | 1,700 | 3.0 | 5,100 | 98.4 |
| Example 1-5 | 30 | 0.04 | 1,700 | 1.5 | 2,550 | 98.7 |
| Example 1-6 | 15 | 0.04 | 4,000 | 1.5 | 6,000 | 98.4 |
| Example 1-7 | 15 | 0.04 | 4,000 | 0.5 | 2,000 | 98.3 |
| Example 1-8 | 15 | 0.04 | 4,000 | 0.1 | 400 | 98.7 |
| Example 1-9 | 20 | 0.04 | 3,000 | 1.0 | 3,000 | 98.8 |
| Example 1-10 | 20 | 0.04 | 3,000 | 0.5 | 1,500 | 98.7 |
| Example 1-11 | 20 | 0.04 | 2,400 | 1.0 | 2,400 | 98.4 |
| Example 1-12 | 20 | 0.04 | 2,400 | 0.5 | 1,200 | 98.3 |
| Example 1-13 | 20 | 0.04 | 2,000 | 2.9 | 5,800 | 98.8 |
| Example 1-14 | 30 | 0.04 | 1,000 | 5.8 | 5,800 | 98.5 |
| Example 1-15 | 30 | 0.04 | 1,000 | 3.0 | 3,000 | 98.5 |
| Example 1-16 | 30 | 0.04 | 1,000 | 2.0 | 2,000 | 98.6 |
| Example 1-17 | 30 | 0.04 | 1,000 | 0.5 | 500 | 98.4 |
| Example 1-18 | 35 | 0.04 | 500 | 6.0 | 3,000 | 98.8 |
| Example 1-19 | 35 | 0.04 | 500 | 1.0 | 500 | 98.3 |
| Example 1-20 | 60 | 0.04 | 200 | 5.0 | 1,000 | 98.5 |
| Example 1-21 | 30 | 0.011 | 1,700 | 0.5 | 850 | 95.2 |
| Example 1-22 | 30 | 0.01 | 1,700 | 0.5 | 850 | 93.5 |
| Example 1-23 | 30 | 0.009 | 1,700 | 0.5 | 850 | 89.2 |
| Example 1-24 | 30 | 0.01 | 1,000 | 0.5 | 500 | 92.3 |
| Example 1-25 | 30 | 0.04 | 1,700 | 0.5 | 850 | 98.5 |
| Example 1-26 | 30 | 0.04 | 1,700 | 0.5 | 850 | 98.6 |
| Example 1-27 | 30 | 0.04 | 1,700 | 0.5 | 850 | 98.4 |
| Example 1-28 | 30 | 0.04 | 1,700 | 0.5 | 850 | 98.4 |
| Example 1-29 | 30 | 0.04 | 1,700 | 0.5 | 850 | 98.5 |
| Example 1-30 | 30 | 0.04 | 1,700 | 0.5 | 850 | 98.4 |
| Example 1-31 | 30 | 0.04 | 1,700 | 0.5 | 850 | 98.7 |

*1Monomer A was directly charged without dilution with methanol.
MAmPTMS: 3-methacrylamidopropyltrimethoxysilane
MAmPTES: 3-methacrylamidopropyltriethoxysilane
MAmBTMS: 4-methacrylamidobutyltrimethoxysilane
MAmOTMS: 8-methacrylamidooctyltrimethoxysilane
MAmDDTMS: 12-methacrylamidododecyltrimethoxysilane
MAmODTMS: 18-methacrylamidooctadecyltrimethoxysilane
AMBTMS: 3-acrylamido-3-methylbutyltrimethoxysilane
4-PTMS: 4-pentenyltrimethoxysilane

TABLE 2

| | Type of PVA | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) |
|---|---|---|---|---|---|---|---|---|---|
| Comparative Example 1-1 | PVA1-32 | 1,500 | 500 | 0.8 | 3.0 | VMS | 11.29 | 1 | 73 |
| Comparative Example 1-2 | PVA1-33 | 1,500 | 500 | 0.8 | 3.0 | VMS | 5.63 | 0.5 | 73 |
| Comparative Example 1-3 | PVA1-34 | 1,500 | 500 | 0.8 | 3.0 | VMS | 4.5 | 0.5 | 58 |
| Comparative Example 1-4 | PVA1-35 | 1,500 | 500 | 0.8 | 3.0 | VMS | 4.5 | 0.5 | 58 |
| Comparative Example 1-5 | PVA1-36 | 1,500 | 643 | 0.4 | 2.6 | — | — | — | — |
| Comparative Example 1-6 | PVA1-37 | 1,500 | 265 | 0.8 | 1.9 | VMS | 11.29 | 0.5 | 105 |
| Comparative Example 1-7 | PVA1-38 | 1,500 | 265 | 0.8 | 1.9 | VMS | 2.25 | 0.1 | 105 |
| Comparative Example 1-8 | PVA1-39 | 1,500 | 1,000 | 1.5 | 3.0 | VMS | 11.29 | 0.5 | 170 |
| Comparative Example 1-9 | PVA1-40 | 1,500 | 1,000 | 1.5 | 3.0 | VMS | 6.76 | 0.3 | 170 |
| Comparative Example 1-10 | PVA1-41 | 1,500 | 2,250 | 3.0 | 3.6 | VMS | 22.7 | 2 | 105 |
| Comparative Example 1-11 | PVA1-42 | 1,500 | 2,250 | 3.0 | 3.6 | VMS | 11.29 | 1 | 105 |
| Comparative Example 1-12 | PVA1-43 | 1,500 | 500 | 0.8 | 2.9 | MAmMTMS | 1.66 | 10 | 74 |
| Comparative Example 1-13 | PVA1-44 | 1,500 | 500 | 0.8 | 2.9 | MAmMTMS | 0.66 | 4 | 73 |
| Comparative Example 1-14 | PVA1-45 | 1,500 | 500 | 0.8 | 2.8 | AMPTMS | 1.86 | 10 | 81 |
| Comparative Example 1-15 | PVA1-46 | 1,500 | 500 | 0.8 | 2.8 | AMPTMS | 0.74 | 4 | 81 |
| Comparative Example 1-16 | PVA1-47 | 1,500 | 500 | 0.8 | 2.8 | MAmPTMS | 0.74 | 4 | 81 |
| Comparative Example 1-17 | PVA1-48 | 1,500 | 500 | 0.8 | 2.8 | MAmPTMS | 0.37 | 2 | 81 |
| Comparative Example 1-18 | PVA1-49 | 1,500 | 2,250 | 3.0 | 3.8 | MAmPTMS | 1.87 | 50 | 26 |
| Comparative Example 1-19 | PVA1-50 | 1,500 | 167 | 0.8 | 1.9 | MAmPTMS | 0.37 | 1 | 130 |
| Comparative Example 1-20 | PVA1-51 | 1,500 | 1,000 | 1.5 | 3.0 | MAmPTMS | 25.8 | 30 | 95 |
| Comparative Example 1-21 | PVA1-52 | 1,500 | 265 | 0.8 | 2.1 | MAmPTMS | 11.5 | 40 | 105 |
| Comparative Example 1-22 | PVA1-53 | 1,500 | 70 | 0.8 | 1.0 | MAmPTMS | 6.9 | 50 | 29 |

| | Saponification conditions | | Results of analyses | | | |
|---|---|---|---|---|---|---|
| | PVAc concentration (%) | NaOH molar ratio | viscosity average degree of polymerization (P) | percentage content (S)*2 (mol %) | P × S | degree of saponification (mol %) |
| Comparative Example 1-1 | 30 | 0.03 | 1,700 | 0.5 | 850 | 98.4 |
| Comparative Example 1-2 | 30 | 0.03 | 1,700 | 0.25 | 425 | 98.3 |
| Comparative Example 1-3 | 30 | 0.03 | 1,700 | 0.2 | 340 | 98.7 |
| Comparative Example 1-4 | 30 | 0.01 | 1,700 | 0.2 | 340 | 91.9 |
| Comparative Example 1-5 | 30 | 0.02 | 1,700 | 0 | 0 | 98.5 |
| Comparative Example 1-6 | 20 | 0.03 | 2,400 | 0.5 | 1,200 | 98.8 |
| Comparative Example 1-7 | 20 | 0.03 | 2,400 | 0.1 | 240 | 98.1 |
| Comparative Example 1-8 | 30 | 0.03 | 1,000 | 0.5 | 500 | 98.4 |

TABLE 2-continued

| | | | | | | |
|---|---|---|---|---|---|---|
| Comparative Example 1-9 | 30 | 0.03 | 1,000 | 0.3 | 300 | 98.7 |
| Comparative Example 1-10 | 35 | 0.03 | 500 | 1 | 500 | 98.2 |
| Comparative Example 1-11 | 35 | 0.03 | 500 | 0.5 | 250 | 98.9 |
| Comparative Example 1-12 | 30 | 0.03 | 1,700 | 0.5 | 850 | 98.1 |
| Comparative Example 1-13 | 30 | 0.03 | 1,700 | 0.2 | 340 | 98.7 |
| Comparative Example 1-14 | 30 | 0.03 | 1,700 | 0.5 | 850 | 98.6 |
| Comparative Example 1-15 | 30 | 0.03 | 1,700 | 0.2 | 340 | 98.3 |
| Comparative Example 1-16 | 30 | 0.03 | 1,700 | 0.2 | 340 | 98.7 |
| Comparative Example 1-17 | 30 | 0.03 | 1,700 | 0.1 | 170 | 98.2 |
| Comparative Example 1-18 | 35 | 0.04 | 500 | 0.5 | 250 | 98.4 |
| Comparative Example 1-19 | 20 | 0.04 | 3,000 | 0.1 | 300 | 98.7 |
| Comparative Example 1-20 | 30 | 0.09 | 1,000 | 6.5 | 6,500 | 98.5 |
| Comparative Example 1-21 | 20 | 0.04 | 2,400 | 3.0 | 7,200 | 98.4 |
| Comparative Example 1-22 | 15 | 0.04 | 4,000 | 1.8 | 7,200 | 98.3 |

*1Monomer A was directly charged without dilution with methanol.
*2Including the percentage content of the monomer unit having a silyl group other than the monomer unit having a group represented by the formula (1).
VMS: vinyltrimethoxysilane
MAmMTMS: methacrylamidomethyltrimethoxysilane
AMPTMS: 2-acrylamido-2-methylpropyltrimethoxysilane
MAmPTMS: 3-methacrylamidopropyltrimethoxysilane

Examples 1-32 to 1-66 and Comparative Examples 1-23 to 1-46

Preparation of Aqueous Solution

Using PVA1-1 to PVA1-53, aqueous PVA solutions were prepared so that the concentration and the pH as predetermined were attained. Viscosity stability of the aqueous PVA solution, water resistance of the coating film, water resistance of the coating film containing an inorganic substance, and binder force between the PVA and an inorganic substance were evaluated in accordance with the following evaluation methods. The type of the PVAs used and the pH of the aqueous solutions as well as the results of the evaluations are shown in Table 3.

Viscosity Stability of Aqueous PVA Solution

An 8% PVA aqueous solution was prepared and left to stand in a thermoregulated bath at 20° C., and a viscosity of the aqueous PVA solution immediately after the temperature of the aqueous PVA solution reached 20° C. and a viscosity of the aqueous PVA solution after 7 days were determined. A value obtained by dividing the viscosity after 7 days by the viscosity immediately after the temperature of the aqueous PVA solution reached 20° C. (the viscosity after 7 days/the immediate viscosity) was calculated, and the evaluation was made in accordance with the following criteria:

A: the calculated value being lower than 2.5 fold;
B: the calculated value being 2.5 fold or higher and lower than 3.0 fold;
C: the calculated value being 3.0 fold or higher and lower than 5.0 fold;
D: the calculated value being 5.0 fold or higher, but the aqueous PVA solution not being gelled; and
E: the aqueous PVA solution having lost fluidity, and being gelled.

Water Resistance of Coating Film

A 4% PVA aqueous solution was prepared and flow cast at 20° C. to obtain a coating film having a thickness of 40 μm. The obtained coating film was cut into a piece having a size of a length of 10 cm and a width of 10 cm to prepare a test piece. The test piece was immersed in distilled water at 20° C. for 24 hours, and taken out (recovered). Then, moisture adhered to the surface was wiped off with gauze, and the mass of the test piece when swollen in water was determined. The test piece after the determination of the mass when swollen in water was dried at 105° C. for 16 hours, and thereafter its mass in a dry state was determined. Then, a value which was designated as a degree of swelling (fold) was obtained by dividing the mass when swollen in water by the mass in a dry state, and the evaluation was made in accordance with the following criteria:

S: the degree of swelling being lower than 3.0 fold;
A: the degree of swelling being 3.0 fold or higher and lower than 5.0 fold;
B: the degree of swelling being 5.0 fold or higher and lower than 8.0 fold;
C: the degree of swelling being 8.0 fold or higher and lower than 10.0 fold;
D: the degree of swelling being 10.0 fold or higher; and
E: recovery of the immersed test piece failed.

Water Resistance of Coating Film Containing Inorganic Substance

A 4% PVA aqueous solution was prepared, and a 20% dispersion of colloidal silica (manufactured by Nissan Chemical Industries, Ltd.: Snowtex ST-O) in water was added thereto so that a mass ratio of PVA/colloidal silica on the solid content basis was 100/10, and the mixture was flow cast at 20° C. to obtain a coating film having a thickness of 40 μm. The obtained coating film was cut into a piece having a size of a length of 10 cm and a width of 10 cm to prepare a test piece.

The test piece was immersed in distilled water at 20° C. for 24 hours, and taken out (recovered). Then, moisture adhered to the surface was wiped off with gauze, and the mass of the test piece when swollen in water was determined. The test piece after the determination of the mass when swollen in water was dried at 105° C. for 16 hours, and thereafter its mass in a dry state was determined. Then, a value which was designated as a degree of swelling (fold) was obtained by dividing the mass when swollen in water by the mass in a dry state, and the evaluation was made in accordance with the following criteria:

A: the degree of swelling being lower than 3.0 fold;
B: the degree of swelling being 3.0 fold or higher and lower than 5.0 fold;
C: the degree of swelling being 5.0 fold or higher and lower than 8.0 fold;
D: the degree of swelling being 8.0 fold or higher and lower than 10.0 fold; and
E: the degree of swelling being 10.0 fold or higher, or recovery of the immersed test piece failed.

Binder Force between PVA and Inorganic Substance

Silica (manufactured by Mizusawa Industrial Chemicals, Ltd.: MIZUKASIL P78D) and 0.2% (with respect to the mass of the silica) of a dispersant (manufactured by Toagosei Co., Ltd.: Aron T40) were dispersed in water using a homomixer to prepare a 20% dispersion of silica in water. To the dispersion of silica in water was added a PVA aqueous solution in which the concentration of PVA was adjusted to 8%, so that the mass ratio of silica/PVA on the solid content basis was 100/20, and a necessary amount of water was added, whereby a silica-dispersed aqueous PVA solution having a concentration of the total of the silica and the PVA of 15% was produced.

The obtained silica-dispersed aqueous PVA solution was applied on the surface of a premium quality paper using a wire bar so that a grammage of 60 g/m$^2$ was achieved. Thereafter, the premium quality paper was dried at 100° C. for 3 min using a hot-air dryer to obtain a sample for evaluation. The amount of application on the premium quality paper after drying (the sample for evaluation) was 11 g/m$^2$.

Using an IGT printability tester (manufactured by Kumagai Riki Kogyo Co., Ltd.), the sample for evaluation was measured at a printing pressure of 50 kg/cm$^2$. The printing speed (cm/sec) at which peeling of the surface of the sample for evaluation occurred was defined as a binder force between the PVA and the inorganic substance, and the binder force was evaluated in accordance with the following criteria. It is to be noted that in the measurement of the sample for evaluation with the IGT printability tester, IGT Pick oil M (manufactured by Dainippon and Ink Chemicals, Incorporated) was used, and a mechanism of spring drive B was employed.

A: 260 cm/sec or higher;
B: 220 cm/sec or higher and lower than 260 cm/sec;
C: 180 cm/sec or higher and lower than 220 cm/sec;
D: 140 cm/sec or higher and lower than 180 cm/sec; and
E: lower than 140 cm/sec.

TABLE 3

| | PVA aqueous solution used | | Evaluation results | | | |
|---|---|---|---|---|---|---|
| | Type of PVA | pH of aqueous solution | viscosity stability of PVA aqueous solution | water resistance of coating film | water resistance of coating film containing inorganic substance | binder force between PVA and inorganic substance |
| Example 1-32 | PVA1-1 | 6.0 | B | A | A | A |
| Example 1-33 | PVA1-2 | 5.5 | A | B | B | B |
| Example 1-34 | PVA1-3 | 7.0 | D | A | A | A |
| Example 1-35 | PVA1-3 | 8.5*1 | A | B | B | B |
| Example 1-36 | PVA1-3 | 3.5*2 | B | B | B | B |
| Example 1-37 | PVA1-4 | 7.0 | D | A | A | A |
| Example 1-38 | PVA1-5 | 6.0 | C | A | A | A |
| Example 1-39 | PVA1-1 | 8.5*1 | A | C | C | C |
| Example 1-40 | PVA1-1 | 3.5*2 | A | C | C | C |
| Example 1-41 | PVA1-6 | 6.1 | D | A | A | A |
| Example 1-42 | PVA1-7 | 6.0 | C | A | A | A |
| Example 1-43 | PVA1-8 | 6.0 | A | B | B | A |
| Example 1-44 | PVA1-9 | 6.0 | D | A | A | A |
| Example 1-45 | PVA1-10 | 6.0 | C | A | A | A |
| Example 1-46 | PVA1-11 | 6.0 | D | A | A | A |
| Example 1-47 | PVA1-12 | 6.0 | B | A | A | A |
| Example 1-48 | PVA1-13 | 6.0 | D | A | A | A |
| Example 1-49 | PVA1-14 | 6.2 | D | A | A | A |
| Example 1-50 | PVA1-15 | 7.0 | C | A | A | A |
| Example 1-51 | PVA1-16 | 7.0 | B | A | A | A |
| Example 1-52 | PVA1-17 | 6.0 | A | A | A | B |
| Example 1-53 | PVA1-18 | 8.0 | D | A | A | B |
| Example 1-54 | PVA1-19 | 6.0 | A | C | B | C |
| Example 1-55 | PVA1-20 | 8.0 | B | C | A | C |
| Example 1-56 | PVA1-21 | 6.0 | A | B | A | A |
| Example 1-57 | PVA1-22 | 6.0 | B | B | B | A |
| Example 1-58 | PVA1-23 | 6.0 | A | C | B | B |
| Example 1-59 | PVA1-24 | 6.0 | A | D | D | A |
| Example 1-60 | PVA1-25 | 6.0 | A | A | A | A |
| Example 1-61 | PVA1-26 | 6.0 | B | A | A | A |
| Example 1-62 | PVA1-27 | 6.0 | A | S | A | A |
| Example 1-63 | PVA1-28 | 6.0 | B | S | A | A |
| Example 1-64 | PVA1-29 | 6.0 | D | S | A | C |
| Example 1-65 | PVA1-30 | 6.0 | A | B | A | A |

TABLE 3-continued

| | PVA aqueous solution used | | Evaluation results | | | |
|---|---|---|---|---|---|---|
| | Type of PVA | pH of aqueous solution | viscosity stability of PVA aqueous solution | water resistance of coating film | water resistance of coating film containing inorganic substance | binder force between PVA and inorganic substance |
| Example 1-66 | PVA1-31 | 6.0 | C | A | A | A |
| Comparative Example 1-23 | PVA1-32 | 6.0 | —*3 | —*3 | —*3 | —*3 |
| Comparative Example 1-24 | PVA1-33 | 5.5 | B | E | E | C |
| Comparative Example 1-25 | PVA1-34 | 5.5 | A | E | E | D |
| Comparative Example 1-26 | PVA1-35 | 5.5 | A | E | E | D |
| Comparative Example 1-27 | PVA1-36 | 6.0 | A | E | E | E |
| Comparative Example 1-28 | PVA1-32 | 8.5*1 | A | E | E | D |
| Comparative Example 1-29 | PVA1-32 | 3.5*2 | B | E | E | D |
| Comparative Example 1-30 | PVA1-37 | 6.0 | —*3 | —*3 | —*3 | —*3 |
| Comparative Example 1-31 | PVA1-38 | 5.5 | B | E | E | C |
| Comparative Example 1-32 | PVA1-39 | 6.0 | E | D | D | C |
| Comparative Example 1-33 | PVA1-40 | 6.0 | A | E | E | D |
| Comparative Example 1-34 | PVA1-41 | 7.0 | D | E | D | D |
| Comparative Example 1-35 | PVA1-42 | 6.0 | A | E | E | E |
| Comparative Example 1-36 | PVA1-43 | 6.0 | E | C | B | B |
| Comparative Example 1-37 | PVA1-44 | 5.5 | A | D | D | C |
| Comparative Example 1-38 | PVA1-45 | 6.0 | D | C | C | C |
| Comparative Example 1-39 | PVA1-46 | 5.5 | A | D | D | C |
| Comparative Example 1-40 | PVA1-47 | 5.5 | A | C | D | B |
| Comparative Example 1-41 | PVA1-48 | 5.5 | A | D | D | C |
| Comparative Example 1-42 | PVA1-49 | 5.6 | A | D | D | D |
| Comparative Example 1-43 | PVA1-50 | 5.5 | A | D | C | B |
| Comparative Example 1-44 | PVA1-51 | 5.6 | E | A | A | A |
| Comparative Example 1-45 | PVA1-52 | 5.6 | —*3 | —*3 | —*3 | —*3 |
| Comparative Example 1-46 | PVA1-53 | 5.5 | —*3 | —*3 | —*3 | —*3 |

*1pH was adjusted by adding a small amount of ammonia when the aqueous solution was prepared.
*2pH was adjusted by adding a small amount of hydrochloric acid when the aqueous solution was prepared.
*3PVA was not completely dissolved in the aqueous solution.

As shown in Table 3, it can be seen that the PVAs obtained in Examples 1-1 to 1-31 (PVA1-1 to 1-31) had high solubility in water and superior viscosity stability, and the coating films produced therefrom had superior water resistance and binder performances (i.e., binder force). Regarding the evaluation criteria, for the viscosity stability, A to D indicated an evaluation as having practically sufficient viscosity stability, whereas for other three items, A to C or S and A to C suggested an evaluation to be superior. Furthermore, the aqueous solutions in Examples 1-32, 1-38, 1-42, 1-45, 1-47, 1-50 to 1-52, 1-56, 1-60 to 1-63, 1-65 and 1-66 in which the viscosity average degree of polymerization (P), the degree of saponification and the structure of the monomer unit of the PVA, and the percentage content (S) of the monomer unit, the product (P×S) of the viscosity average degree of polymerization (P) and the percentage content (S) of the PVA as well as the pH of the aqueous solution were as specified exhibited particularly superior viscosity stability, and the coating films produced therefrom were particularly excellent in water resistance and binder performances (i.e., binder force), with the evaluation criteria of: A to C for the viscosity stability; A or A and S for two or more items among the other three items; and B for the rest of the items. In addition, it can be seen that the viscosity stability of the aqueous solutions in, for example, Examples 1-33, 1-34, 1-37, 1-41, 1-43, 1-44, 1-46, 1-48, 1-49, 1-53 to 1-55 and 1-57 to 1-59, and the water resistance of the coating films produced therefrom were slightly inferior. This may be attributed to a low viscosity average degree of polymerization (P) and/or a low degree of saponification, and/or a small or great product (P×S) of the viscosity average degree of polymerization (P) and the percentage content (S). In addition, it can be seen that the aqueous solutions in Examples 1-35, 1-36, 1-39 and 1-40 had an acidic or alkaline pH value, and the water resistance and the binder force of the coating films produced therefrom were inferior. In addition, in Example 1-64, the alkylene group linking the silyl group to the main chain has a long chain of as many as 18 carbon atoms, and thus it is believed that interaction between hydrophobic groups was too strong, leading to deterioration of the viscosity stability.

On the other hand, it can be seen that when the PVA did not satisfy the above specified requirements (Comparative Examples 1-23 to 1-46), the solubility in water of the PVA and the viscosity stability of the solution as well as the water resistant performances and/or the binder performances (i.e., binder force) of the coating films produced therefrom were inferior. Moreover, in comparison of Example 1-32 (PVA1-1) with Comparative Example 1-36 (PVA1-43) and Comparative Example 1-38 (PVA1-45), it can be seen that although the pH of the aqueous solutions, as well as the viscosity average degree of polymerization (P), the degree of saponification and the percentage content (S) of the PVAs used were substantially the same, the coating film obtained in Example 1-32 resulted in more superior water resistance and binder force, and furthermore the solution according to Example 1-32 exhibited superior viscosity stability. Although the reasons for these findings are not sufficiently clarified, since the alkylene group having 3 or more carbon atoms which links the main chain and the silyl group is present in PVA1-1 according to Example 1-32, it is presumed that (1) high mobility of the silyl group leads to superior water resistance and binder force of the coating film, and furthermore (2) the alkylene group causes a reduction of the rate of hydrolysis of the Si—$R^2$ or inhibition of the reaction in the aqueous solution, leading to superior viscosity stability.

Coating Agent

Coating agents were prepared using the PVA, and performances of the coating films and performances of the coated article were evaluated in accordance with the following evaluation methods.

Synthesis Examples 2-1 to 2-31 and Comparative Synthesis Examples 2-1 to 2-22

Production of PVA2-1 to PVA2-53

PVA2-1 to PVA2-53 were produced in a similar manner to Example 1-1 except that: polymerization conditions such as the amount of vinyl acetate and methanol charged, and the type and amount of addition of the monomer A; and saponification conditions such as the concentration of PVAc, and the molar ratio of sodium hydroxide to vinyl acetate unit in saponification were changed as shown in Table 4 and Table 5. Results of analyses of each PVA obtained are shown in Table 4 and Table 5.

TABLE 4

| | Polymerization conditions | | | | | modifier | | | | Saponification conditions | | Results of analyses | | | |
|---|---|---|---|---|---|---|---|---|---|---|---|---|---|---|---|
| | | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) | PVAc concentration (%) | NaOH molar ratio | viscosity average degree of polymerization (P) | percentage content (S) (mol %) | P × S | degree of saponification (mol %) |
| | Type of PVA | | | | | | | | | | | | | | |
| Synthesis Example 2-1 | PVA2-1 | 1,500 | 500 | 0.8 | 2.7 | MAmPTMS | 1.87 | 8 | 99 | 30 | 0.04 | 1,700 | 0.5 | 850 | 98.6 |
| Synthesis Example 2-2 | PVA2-2 | 1,500 | 500 | 0.8 | 2.7 | MAmPTMS | 0.93 | 5 | 79 | 30 | 0.04 | 1,700 | 0.25 | 425 | 98.4 |
| Synthesis Example 2-3 | PVA2-3 | 1,500 | 500 | 0.8 | 2.7 | MAmPTMS | 15.49 | 50 | 131 | 30 | 0.04 | 1,700 | 3.5 | 5,950 | 98.6 |
| Synthesis Example 2-4 | PVA2-4 | 1,500 | 500 | 0.8 | 2.7 | MAmPTMS | 11.5 | 40 | 122 | 30 | 0.04 | 1,700 | 3.0 | 5,100 | 98.4 |
| Synthesis Example 2-5 | PVA2-5 | 1,500 | 500 | 0.8 | 2.7 | MAmPTMS | 5.66 | 25 | 96 | 30 | 0.04 | 1,700 | 1.5 | 2,550 | 98.7 |
| Synthesis Example 2-6 | PVA2-6 | 1,500 | 70 | 0.8 | 1.0 | MAmPTMS | 5.66 | 50 | 24 | 15 | 0.04 | 4,000 | 1.5 | 6,000 | 98.4 |
| Synthesis Example 2-7 | PVA2-7 | 1,500 | 70 | 0.8 | 1.0 | MAmPTMS | 1.87 | 50 | 8 | 15 | 0.04 | 4,000 | 0.5 | 2,000 | 98.3 |
| Synthesis Example 2-8 | PVA2-8 | 1,500 | 70 | 0.8 | 1.0 | MAmPTMS | 0.37 | 1 | 80 | 15 | 0.04 | 4,000 | 0.1 | 400 | 98.7 |
| Synthesis Example 2-9 | PVA2-9 | 1,500 | 167 | 0.8 | 1.8 | MAmPTMS | 3.75 | 50 | 25 | 20 | 0.04 | 3,000 | 1.0 | 3,000 | 98.8 |
| Synthesis Example 2-10 | PVA2-10 | 1,500 | 167 | 0.8 | 1.9 | MAmPTMS | 1.87 | 50 | 13 | 20 | 0.04 | 3,000 | 0.5 | 1,500 | 98.7 |
| Synthesis Example 2-11 | PVA2-11 | 1,500 | 265 | 0.8 | 2.1 | MAmPTMS | 3.75 | 20 | 70 | 20 | 0.04 | 2,400 | 1.0 | 2,400 | 98.4 |
| Synthesis Example 2-12 | PVA2-12 | 1,500 | 265 | 0.8 | 2.1 | MAmPTMS | 2.87 | 58 | 12 | 20 | 0.04 | 2,400 | 0.5 | 1,200 | 98.3 |
| Synthesis Example 2-13 | PVA2-13 | 1,500 | 320 | 0.8 | 2.5 | MAmPTMS | 11.5 | 40 | 102 | 20 | 0.04 | 2,000 | 2.9 | 5,600 | 98.8 |
| Synthesis Example 2-14 | PVA2-14 | 1,500 | 1,000 | 1.5 | 3.0 | MAmPTMS | 23.75 | 30 | 41 | 30 | 0.04 | 1,000 | 5.8 | 5,800 | 98.5 |
| Synthesis Example 2-15 | PVA2-15 | 1,500 | 1,000 | 1.5 | 3.0 | MAmPTMS | 11.5 | 30 | 203 | 30 | 0.04 | 1,000 | 3.0 | 3,000 | 98.5 |
| Synthesis Example 2-16 | PVA2-16 | 1,500 | 1,000 | 1.5 | 3.0 | MAmPTMS | 7.58 | 25 | 161 | 30 | 0.04 | 1,000 | 2.0 | 2,000 | 98.6 |
| Synthesis Example 2-17 | PVA2-17 | 1,500 | 1,000 | 1.5 | 3.0 | MAmPTMS | 1.87 | 8 | 124 | 30 | 0.04 | 1,000 | 0.5 | 500 | 98.4 |
| Synthesis Example 2-18 | PVA2-18 | 1,500 | 2,250 | 3.0 | 3.8 | MAmPTMS | 23.75 | 80 | 201 | 35 | 0.04 | 500 | 6.0 | 3,000 | 98.8 |
| Synthesis Example 2-19 | PVA2-19 | 1,500 | 2,250 | 3.0 | 3.8 | MAmPTMS | 3.75 | 50 | 51 | 35 | 0.04 | 500 | 1.0 | 500 | 98.3 |
| Synthesis Example 2-20 | PVA2-20 | 1,500 | 6,000 | 6.0 | 4.4 | MAmPTMS | 19.58 | 80 | 177 | 60 | 0.04 | 200 | 5.0 | 1,000 | 98.5 |

TABLE 4-continued

| | Polymerization conditions | | | | | modifier | | | Saponification conditions | | Results of analyses | | | |
|---|---|---|---|---|---|---|---|---|---|---|---|---|---|---|
| | | | amount of initially added initiator (g) | polymerization time (h) | | | concentration of sequentially added liquid (methanol liquid) (%) | sequentially added amount (g) | | | viscosity average | | | |
| | Type of PVA | vinyl acetate (g) | methanol (g) | | | monomer A | initially added amount (g)*1 | | | PVAc concentration (%) | NaOH molar ratio | degree of polymerization (P) | percentage content (S) (mol %) | P × S | degree of saponification (mol %) |
| Synthesis Example 2-21 | PVA2-21 | 1,500 | 500 | 0.8 | 2.7 | MAmPTMS | 1.87 | 8 | 99 | 30 | 0.011 | 1,700 | 0.5 | 850 | 95.2 |
| Synthesis Example 2-22 | PVA2-22 | 1,500 | 500 | 0.8 | 2.7 | MAmPTMS | 1.87 | 8 | 99 | 30 | 0.01 | 1,700 | 0.5 | 850 | 93.5 |
| Synthesis Example 2-23 | PVA2-23 | 1,500 | 500 | 0.8 | 2.7 | MAmPTMS | 1.87 | 8 | 99 | 30 | 0.009 | 1,700 | 0.5 | 850 | 89.2 |
| Synthesis Example 2-24 | PVA2-24 | 1,500 | 1,000 | 1.5 | 3.0 | MAmPTMS | 1.87 | 8 | 124 | 30 | 0.01 | 1,000 | 0.5 | 500 | 92.3 |
| Synthesis Example 2-25 | PVA2-25 | 1,500 | 500 | 0.8 | 2.7 | MAmPTES | 2.18 | 10 | 93 | 30 | 0.04 | 1,700 | 0.5 | 850 | 98.5 |
| Synthesis Example 2-26 | PVA2-26 | 1,500 | 500 | 0.8 | 2.7 | MAmBTMS | 1.97 | 10 | 34 | 30 | 0.04 | 1,700 | 0.5 | 850 | 98.6 |
| Synthesis Example 2-27 | PVA2-27 | 1,500 | 500 | 0.8 | 2.7 | MAmOTMS | 2.34 | 10 | 100 | 30 | 0.04 | 1,700 | 0.5 | 850 | 98.4 |
| Synthesis Example 2-28 | PVA2-28 | 1,500 | 500 | 0.8 | 2.7 | MAmDDTMS | 2.82 | 10 | 119 | 30 | 0.04 | 1,700 | 0.5 | 850 | 98.4 |
| Synthesis Example 2-29 | PVA2-29 | 1,500 | 500 | 0.8 | 2.7 | MAmODTMS | 3.45 | 15 | 98 | 30 | 0.04 | 1,700 | 0.5 | 850 | 98.5 |
| Synthesis Example 2-30 | PVA2-30 | 1,500 | 500 | 0.8 | 2.7 | AMBTMS | 1.97 | 10 | 83 | 30 | 0.04 | 1,700 | 0.5 | 850 | 98.4 |
| Synthesis Example 2-31 | PVA2-31 | 1,500 | 500 | 0.8 | 2.7 | 4-PTMS | 14.49 | 1 | 65 | 30 | 0.04 | 1,700 | 0.5 | 850 | 98.7 |

*1Monomer A was directly charged without dilution with methanol.
MAmPTMS: 3-methacrylamidopropyltrimethoxysilane
MAmPTES: 3-methacrylamidopropyltriethoxysilane
MAmBTMS: 4-methacrylamidobutyltrimethoxysilane
MAmOTMS: 8-methacrylamidooctyltrimethoxysilane
MAmDDTMS: 12-methacrylamidododecyltrimethoxysilane
MAmODTMS: 18-methacrylamidooctadecyltrimethoxysilane
AMBTMS: 3-acrylamido-3-methylbutyltrimethoxysilane
4-PTMS: 4-pentenyltrimethoxysilane

TABLE 5

| | Type of PVA | Polymerization conditions | | | | modifier | | | |
|---|---|---|---|---|---|---|---|---|---|
| | | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) |
| Comparative Synthesis Example 2-1 | PVA2-32 | 1,500 | 500 | 0.8 | 3.0 | VMS | 11.29 | 1 | 73 |
| Comparative Synthesis Example 2-2 | PVA2-33 | 1,500 | 500 | 0.8 | 3.0 | VMS | 5.63 | 0.5 | 73 |
| Comparative Synthesis Example 2-3 | PVA2-34 | 1,500 | 500 | 0.8 | 3.0 | VMS | 4.5 | 0.5 | 58 |
| Comparative Synthesis Example 2-4 | PVA2-35 | 1,500 | 500 | 0.8 | 3.0 | VMS | 4.5 | 0.5 | 58 |
| Comparative Synthesis Example 2-5 | PVA2-36 | 1,500 | 643 | 0.4 | 2.6 | — | — | — | — |
| Comparative Synthesis Example 2-6 | PVA2-37 | 1,500 | 265 | 0.8 | 1.9 | VMS | 11.29 | 0.5 | 105 |
| Comparative Synthesis Example 2-7 | PVA2-38 | 1,500 | 265 | 0.8 | 1.9 | VMS | 2.25 | 0.1 | 105 |
| Comparative Synthesis Example 2-8 | PVA2-39 | 1,500 | 1,000 | 1.5 | 3.0 | VMS | 11.29 | 0.5 | 170 |
| Comparative Synthesis Example 2-9 | PVA2-40 | 1,500 | 1,000 | 1.5 | 3.0 | VMS | 6.76 | 0.3 | 170 |
| Comparative Synthesis Example 2-10 | PVA2-41 | 1,500 | 2,250 | 3.0 | 3.6 | VMS | 22.7 | 2 | 105 |
| Comparative Synthesis Example 2-11 | PVA2-42 | 1,500 | 2,250 | 3.0 | 3.6 | VMS | 11.29 | 1 | 105 |
| Comparative Synthesis Example 2-12 | PVA2-43 | 1,500 | 500 | 0.8 | 2.9 | MAmMTMS | 1.66 | 10 | 74 |
| Comparative Synthesis Example 2-13 | PVA2-44 | 1,500 | 500 | 0.8 | 2.9 | MAmMTMS | 0.66 | 4 | 73 |
| Comparative Synthesis Example 2-14 | PVA2-45 | 1,500 | 500 | 0.8 | 2.8 | AMPTMS | 1.86 | 10 | 81 |
| Comparative Synthesis Example 2-15 | PVA2-46 | 1,500 | 500 | 0.8 | 2.8 | AMPTMS | 0.74 | 4 | 81 |
| Comparative Synthesis Example 2-16 | PVA2-47 | 1,500 | 500 | 0.8 | 2.8 | MAmPTMS | 0.74 | 4 | 81 |
| Comparative Synthesis Example 2-17 | PVA2-48 | 1,500 | 500 | 0.8 | 2.8 | MAmPTMS | 0.37 | 2 | 81 |
| Comparative Synthesis Example 2-18 | PVA2-49 | 1,500 | 2,250 | 3.0 | 3.8 | MAmPTMS | 1.87 | 50 | 26 |
| Comparative Synthesis Example 2-19 | PVA2-50 | 1,500 | 167 | 0.8 | 1.9 | MAmPTMS | 0.37 | 1 | 130 |
| Comparative Synthesis Example 2-20 | PVA2-51 | 1,500 | 1,000 | 1.5 | 3.0 | MAmPTMS | 25.8 | 30 | 45 |
| Comparative Synthesis Example 2-21 | PVA2-52 | 1,500 | 265 | 0.8 | 2.1 | MAmPTMS | 11.5 | 40 | 105 |
| Comparative Synthesis Example 2-22 | PVA2-53 | 1,500 | 70 | 0.8 | 1.0 | MAmPTMS | 6.9 | 50 | 29 |

| | Saponification conditions | | Results of analyses | | | |
|---|---|---|---|---|---|---|
| | PVAc concentration (%) | NaOH molar ratio | viscosity average degree of polymerization (P) | percentage content (S)*2 (mol %) | P × S | degree of saponification (mol %) |
| Comparative Synthesis Example 2-1 | 30 | 0.03 | 1,700 | 0.5 | 850 | 98.4 |
| Comparative Synthesis Example 2-2 | 30 | 0.03 | 1,700 | 0.25 | 425 | 98.3 |
| Comparative Synthesis Example 2-3 | 30 | 0.03 | 1,700 | 0.2 | 340 | 98.7 |
| Comparative Synthesis Example 2-4 | 30 | 0.01 | 1,700 | 0.2 | 340 | 91.9 |
| Comparative Synthesis Example 2-5 | 30 | 0.02 | 1,700 | 0 | 0 | 98.5 |
| Comparative Synthesis Example 2-6 | 20 | 0.03 | 2,400 | 0.5 | 1,200 | 98.8 |
| Comparative Synthesis Example 2-7 | 20 | 0.03 | 2,400 | 0.1 | 240 | 98.1 |
| Comparative Synthesis Example 2-8 | 30 | 0.03 | 1,000 | 0.5 | 500 | 98.4 |

TABLE 5-continued

| | | | | | | |
|---|---|---|---|---|---|---|
| Comparative Synthesis Example 2-9 | 30 | 0.03 | 1,000 | 0.3 | 300 | 98.7 |
| Comparative Synthesis Example 2-10 | 35 | 0.03 | 500 | 1 | 500 | 98.2 |
| Comparative Synthesis Example 2-11 | 35 | 0.03 | 500 | 0.5 | 250 | 98.9 |
| Comparative Synthesis Example 2-12 | 30 | 0.03 | 1,700 | 0.5 | 850 | 98.1 |
| Comparative Synthesis Example 2-13 | 30 | 0.03 | 1,700 | 0.2 | 340 | 98.7 |
| Comparative Synthesis Example 2-14 | 30 | 0.03 | 1,700 | 0.5 | 850 | 98.6 |
| Comparative Synthesis Example 2-15 | 30 | 0.03 | 1,700 | 0.2 | 340 | 98.3 |
| Comparative Synthesis Example 2-16 | 33 | 0.03 | 1,700 | 0.2 | 340 | 98.7 |
| Comparative Synthesis Example 2-17 | 30 | 0.03 | 1,700 | 0.1 | 170 | 98.2 |
| Comparative Synthesis Example 2-18 | 35 | 0.04 | 500 | 0.5 | 250 | 98.4 |
| Comparative Synthesis Example 2-19 | 20 | 0.04 | 3,000 | 0.1 | 300 | 98.7 |
| Comparative Synthesis Example 2-20 | 30 | 0.04 | 1,000 | 6.5 | 6,500 | 98.5 |
| Comparative Synthesis Example 2-21 | 20 | 0.04 | 2,400 | 3.0 | 7,200 | 98.4 |
| Comparative Synthesis Example 2-22 | 15 | 0.04 | 4,000 | 1.8 | 7,200 | 98.3 |

*1Monomer A was directly charged without dilution with methanol.
*2Including the percentage content of the monomer unit having a silyl group other than the monomer unit having a group represented by the formula (1).
VMS: vinyltrimethoxysilane
MAmMTMS: methacrylamidomethyltrimethoxysilane
AMPTMS: 2-acrylamido-2-methylpropyltrimethoxysilane
MAmPTMS: 3-methacrylamidopropyltrimethoxysilane Examples 2-1 to 2-33 and Comparative Examples 2-1 to 2-24

Preparation of Aqueous PVA Solution (Coating Agent)

Using PVA2-1 to PVA2-53, aqueous PVA solutions (coating agents) were prepared so that the concentration and the pH as predetermined were attained. Viscosity stability of the aqueous PVA solution, water resistance of the coating film, water resistance of the coating film containing an inorganic substance, and binder force between the PVA and an inorganic substance were evaluated in accordance with evaluation methods identical to the aforementioned ones. The type of PVAs used and the pH of the aqueous solutions as well as the results of the evaluations are shown in Table 6.

TABLE 6

| | PVA aqueous solution used | | Evaluation results | | | |
|---|---|---|---|---|---|---|
| | Type of PVA | pH of aqueous solution | viscosity stability of PVA aqueous solution | water resistance of coating film | water resistance of coating film containing inorganic substance | binder force between PVA and inorganic substance |
| Example 2-1 | PVA2-1 | 6.0 | B | A | A | A |
| Example 2-2 | PVA2-2 | 5.5 | A | B | B | B |
| Example 2-3 | PVA2-3 | 7.0 | D | A | A | A |
| Example 2-4 | PVA2-3 | 8.5*1 | A | B | B | B |
| Example 2-5 | PVA2-3 | 3.5*2 | B | B | B | B |
| Example 2-6 | PVA2-4 | 7.0 | D | A | A | A |
| Example 2-7 | PVA2-5 | 6.0 | C | A | A | A |
| Example 2-8 | PVA2-6 | 6.1 | D | A | A | A |
| Example 2-9 | PVA2-7 | 6.0 | C | A | A | A |
| Example 2-10 | PVA2-8 | 6.0 | A | B | B | A |
| Example 2-11 | PVA2-9 | 6.0 | D | A | A | A |
| Example 2-12 | PVA2-10 | 6.0 | C | A | A | A |
| Example 2-13 | PVA2-11 | 6.0 | D | A | A | A |
| Example 2-14 | PVA2-12 | 6.0 | B | A | A | A |
| Example 2-15 | PVA2-13 | 6.0 | D | A | A | A |
| Example 2-16 | PVA2-14 | 6.2 | D | A | A | A |
| Example 2-17 | PVA2-15 | 7.0 | C | A | A | A |
| Example 2-18 | PVA2-16 | 7.0 | B | A | A | A |
| Example 2-19 | PVA2-17 | 6.0 | A | A | A | B |
| Example 2-20 | PVA2-18 | 8.0 | D | A | A | B |

TABLE 6-continued

| | PVA aqueous solution used | | Evaluation results | | | |
|---|---|---|---|---|---|---|
| | Type of PVA | pH of aqueous solution | viscosity stability of PVA aqueous solution | water resistance of coating film | water resistance of coating film containing inorganic substance | binder force between PVA and inorganic substance |
| Example 2-21 | PVA2-19 | 6.0 | A | C | B | C |
| Example 2-22 | PVA2-20 | 8.0 | B | C | A | C |
| Example 2-23 | PVA2-21 | 6.0 | A | B | A | A |
| Example 2-24 | PVA2-22 | 6.0 | B | B | B | A |
| Example 2-25 | PVA2-23 | 6.0 | A | C | B | B |
| Example 2-26 | PVA2-24 | 6.0 | A | B | B | A |
| Example 2-27 | PVA2-25 | 6.0 | A | A | A | A |
| Example 2-28 | PVA2-26 | 6.0 | B | A | A | A |
| Example 2-29 | PVA2-27 | 6.0 | A | S | A | A |
| Example 2-30 | PVA2-28 | 6.0 | B | S | A | A |
| Example 2-31 | PVA2-29 | 6.0 | D | S | A | C |
| Example 2-32 | PVA2-30 | 6.0 | A | B | A | A |
| Example 2-33 | PVA2-31 | 6.0 | C | A | A | A |
| Comparative Example 2-1 | PVA2-32 | 6.0 | —*3 | —*3 | —*3 | —*3 |
| Comparative Example 2-2 | PVA2-33 | 5.5 | B | E | E | C |
| Comparative Example 2-3 | PVA2-34 | 5.5 | A | E | E | D |
| Comparative Example 2-4 | PVA2-35 | 5.5 | A | E | E | D |
| Comparative Example 2-5 | PVA2-36 | 6.0 | A | E | E | E |
| Comparative Example 2-6 | PVA2-32 | 8.5*1 | A | E | E | D |
| Comparative Example 2-7 | PVA2-32 | 3.5*2 | B | E | E | D |
| Comparative Example 2-8 | PVA2-37 | 6.0 | —*3 | —*3 | —*3 | —*3 |
| Comparative Example 2-9 | PVA2-38 | 5.5 | B | E | E | C |
| Comparative Example 2-10 | PVA2-39 | 6.0 | E | D | D | C |
| Comparative Example 2-11 | PVA2-40 | 6.0 | A | E | E | D |
| Comparative Example 2-12 | PVA2-41 | 7.0 | D | E | D | D |
| Comparative Example 2-13 | PVA2-42 | 6.0 | A | E | E | E |
| Comparative Example 2-14 | PVA2-43 | 6.0 | E | C | B | B |
| Comparative Example 2-15 | PVA2-44 | 5.5 | A | D | D | C |
| Comparative Example 2-16 | PVA2-45 | 6.0 | D | C | C | C |
| Comparative Example 2-17 | PVA2-46 | 5.5 | A | D | D | C |
| Comparative Example 2-18 | PVA2-47 | 5.5 | A | C | D | B |
| Comparative Example 2-19 | PVA2-48 | 5.5 | A | D | D | C |
| Comparative Example 2-20 | PVA2-49 | 5.6 | A | D | D | D |
| Comparative Example 2-21 | PVA2-50 | 5.5 | A | D | C | B |
| Comparative Example 2-22 | PVA2-51 | 5.6 | E | A | A | A |
| Comparative Example 2-23 | PVA2-52 | 5.6 | —*3 | —*3 | —*3 | —*3 |
| Comparative Example 2-24 | PVA2-53 | 5.5 | —*3 | —*3 | —*3 | —*3 |

*1pH was adjusted by adding a small amount of ammonia when the aqueous solution was prepared.
*2pH was adjusted by adding a small amount of hydrochloric acid when the aqueous solution was prepared.
*3PVA was not completely dissolved in the aqueous solution.

As shown in Table 6, it can be seen that the PVAs obtained in Synthesis Examples 2-1 to 2-31 (PVA2-1 to 2-31) had sufficient solubility in water and viscosity stability, and the coating films produced therefrom had superior water resistance and binder performances (i.e., binder force). Regarding the evaluation criteria, for the viscosity stability, A to D suggested an evaluation as having practically sufficient viscosity stability, whereas for other three items, A to C or S and A to C, with B for at least one item of these, suggested an evaluation to be superior. Furthermore, aqueous solutions in Examples 2-1, 2-7, 2-9, 2-12, 2-14, 2-17 to 2-19, 2-23, 2-27 to 2-30, 2-32 and 2-33 in which the viscosity average degree of polymerization (P), the degree of saponification and the structure of the monomer unit of the PVA, and the percentage content (5) of the monomer unit, the product (P×S) of the viscosity average degree of polymerization (P) and the percentage content (S) of the PVA as well as the pH of the aqueous solution were as specified exhibited particularly superior viscosity stability, and the coating films produced therefrom were particularly excellent in water resistance and binder performances (i.e., binder force), with the evaluation criteria of: A to C for the viscosity stability; A or A and S for two or more items among the other three items; and B for the rest of the items. In addition, it can be seen that the viscosity stability of the aqueous solutions in, for example, Examples 2-2, 2-3, 2-6, 2-8, 2-10, 2-11, 2-13, 2-15, 2-16, 2-20 to 2-22 and 2-24 to 26, and the water resistance and the like of the coating films produced therefrom were slightly inferior. This may be attributed to a low viscosity average degree of polymerization (P) and/or a low degree of saponification, and/or a small or great product (P×S) of the viscosity average degree of polymerization (P) and the percentage content (S). In addition, it can be seen that the aqueous solutions in Examples 2-4 and 2-5 had an acidic or alkaline pH value, the water resistance and the binder force of the coating films were inferior. In addition, in Example 2-31, the alkylene group linking the silyl group and the main chain has a long chain of as many as 18 carbon atoms, and therefore it is presumed that interaction between the hydrophobic groups was too strong, leading to deterioration of the viscosity stability.

On the other hand, it can be seen that when the PVA did not satisfy the above specified requirements (Comparative Examples 2-1 to 2-24), the solubility in water and the viscosity stability of the PVA, as well as the water resistant performances and/or the binder performances (i.e., binder force) of the coating films produced therefrom were inferior. Moreover, in comparison of Example 2-1 (PVA2-1) with Comparative Example 2-14 (PVA2-43) and Comparative Example 2-16 (PVA2-45), it can be seen that although the pH of the aqueous solution, as well as the viscosity average degree of polymerization (P), the degree of saponification and the percentage content (S) of the PVA used were substantially the same, the coating film obtained in Example 2-1 resulted in more superior water resistance and binder force, and furthermore the solution according to Example 2-1 exhibited superior viscosity stability. Although the reasons for these findings are not sufficiently clarified, since the alkylene group having 3 or more carbon atoms which links the main chain to the silyl group is present in PVA2-1 according to Example 2-1, it is presumed that (1) high mobility of the silyl group leads to superior water resistance and binder force of the coating film, and furthermore (2) the alkylene group causes a reduction of the rate of hydrolysis of the Si—$R^2$ or inhibition of the reaction in the aqueous solution, leading to superior viscosity stability.

Example 2-34

Production of Coated Paper

Coated paper (coated article) was produced according to the following method, and surface strength, air resistance (sealability; hereinafter, may be also abbreviated as "air permeance") and water resistance of the coated paper thus produced were evaluated.

An aqueous solution of PVA2-1 (coating agent) having a concentration of 4% was applied by hand on a premium quality paper having a grammage of 60 g/m² (substrate) using a Mayer Bar so that the amount of the application was 0.5 g/m². Thereafter, the applied aqueous solution was dried at 110° C. for 1 min using a hot-air dryer and humidity conditioning was carried out at 20° C. and 65% RH for 72 hours, and subjected once to a supercalendar treatment under the conditions involving 150° C., 250 kg/cm and 10 m/min to obtain a coated paper according to Example 2-34. A surface strength measurement, an air permeance test and a water resistance test were carried out on the obtained coated paper in accordance with the method described below.

Surface Strength

Using an IGT printability tester (manufactured by Kumagai Riki Kogyo Co., Ltd.), the surface strength measurement was carried out on the obtained coated paper in accordance with JIS-P8129. More specifically, the measurement was carried out at a printing pressure of 25 kg/cm², and a printing speed (cm/sec) at which peeling occurred on the surface of the coated paper was defined as a surface strength. Thus, the surface strength on the surface of the coated paper was evaluated in accordance with the following criteria. It is to be noted that in carrying out the measurement with the IGT printability tester, IGT Pick oil M (manufactured by Dainippon Ink and Chemicals, Incorporated) was used, and a mechanism of spring drive B was employed A: 260 cm/sec or higher;

B: 220 cm/sec or higher and lower than 260 cm/sec;

C: 180 cm/sec or higher and lower than 220 cm/sec;

D: 120 cm/sec or higher and lower than 180 cm/sec; and

E: lower than 120 cm/sec.

Air Permeance (Sealability)

Air permeance (sealability) was measured in accordance with JIS-P8117 using an Oken type smoothness and air-permeability tester, and the evaluation was made in accordance with the following criteria:

A: 100,000 sec or higher;

B: 50,000 sec or higher and lower than 100,000 sec;

C: 30,000 sec or higher and lower than 50,000 sec;

D: 10,000 sec or higher and lower than 30,000 sec; and

E: lower than 10,000 sec.

Water Resistance (Wet Abrasion Resistance Test)

One ml of ion exchanged water at 20° C. was dripped on the coated surface of the coated paper, thereafter the wet portion was rubbed with fingertips, and the number of feelings of sliminess on the finger was counted and the evaluation was made in accordance with the following criteria:

S: 120 times or more;

A: 100 times or more and less than 120 times;

B: 50 times or more and less than 100 times;

C: 30 times or more and less than 50 times;

D: 10 times or more and less than 30 times; and

E: less than 10 times.

Examples 2-35 to 2-54 and Comparative Examples 2-25 to 2-37

Each coated paper was produced in a similar manner to Example 2-34 except that the PVA shown in Table 7 was used in place of PVA2-1 used in Example 2-34. Surface strength, air permeance and water resistance of the obtained coated paper were evaluated. The results are shown together in Table 7.

TABLE 7

| | Type of PVA | Evaluation results | | |
|---|---|---|---|---|
| | | surface strength | air permeance | water resistance |
| Example 2-34 | PVA2-1 | A | A | A |
| Example 2-35 | PVA2-2 | A | A | B |
| Example 2-36 | PVA2-6 | A | A | A |
| Example 2-37 | PVA2-8 | A | A | B |
| Example 2-38 | PVA2-9 | A | A | A |
| Example 2-39 | PVA2-11 | A | A | A |
| Example 2-40 | PVA2-13 | A | A | A |
| Example 2-41 | PVA2-14 | A | B | A |
| Example 2-42 | PVA2-16 | A | B | B |
| Example 2-43 | PVA2-17 | B | B | B |
| Example 2-44 | PVA2-18 | B | B | B |
| Example 2-45 | PVA2-19 | B | C | B |
| Example 2-46 | PVA2-22 | A | A | A |
| Example 2-47 | PVA2-23 | B | B | B |
| Example 2-48 | PVA2-25 | A | A | A |
| Example 2-49 | PVA2-26 | A | A | A |
| Example 2-50 | PVA2-27 | A | A | S |
| Example 2-51 | PVA2-28 | A | B | S |
| Example 2-52 | PVA2-29 | B | B | S |
| Example 2-53 | PVA2-30 | A | A | B |
| Example 2-54 | PVA2-31 | A | A | B |
| Comparative Example 2-25 | PVA2-32 | —*1 | —*1 | —*1 |
| Comparative Example 2-26 | PVA2-33 | C | E | D |
| Comparative Example 2-27 | PVA2-34 | D | E | D |
| Comparative Example 2-28 | PVA2-37 | —*1 | —*1 | —*1 |
| Comparative Example 2-29 | PVA2-38 | D | E | E |
| Comparative Example 2-30 | PVA2-39 | D | C | C |
| Comparative Example 2-31 | PVA2-41 | D | C | C |
| Comparative Example 2-32 | PVA2-43 | C | C | C |
| Comparative Example 2-33 | PVA2-49 | E | D | D |
| Comparative Example 2-34 | PVA2-50 | B | C | D |
| Comparative Example 2-35 | PVA2-51 | B | D | A |
| Comparative Example 2-36 | PVA2-52 | —*1 | —*1 | —*1 |
| Comparative Example 2-37 | PVA2-53 | —*1 | —*1 | —*1 |

*1 PVA was not completely dissolved in the aqueous solution.

As shown in Table 7, it can be seen that the coated papers produced using the coating agents according to Examples 2-34 to 2-54 had favorable surface strength, air permeance (i.e., sealability) and water resistance of the coated paper. Regarding the evaluation criteria, A to C or S and A to C for each evaluation item, and A to B or S and A to B for at least two items among the three items suggested an evaluation to be favorable. Furthermore, the coating agents in Examples 2-34 to 2-41, 2-46, 2-48, 2-49, 2-50, 2-51, 2-53 and 2-54 in which the viscosity average degree of polymerization (P), the degree of saponification and the structure of the monomer unit of the PVA, and the percentage content (S) of the monomer unit, the product (P×S) of the viscosity average degree of polymerization (P) and the percentage content (S) of the PVA were as specified exhibited particularly superior surface strength, air permeance (i.e., sealability) and water resistance of the coated paper, with the evaluation criteria of: A to B or S and A to B for one item; and A or A and S for two or more items. In addition, it can be seen that the coating agents in, for example, Examples 2-42 to 2-45, 2-47 and 2-52 resulted in slight deterioration of the surface strength, the air permeance (i.e., sealability) and the water resistance. It is believed that this is attributed to a low viscosity average degree of polymerization (P) and/or a low degree of saponification, and/or the difference of the structure of the monomer unit.

On the other hand, it can be seen that when the PVA did not satisfy the above specified requirements (Comparative Examples 2-25 to 2-37), the surface strength, the air permeance (i.e., sealability) and the water resistance of the coated paper were inferior. It is believed that this is attributed to the difference of the structure of the monomer unit, and/or a small or great product (P×S) of the viscosity average degree of polymerization (P) and the percentage content (S).

Ink Jet Recording Material

Ink jet recording materials were prepared using the PVA, and performances of the ink jet recording materials were evaluated in accordance with the following evaluation methods.

Synthesis Examples 3-1 to 3-21 and Comparative Synthesis Examples 3-1 to 3-15

Production of PVA3-1 to PVA3-36

PVA3-1 to PVA3-36 were produced in a similar manner to Synthesis Example 2-1 except that: polymerization conditions such as the amount of vinyl acetate and methanol charged, and the type and the amount of addition of the monomer A; and saponification conditions such as the concentration of PVAc, and the molar ratio of sodium hydroxide to vinyl acetate unit in saponification were changed as shown in Table 8 and Table 9. Results of analyses of each PVA obtained are shown in Table 8 and Table 9.

TABLE 8

| | | Polymerization conditions | | | | | | | |
|---|---|---|---|---|---|---|---|---|---|
| | | | | | | | | modifier | |
| | Type of PVA | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) |
| Synthesis Example 3-1 | PVA3-1 | 1,500 | 500 | 0.8 | 2.7 | MAmPTMS | 1.87 | 8 | 99 |
| Synthesis Example 3-2 | PVA3-2 | 1,500 | 500 | 0.8 | 2.7 | MAmPTMS | 0.93 | 5 | 79 |
| Synthesis Example 3-3 | PVA3-3 | 1,500 | 70 | 0.8 | 1.0 | MAmPTMS | 5.66 | 50 | 24 |

TABLE 8-continued

| | | | | | | | | | |
|---|---|---|---|---|---|---|---|---|---|
| Synthesis Example 3-4 | PVA3-4 | 1,500 | 70 | 0.8 | 1.0 | MAmPTMS | 0.37 | 1 | 80 |
| Synthesis Example 3-5 | PVA3-5 | 1,500 | 167 | 0.8 | 1.8 | MAmPTMS | 3.75 | 50 | 25 |
| Synthesis Example 3-6 | PVA3-6 | 1,500 | 265 | 0.8 | 2.1 | MAmPTMS | 3.75 | 20 | 70 |
| Synthesis Example 3-7 | PVA3-7 | 1,500 | 320 | 0.8 | 2.5 | MAmPTMS | 11.5 | 40 | 102 |
| Synthesis Example 3-8 | PVA3-8 | 1,500 | 1,000 | 1.5 | 3.0 | MAmPTMS | 23.75 | 30 | 41 |
| Synthesis Example 3-9 | PVA3-9 | 1,500 | 1,000 | 1.5 | 3.0 | MAmPTMS | 7.58 | 25 | 161 |
| Synthesis Example 3-10 | PVA3-10 | 1,500 | 1,000 | 1.5 | 3.0 | MAmPTMS | 1.87 | 8 | 124 |
| Synthesis Example 3-11 | PVA3-11 | 1,500 | 2,250 | 3.0 | 3.8 | MAmPTMS | 23.75 | 80 | 201 |
| Synthesis Example 3-12 | PVA3-12 | 1,500 | 2,250 | 3.0 | 3.8 | MAmPTMS | 3.75 | 50 | 51 |
| Synthesis Example 3-13 | PVA3-13 | 1,500 | 500 | 0.8 | 2.7 | MAmPTMS | 1.87 | 8 | 99 |
| Synthesis Example 3-14 | PVA3-14 | 1,500 | 500 | 0.8 | 2.7 | MAmPTMS | 1.87 | 8 | 99 |
| Synthesis Example 3-15 | PVA3-15 | 1,500 | 500 | 0.8 | 2.7 | MAmPTES | 2.18 | 10 | 93 |
| Synthesis Example 3-16 | PVA3-16 | 1,500 | 500 | 0.8 | 2.7 | MAmBTMS | 1.97 | 10 | 84 |
| Synthesis Example 3-17 | PVA3-17 | 1,500 | 500 | 0.8 | 2.7 | MAmOTMS | 2.34 | 10 | 100 |
| Synthesis Example 3-18 | PVA3-18 | 1,500 | 500 | 0.8 | 2.7 | MAmDDTMS | 2.82 | 10 | 119 |
| Synthesis Example 3-19 | PVA3-19 | 1,500 | 500 | 0.8 | 2.7 | MAmODTMS | 3.45 | 15 | 98 |
| Synthesis Example 3-20 | PVA3-20 | 1,500 | 500 | 0.8 | 2.7 | AMBTMS | 1.97 | 10 | 83 |
| Synthesis Example 3-21 | PVA3-21 | 1,500 | 500 | 0.8 | 2.7 | 4-PTMS | 14.49 | 1 | 65 |

| | Saponification conditions | | Results of analyses | | | |
|---|---|---|---|---|---|---|
| | | | viscosity average degree | | | |
| | PVAc concentration (%) | NaOH molar ratio — | of polymerization (P) — | percentage content (S) (mol %) | P × S — | degree of saponification (mol %) |
| Synthesis Example 3-1 | 30 | 0.04 | 1,700 | 0.5 | 850 | 98.6 |
| Synthesis Example 3-2 | 30 | 0.04 | 1,700 | 0.25 | 425 | 98.4 |
| Synthesis Example 3-3 | 15 | 0.04 | 4,000 | 1.5 | 6,000 | 98.4 |
| Synthesis Example 3-4 | 15 | 0.04 | 4,000 | 0.1 | 400 | 98.7 |
| Synthesis Example 3-5 | 20 | 0.04 | 3,000 | 1.0 | 3,000 | 98.8 |
| Synthesis Example 3-6 | 20 | 0.04 | 2,400 | 1.0 | 2,400 | 98.4 |
| Synthesis Example 3-7 | 20 | 0.04 | 2,000 | 2.9 | 5,800 | 98.8 |
| Synthesis Example 3-8 | 30 | 0.04 | 1,000 | 5.8 | 5,800 | 98.5 |
| Synthesis Example 3-9 | 30 | 0.04 | 1,000 | 2.0 | 2,000 | 98.6 |
| Synthesis Example 3-10 | 30 | 0.04 | 1,000 | 0.5 | 500 | 98.4 |
| Synthesis Example 3-11 | 35 | 0.04 | 500 | 6.0 | 3,000 | 98.8 |
| Synthesis Example 3-12 | 35 | 0.04 | 500 | 1.0 | 500 | 98.3 |
| Synthesis Example 3-13 | 30 | 0.01 | 1,700 | 0.5 | 850 | 93.5 |
| Synthesis Example 3-14 | 30 | 0.009 | 1,700 | 0.5 | 850 | 89.2 |
| Synthesis Example 3-15 | 30 | 0.04 | 1,700 | 0.5 | 850 | 98.5 |
| Synthesis Example 3-16 | 30 | 0.04 | 1,700 | 0.5 | 850 | 98.6 |

TABLE 8-continued

|  |  |  |  |  |  |  |
|---|---|---|---|---|---|---|
| Synthesis Example 3-17 | 30 | 0.04 | 1,700 | 0.5 | 850 | 98.4 |
| Synthesis Example 3-18 | 30 | 0.04 | 1,700 | 0.5 | 850 | 98.4 |
| Synthesis Example 3-19 | 30 | 0.04 | 1,700 | 0.5 | 850 | 98.5 |
| Synthesis Example 3-20 | 30 | 0.04 | 1,700 | 0.5 | 850 | 98.4 |
| Synthesis Example 3-21 | 30 | 0.04 | 1,700 | 0.5 | 850 | 98.7 |

*1Monomer A was directly charged without dilution with methanol.
MAmPTMS: 3-methacrylamidopropyltrimethoxysilane
MAmPTES: 3-methacrylamidopropyltriethoxysilane
MAmBTMS: 4-methacrylamidobutyltrimethoxysilane
MAmOTMS: 8-methacrylamidooctyltrimethoxysilane
MAmDDTMS: 12-methacrylamidododecyltrimethoxysilane
MAmODTMS: 18-methacrylamidooctadecyltrimethoxysilane
AMBTMS: 3-acrylamido-3-methylbuzyltrimethoxysilane
4-PTMS: 4-pentenyltrimethoxysilane

TABLE 9

| | | Polymerization conditions | | | | | modifier | | |
|---|---|---|---|---|---|---|---|---|---|
| | Type of PVA | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) |
| Comparative Synthesis Example 3-1 | PVA3-22 | 1,500 | 500 | 0.8 | 3.0 | VMS | 11.29 | 1 | 73 |
| Comparative Synthesis Example 3-2 | PVA3-23 | 1,500 | 500 | 0.8 | 3.0 | VMS | 5.63 | 0.5 | 73 |
| Comparative Synthesis Example 3-3 | PVA3-24 | 1,500 | 500 | 0.8 | 3.0 | VMS | 4.5 | 0.5 | 58 |
| Comparative Synthesis Example 3-4 | PVA3-25 | 1,500 | 643 | 0.4 | 2.6 | — | — | — | — |
| Comparative Synthesis Example 3-5 | PVA3-26 | 1,500 | 265 | 0.8 | 1.9 | VMS | 11.29 | 0.5 | 105 |
| Comparative Synthesis Example 3-6 | PVA3-27 | 1,500 | 265 | 0.8 | 1.9 | VMS | 2.25 | 0.1 | 105 |
| Comparative Synthesis Example 3-7 | PVA3-28 | 1,500 | 1,000 | 1.5 | 3.0 | VMS | 11.29 | 0.5 | 170 |
| Comparative Synthesis Example 3-8 | PVA3-29 | 1,500 | 2,250 | 3.0 | 3.6 | VMS | 22.7 | 2 | 105 |
| Comparative Synthesis Example 3-9 | PVA3-30 | 1,500 | 500 | 0.8 | 2.9 | MAmMTMS | 1.66 | 10 | 74 |
| Comparative Synthesis Example 3-10 | PVA3-31 | 1,500 | 500 | 0.8 | 2.8 | AMPTMS | 1.86 | 10 | 81 |
| Comparative Synthesis Example 3-11 | PVA3-32 | 1,500 | 2,250 | 3.0 | 3.8 | MAmPTMS | 1.87 | 50 | 26 |
| Comparative Synthesis Example 3-12 | PVA3-33 | 1,500 | 167 | 0.8 | 1.9 | MAmPTMS | 0.37 | 1 | 130 |
| Comparative Synthesis Example 3-13 | PVA3-34 | 1,500 | 1,000 | 1.5 | 3.0 | MAmPTMS | 25.8 | 30 | 45 |
| Comparative Synthesis Example 3-14 | PVA3-35 | 1,500 | 265 | 0.8 | 2.1 | MAmPTMS | 11.5 | 40 | 105 |
| Comparative Synthesis Example 3-15 | PVA3-36 | 1,500 | 70 | 0.8 | 1.0 | MAmPTMS | 6.9 | 50 | 29 |

| | Saponification conditions | | Results of analyses | | | |
|---|---|---|---|---|---|---|
| | PVAc concentration (%) | NaOH molar ratio | viscosity average degree of polymerization (P) | percentage content (S)*2 (mol %) | P × S | degree of saponification (mol %) |
| Comparative Synthesis Example 3-1 | 30 | 0.03 | 1,700 | 0.5 | 850 | 98.4 |

TABLE 9-continued

| | | | | | | |
|---|---|---|---|---|---|---|
| Comparative Synthesis Example 3-2 | 30 | 0.03 | 1,700 | 0.25 | 425 | 98.3 |
| Comparative Synthesis Example 3-3 | 30 | 0.03 | 1,700 | 0.2 | 340 | 98.7 |
| Comparative Synthesis Example 3-4 | 30 | 0.02 | 1,700 | 0 | 0 | 98.5 |
| Comparative Synthesis Example 3-5 | 20 | 0.03 | 2,400 | 0.5 | 1,200 | 98.8 |
| Comparative Synthesis Example 3-6 | 20 | 0.03 | 2,400 | 0.1 | 240 | 98.1 |
| Comparative Synthesis Example 3-7 | 30 | 0.03 | 1,000 | 0.5 | 500 | 98.4 |
| Comparative Synthesis Example 3-8 | 35 | 0.03 | 500 | 1 | 500 | 98.2 |
| Comparative Synthesis Example 3-9 | 30 | 3.03 | 1,700 | 0.5 | 850 | 98.1 |
| Comparative Synthesis Example 3-10 | 30 | 0.03 | 1,700 | 0.5 | 850 | 98.6 |
| Comparative Synthesis Example 3-11 | 35 | 0.04 | 500 | 0.5 | 250 | 98.4 |
| Comparative Synthesis Example 3-12 | 20 | 0.04 | 3,000 | 0.1 | 300 | 98.7 |
| Comparative Synthesis Example 3-13 | 30 | 0.04 | 1,000 | 6.5 | 6,500 | 98.5 |
| Comparative Synthesis Example 3-14 | 20 | 0.04 | 2,400 | 3.0 | 7,200 | 98.4 |
| Comparative Synthesis Example 3-15 | 15 | 0.04 | 4,000 | 1.8 | 7,200 | 98.3 |

*1 Monomer A was directly charged without dilution with methanol.
*2 Including the percentage content of the monomer unit having a silyl group other than the monomer unit having a group represented by the formula (1).
VMS: vinyltrimethoxysilane
MAmMTMS: methacrylamidomethyltrimethoxysilane
AMPTMS: 2-acrylamido-2-methylpropyltrimethoxysilane
MAmPTMS: 3-methacrylamidopropyltrimethoxysilane

Example 3-1

Production of Ink Jet Recording Material

A 10% aqueous solution of PVA3-1 was prepared. In addition, a 20% dispersion of silica in water was prepared by dispersing silica (manufactured by Grace: SYLOID P409) as a filler in water using a homomixer. To the dispersion of silica in water were added an aqueous solution of PVA3-1 having a concentration of 10% and a cationic resin (manufactured by Sumitomo Chemical Co., Ltd.: Sumirez resin 1001) so that the mass ratio of silica/PVA/cationic resin on the solid content basis was 100/10/3, and a necessary amount of water was added thereto, whereby a coating liquid for forming an ink-receiving layer (coating agent for an ink jet recording material) having a total solid content concentration of the silica, PVA and the cationic polymer of 14%. Next, the coating liquid for forming an ink-receiving layer thus prepared was applied on the surface of a paper (a premium quality paper having a grammage of 60 g/m$^2$) as a substrate at a rate of 11 g/m$^2$ in terms of solid content equivalent using a wire bar coater, and thereafter dried using a hot-air dryer at 100° C. for 3 min to obtain an ink jet recording material (ink jet recording paper).

Coating Film Strength of Ink-Receiving Layer

Using an IGT printability tester (manufactured by Kumagai Riki Kogyo Co., Ltd.), coating film strength was measured on the obtained ink jet recording paper in accordance with JIS-P8129. More specifically, the measurement was carried out at a printing pressure of 50 kg/cm$^2$, and the printing speed (cm/sec) at which peeling of the surface of the ink jet recording paper occurred was defined as a coating film strength. Thus, the coating film strength of the ink-receiving layer was evaluated in accordance with the following criteria. It is to be noted that in carrying out the measurement with the IGT printability tester, IGT Pick oil M (manufactured by Dainippon Ink and Chemicals, Incorporated) was used, and a mechanism of spring drive B was employed.

A: 260 cm/sec or higher;
B: 220 cm/sec or higher and lower than 260 cm/sec;
C: 180 cm/sec or higher and lower than 220 cm/sec; and
D: lower than 180 cm/sec.

Printing Unevenness

Halftone solid printing with black ink was carried out on the obtained ink jet recording paper using an ink-jet printer (manufactured by EPSON: PM-3300C), and printing unevenness in the obtained printed article was visually evaluated in accordance with the following criteria:

A: no printing unevenness being observed, with a favorable image produced;
B: printing unevenness being very slightly observed, without significant influence on the image;
C: printing unevenness partially occurred, with the quality of the image impaired; and
D: printing unevenness entirely occurred, with the quality of the image significantly impaired.

Water Resistance

Solid printing with black ink was carried out on the obtained ink jet recording paper using an ink-jet printer (manufactured by EPSON: PM-3300C) to obtain a printed article. One mL of water was dripped to a boundary portion of the solid printing using a syringe, and left to stand for 24 hours. Thereafter, a degree of blur of the printing was visually evaluated in accordance with the following criteria:

S: no blur was observed, and no blur was produced upon rubbing;
A: no blur was observed, but slight blur was produced upon rubbing;
B: blur was observed very slightly;
C: blur was observed partially; and
D: blur was observed entirely.

Examples 3-2 to 3-23 and Comparative Examples 3-1 to 3-15

Ink jet recording paper was produced in a similar manner to Example 3-1 except that the PVA shown in Table 10 was used in place of PVA3-1 used in Example 3-1; and a blending ratio of the PVA used and silica was changed as shown in Table 10. Coating film strength, printing unevenness and water resistance of each ink jet recording paper obtained were evaluated in accordance with the aforementioned method. The results are shown in Table 10.

TABLE 10

|  | Type of PVA | PVA/silica/ cationic resin (mass ratio) | coating film strength of ink-receiving layer | printing unevenness | water resistance |
|---|---|---|---|---|---|
| Example 3-1 | PVA3-1 | 10/100/3 | A | A | A |
| Example 3-2 | PVA3-2 | 10/100/3 | A | A | B |
| Example 3-3 | PVA3-3 | 5/100/3 | A | C | A |
| Example 3-4 | PVA3-4 | 5/100/3 | A | A | B |
| Example 3-5 | PVA3-5 | 5/100/3 | A | B | A |
| Example 3-6 | PVA3-6 | 5/100/3 | A | B | A |
| Example 3-7 | PVA3-7 | 5/100/3 | A | C | A |
| Example 3-8 | PVA3-8 | 5/100/3 | A | C | A |
| Example 3-9 | PVA3-9 | 10/100/3 | A | A | A |
| Example 3-10 | PVA3-10 | 15/100/3 | A | A | A |
| Example 3-11 | PVA3-11 | 15/100/3 | B | B | A |
| Example 3-12 | PVA3-12 | 20/100/3 | B | A | A |
| Example 3-13 | PVA3-13 | 10/100/3 | A | A | B |
| Example 3-14 | PVA3-14 | 10/100/3 | B | A | B |
| Example 3-15 | PVA3-15 | 10/100/3 | A | A | A |
| Example 3-16 | PVA3-16 | 10/100/3 | A | A | A |
| Example 3-17 | PVA3-17 | 10/100/3 | A | A | S |
| Example 3-18 | PVA3-18 | 10/100/3 | A | B | S |
| Example 3-19 | PVA3-19 | 10/100/3 | A | C | S |
| Example 3-20 | PVA3-2C | 10/100/3 | A | A | B |
| Example 3-21 | PVA3-21 | 10/100/3 | A | A | B |
| Example 3-22 | PVA3-1 | 7/100/3 | B | A | A |
| Example 3-23 | PVA3-1 | 5/100/3 | B | A | B |
| Comparative Example 3-1 | PVA3-22 | 10/100/3 | —*1 | —*1 | —*1 |
| Comparative Example 3-2 | PVA3-23 | 10/100/3 | C | C | B |
| Comparative Example 3-3 | PVA3-24 | 10/100/3 | D | C | C |
| Comparative Example 3-4 | PVA3-25 | 10/100/3 | D | D | D |
| Comparative Example 3-5 | PVA3-26 | 25/100/3 | —*1 | —*1 | —*1 |
| Comparative Example 3-6 | PVA3-27 | 25/100/3 | C | C | D |
| Comparative Example 3-7 | PVA3-28 | 10/100/3 | D | C | C |
| Comparative Example 3-8 | PVA3-29 | 10/100/3 | D | C | C |
| Comparative Example 3-9 | PVA3-30 | 10/100/3 | C | C | C |
| Comparative Example 3-10 | PVA3-31 | 10/100/3 | C | C | C |
| Comparative Example 3-11 | PVA3-32 | 25/100/3 | D | C | C |
| Comparative Example 3-12 | PVA3-33 | 10/100/3 | B | C | C |
| Comparative Example 3-13 | PVA3-34 | 5/100/3 | B | D | B |
| Comparative Example 3-11 | PVA3-35 | 5/100/3 | —*1 | —*1 | —*1 |
| Comparative Example 3-15 | PVA3-36 | 5/100/3 | —*1 | —*1 | —*1 |

*[1] PVA was not completely dissolved in the aqueous solution.

As shown in Table 10, it can be seen that the coating agents for an ink jet recording material used in Examples 3-1 to 3-23 resulted in superior coating film strength of the obtained ink jet recording material, even when the amount of PVA used with respect to silica was as small as about 5 to 20 parts; in addition, the coating agents for an ink jet recording material caused only slight printing unevenness upon the printing on the recording paper using the ink-jet printer; and additionally, the coating agents for an ink jet recording material imparted favorable water resistance. Regarding the evaluation criteria, A to C or S and A to C for each evaluation item, and A to B or S and A to B for at least two items among the three items suggested an evaluation to be favorable. Furthermore, the ink jet recording paper in Examples 3-1, 3-2, 3-4 to 3-6, 3-9, 3-10, 3-12, 3-13, 3-15 to 3-18, 3-20, 3-21 and 3-22 in which the viscosity average degree of polymerization (P), the degree of saponification and the structure of the monomer unit of the PVA, and the percentage content (S) of the monomer unit, the product (P×S) of the viscosity average degree of polymerization (P) and the percentage content (S) of the PVA as well as the blending ratio with the silica were as specified were evaluated to be particularly superior in terms of coating film strength, printing unevenness and water resistance, with the evaluation criteria of: A to B or S and A to B for one item; and A or A and S for two or more items. In addition, it can be seen that the evaluations of the ink jet recording materials according to, for example, Examples 3-3, 3-7, 3-8, 3-11, 3-14 and 3-19 in terms of the coating film strength, printing unevenness and water resistance suggested slightly worse results. This may be attributed to a low viscosity average degree of polymerization (P) and/or a low degree of saponification, and/or a small or great product (P×S) of the viscosity average degree of polymerization (P) and the percentage content (S), as well as the difference of the structure of the monomer unit, and the like. In addition, it can be seen that in Example 3-23, although the PVA used was identical to those in Examples 3-1 and 3-22, the coating film strength and the water resistance were inferior. Although detailed reasons for these findings are not clear, it is presumed that a low blending ratio of the PVA with respect to the silica led to impairment of the binder force, accompanied by aggregation of the silica.

On the other hand, it can be seen that when the PVA did not satisfy the above specified requirements (Comparative Examples 3-1 to 3-15), the coating film strength of the ink-receiving layer was deteriorated, evaluations on printing unevenness and water resistance suggested worse results, and solubility in water of the PVA itself was impaired. It is believed that this is attributed to impairment of the binder force and the water resistance due to the difference of the structure of the monomer unit, as well as a decrease in the product (P×S) of the viscosity average degree of polymerization (P) and the percentage content (S), and impairment of the handleability of the coating agent for an ink jet recording material due to an increase in (P×S), and the like.

Thermal Recording Material

Thermal recording materials were prepared using the PVAs, and performances of the thermal recording materials were evaluated in accordance with the following evaluation methods.

Synthesis Examples 4-1 to 4-21 and Comparative Synthesis Examples 4-1 to 4-15

Production of PVA4-1 to PVA4-36

PVA4-1 to PVA4-36 were produced in a similar manner to Synthesis Example 2-1 except that: polymerization conditions such as the amount of vinyl acetate and methanol charged, and the type and the amount of addition of the monomer A; and saponification conditions such as the concentration of PVAc, and the molar ratio of sodium hydroxide to vinyl acetate unit in saponification were changed as shown in Table 11 and Table 12. Results of analyses of each PVA obtained are shown in Table 11 and Table 12.

TABLE 11

| | | Polymerization conditions | | | | | | | Saponification conditions | | | Results of analyses | | | |
|---|---|---|---|---|---|---|---|---|---|---|---|---|---|---|---|
| | Type of PVA | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) | PVAc concentration (%) | NaOH molar ratio | viscosity average degree of polymerization (P) | percentage content (S) (mol %) | P × S | degree of saponification (mol %) |
| Synthesis Example 4-1 | PVA4-1 | 1,500 | 500 | 0.8 | 2.7 | MAmPTMS | 1.87 | 8 | 99 | 30 | 0.04 | 1,700 | 0.5 | 850 | 98.6 |
| Synthesis Example 4-2 | PVA4-2 | 1,500 | 500 | 0.8 | 2.7 | MAmPTMS | 0.93 | 5 | 79 | 30 | 0.04 | 1,700 | 0.25 | 425 | 98.4 |
| Synthesis Example 4-3 | PVA4-3 | 1,500 | 70 | 0.8 | 1.0 | MAmPTMS | 5.66 | 50 | 24 | 15 | 0.04 | 4,000 | 1.5 | 6,000 | 98.4 |
| Synthesis Example 4-4 | PVA4-4 | 1,500 | 70 | 0.8 | 1.0 | MAmPTMS | 0.37 | 1 | 80 | 15 | 0.04 | 4,000 | 0.1 | 400 | 98.7 |
| Synthesis Example 4-5 | PVA4-5 | 1,500 | 167 | 0.8 | 1.8 | MAmPTMS | 3.75 | 50 | 25 | 20 | 0.04 | 3,000 | 1.0 | 3,000 | 98.8 |
| Synthesis Example 4-6 | PVA4-6 | 1,500 | 265 | 0.8 | 2.1 | MAmPTMS | 3.75 | 20 | 70 | 20 | 0.04 | 2,400 | 1.0 | 2,400 | 98.4 |
| Synthesis Example 4-7 | PVA4-7 | 1,500 | 320 | 0.8 | 2.5 | MAmPTMS | 11.5 | 40 | 102 | 20 | 0.04 | 2,000 | 2.9 | 5,800 | 98.8 |
| Synthesis Example 4-8 | PVA4-8 | 1,500 | 1,000 | 1.5 | 3.0 | MAmPTMS | 23.75 | 30 | 41 | 30 | 0.04 | 1,000 | 5.8 | 5,800 | 98.5 |
| Synthesis Example 4-9 | PVA4-9 | 1,500 | 1,000 | 1.5 | 3.0 | MAmPTMS | 7.58 | 25 | 161 | 30 | 0.04 | 1,000 | 2.0 | 2,000 | 98.6 |
| Synthesis Example 4-10 | PVA4-10 | 1,500 | 1,000 | 1.5 | 3.0 | MAmPTMS | 1.87 | 8 | 124 | 30 | 0.04 | 1,000 | 0.5 | 500 | 98.4 |
| Synthesis Example 4-11 | PVA4-11 | 1,500 | 2,250 | 3.0 | 3.8 | MAmPTMS | 23.75 | 80 | 201 | 35 | 0.04 | 500 | 6.0 | 3,000 | 96.8 |
| Synthesis Example 4-12 | PVA4-12 | 1,500 | 2,250 | 3.0 | 3.8 | MAmPTMS | 3.75 | 50 | 51 | 35 | 0.04 | 500 | 1.0 | 500 | 98.3 |

TABLE 11-continued

| | Type of PVA | Polymerization conditions | | | | modifier | | | | Saponification conditions | | Results of analyses | | | |
|---|---|---|---|---|---|---|---|---|---|---|---|---|---|---|---|
| | | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) | PVAc concentration (%) | NaOH molar ratio | viscosity average degree of polymerization (P) | percentage content (S) (mol %) | P × S | degree of saponification (mol %) |
| Synthesis Example 4-13 | PVA4-13 | 1,500 | 500 | 0.8 | 2.7 | MAmPTMS | 1.87 | 8 | 99 | 30 | 0.01 | 1,700 | 0.5 | 850 | 93.5 |
| Synthesis Example 4-14 | 9VA4-14 | 1,500 | 500 | 0.8 | 2.7 | MAmPTMS | 1.87 | 8 | 99 | 30 | 0.009 | 1,700 | 0.5 | 850 | 89.2 |
| Synthesis Example 4-15 | PVA4-15 | 1,500 | 500 | 0.8 | 2.7 | MAmPTES | 2.18 | 10 | 93 | 30 | 0.04 | 1,700 | 0.5 | 850 | 98.5 |
| Synthesis Example 4-16 | PVA4-16 | 1,500 | 500 | 0.8 | 2.7 | MAmBTMS | 1.97 | 10 | 84 | 30 | 0.04 | 1,700 | 0.5 | 850 | 98.6 |
| Synthesis Example 4-17 | PVA4-17 | 1,500 | 500 | 0.8 | 2.7 | MAmOTMS | 2.34 | 10 | 100 | 30 | 0.04 | 1,700 | 0.5 | 850 | 98.4 |
| Synthesis Example 4-18 | PVA4-18 | 1,500 | 500 | 0.8 | 2.7 | MAmDDTMS | 2.82 | 10 | 119 | 30 | 0.04 | 1,700 | 0.5 | 850 | 98.4 |
| Synthesis Example 4-19 | PVA4-19 | 1,500 | 500 | 0.8 | 2.7 | MAmODTMS | 3.45 | 15 | 98 | 30 | 0.04 | 1,700 | 0.5 | 850 | 98.5 |
| Synthesis Example 4-20 | PVA4-20 | 1,500 | 500 | 0.8 | 2.7 | AMBTMS | 1.97 | 10 | 83 | 30 | 0.04 | 1,700 | 0.5 | 850 | 98.4 |
| Synthesis Example 4-21 | PVA4-21 | 1,500 | 500 | 0.9 | 2.7 | 4-PTMS | 14.49 | 1 | 65 | 30 | 0.04 | 1,700 | 0.5 | 850 | 98.7 |

*1Monomer A was directly charged without dilution with methanol.
MAmPTMS: 3-methacrylamidopropyltrimethoxysilane
MAmPTES: 3-methacrylamidopropyltriethoxysilane
MAmBTMS: 4-methacrylamidobutyltrimethoxysilane
MAmOTMS: 8-methacrylamidooctyltrimethoxysilane
MAmDDTMS: 12-methacrylamidododecyltrimethoxysilane
MAmODTMS: 18-methacrylamidooctadecyltrimethoxysilane
AMBTMS: 3-acrylamido-3-methylbutyltrimethoxysilane
4-PTMS: 4-pentenyltrimethoxysilane

TABLE 12

| | | Polymerization conditions | | | | | | |
|---|---|---|---|---|---|---|---|---|
| | | | | | | | modifier | |
| | Type of PVA | vinyl acetate (g) | methanol (g) | amount of initially added initiator (g) | polymerization time (h) | monomer A | initially added amount (g) *1 | concentration of sequentially added liquid (methanol liquid) (%) |
| Comparative Synthesis Example 4-1 | PVA4-22 | 1,500 | 500 | 0.8 | 3.0 | VMS | 11.29 | 1 |
| Comparative Synthesis Example 4-2 | PVA4-23 | 1,500 | 500 | 0.8 | 3.0 | VMS | 5.63 | 0.5 |
| Comparative Synthesis Example 4-3 | PVA4-24 | 1,500 | 500 | 0.8 | 3.0 | VMS | 4.5 | 0.5 |
| Comparative Synthesis Example 4-4 | PVA4-25 | 1,500 | 643 | 0.4 | 2.6 | — | — | — |
| Comparative Synthesis Example 4-5 | PVA4-26 | 1,500 | 265 | 0.8 | 1.9 | VMS | 11.29 | 0.5 |
| Comparative Synthesis Example 4-6 | PVA4-27 | 1,500 | 265 | 0.8 | 1.9 | VMS | 2.25 | 0.1 |
| Comparative Synthesis Example 4-7 | PVA4-28 | 1,500 | 1,000 | 1.5 | 3.0 | VMS | 11.29 | 0.5 |
| Comparative Synthesis Example 4-9 | PVA4-29 | 1,500 | 2,250 | 3.0 | 3.6 | VMS | 22.7 | 2 |
| Comparative Synthesis Example 4-9 | PVA4-30 | 1,500 | 500 | 0.8 | 2.9 | MAmMTMS | 1.66 | 10 |
| Comparative Synthesis Example 4-10 | PVA4-31 | 1,500 | 500 | 0.8 | 2.8 | AMPTMS | 1.86 | 10 |
| Comparative Synthesis Example 4-11 | PVA4-32 | 1,500 | 2,250 | 3.0 | 3.8 | MAmPTMS | 1.87 | 50 |
| Comparative Synthesis Example 4-12 | PVA4-33 | 1,500 | 167 | 0.8 | 1.9 | MAmPTMS | 0.37 | 1 |
| Comparative Synthesis Example 4-13 | PVA4-34 | 1,500 | 1,000 | 1.5 | 3.0 | MAmPTMS | 25.8 | 30 |
| Comparative Synthesis Example 4-14 | PVA4-35 | 1,500 | 265 | 0.8 | 2.1 | MAmPTMS | 11.5 | 40 |
| Comparative Synthesis Example 4-15 | PVA4-36 | 1,500 | 70 | 0.8 | 1.0 | MAmPTMS | 6.9 | 50 |

| | Polymerization conditions | Saponification conditions | | viscosity average | Results of analyses | | | |
|---|---|---|---|---|---|---|---|---|
| | modifier sequentially added amount (g) | PVAc concentration (%) | NaOH molar ratio | degree of polymerization (P) | percentage content (S) *2 (mol %) | P × S | | degree of saponification (mol %) |
| Comparative Synthesis Example 4-1 | 73 | 30 | 0.03 | 1,700 | 0.5 | 850 | | 98.4 |
| Comparative Synthesis Example 4-2 | 73 | 30 | 0.03 | 1,700 | 0.25 | 425 | | 98.3 |
| Comparative Synthesis Example 4-3 | 58 | 30 | 0.03 | 1,700 | 0.2 | 340 | | 98.7 |
| Comparative Synthesis Example 4-4 | — | 30 | 0.02 | 1,700 | 0 | 0 | | 98.5 |
| Comparative Synthesis Example 4-5 | 105 | 20 | 0.03 | 2,400 | 0.5 | 1,200 | | 98.8 |
| Comparative Synthesis Example 4-6 | 105 | 20 | 0.03 | 2,400 | 0.1 | 240 | | 98.1 |
| Comparative Synthesis Example 4-7 | 170 | 30 | 0.03 | 1,000 | 0.5 | 500 | | 98.4 |
| Comparative Synthesis Example 4-9 | 105 | 35 | 0.03 | 500 | 1 | 500 | | 98.2 |
| Comparative Synthesis Example 4-9 | 74 | 30 | 0.03 | 1,700 | 0.5 | 850 | | 98.1 |
| Comparative Synthesis Example 4-10 | 81 | 30 | 0.03 | 1,700 | 0.5 | 850 | | 98.6 |
| Comparative Synthesis Example 4-11 | 26 | 35 | 0.04 | 500 | 0.5 | 250 | | 98.4 |
| Comparative Synthesis Example 4-12 | 130 | 20 | 0.04 | 3,000 | 0.1 | 300 | | 98.7 |
| Comparative Synthesis Example 4-13 | 45 | 30 | 0.04 | 1,000 | 6.5 | 6,500 | | 98.5 |
| Comparative Synthesis Example 4-14 | 105 | 20 | 0.04 | 2,400 | 3.0 | 7,200 | | 98.4 |
| Comparative Synthesis Example 4-15 | 29 | 15 | 0.04 | 4,000 | 1.8 | 7,200 | | 98.3 |

*1: Monomer A was directly charged without dilution with methanol.
*2: Including the percentage content of the monomer unit having a silyl group other than the monomer unit having a group represented by the formula (1).
VMS: vinyltrimethoxysilane
MAmMTMS: methacrylamidomethyltrimethoxysilane
AMPTMS: 2-acrylamido-2-methylpropyltrimethoxysilane
MAmPTMS: 3-methacrylamidopropyltrimethoxysilane

Example 4-1

Production of Thermal Recording Material

A thermal recording paper (thermal recording material) was produced in accordance with the following methods, and water resistance and resistance to plasticizers thereof were evaluated.

(1) Preparation of Each Aqueous Dispersion of Thermal Dye, Color Developer and Pigment Composition of Aqueous Dispersion A of Thermal Dye
  Leuco dye (manufactured by Yamamoto Chemicals Inc., trade name: OBD-2): 20%
  Aqueous solution of PVA (manufactured by Kuraray Co., Ltd.: PVA 203) having a concentration of 10%: 20%
  Water: 60%

Composition of Aqueous Dispersion B of Color Developer
  Color developer (manufactured by Nippon Soda Co., Ltd.: D-8): 20%
  Aqueous solution of PVA (manufactured by Kuraray Co., Ltd.: PVA 203) having a concentration of 10%: 20%
  Water: 60%

Composition of Aqueous Dispersion C of Pigment
  Stearic acid amide: 10%
  Calcined kaolin: 20%
  Aqueous solution of PVA (manufactured by Kuraray Co., Ltd.: PVA 205) having a concentration of 5%: 30%
  Water: 40%

The aqueous dispersion A, the aqueous dispersion B and the aqueous dispersion C each having the aforementioned composition were separately prepared, and each pre-stirred in a beaker for 15 min.

Next, the aqueous dispersion A was transferred into a sand grinder (manufactured by Kansai Paint Co., Ltd.: batch-type desktop sand grinder), to which 300 mL of glass beads (soda-quartz glass beads having a diameter of 0.5 mm) were added, and the mixture was rotated at a high revolution (2,170 rpm) under cooling conditions for 6 hours to disperse the dispersoid. The dispersoid particle size of the obtained aqueous dispersion A of the thermal dye was analyzed using a laser diffraction-type particle size analyzer (manufactured by Shimadzu Corporation: SALD-1000) and found to be 0.46 μm. In addition, the degree of whiteness of the aqueous dispersion A was analyzed using a color-difference meter (manufactured by Nippon Denshoku Industries Co., Ltd.: Z-1001DP), and found to be −8.1. Regarding the degree of whiteness, 0 means being completely white, and a larger minus value means being colored to a larger extent.

In a similar manner, the aqueous dispersion B was transferred into the sand grinder, to which 300 mL of glass beads (soda-quartz glass beads having a diameter of 0.5 mm) were added, and the mixture was rotated at a high revolution (2,170 rpm) under cooling conditions for 6 hours to disperse the dispersoid.

In addition, the aqueous dispersion C was transferred into a homogenizer, and its dispersoid was dispersed at a revolution of 10,000 rpm for 2 min.

(2) Preparation of Coating Agent for Thermal Coloring Layer

Two parts of the aqueous dispersion A, 4 parts of the aqueous dispersion B, 2 parts of the aqueous dispersion C and 2 parts of a 10% aqueous solution of PVA 117 (manufactured by Kuraray Co., Ltd.) were mixed and the mixture was stirred, to which a necessary amount of water was added to prepare a coating agent for a thermal coloring layer having a solid content concentration of 21%.

(3) Preparation of Coating Agent for Overcoat Layer

To 0.2 parts of an ethylene glycol-propylene glycol copolymer (manufactured by NOF Corporation: Pronon 104) and 50 parts of silica (manufactured by Shionogi & Co., Ltd.: Carplex CS-5) were added 72.5 parts of water. To the mixture were slowly added 828 parts of a 10% aqueous solution of PVA4-1 at room temperature while sufficiently dispersing it. Thereafter, 7.5 parts of a zinc stearate dispersion (manufactured by Chukyo Yushi Co., Ltd., Hidorin 2730; having a solid content concentration of 30%) were further added thereto to prepare a silica-dispersed aqueous solution of PVA4-1. To the silica-dispersed aqueous solution of PVA4-1 thus obtained a necessary amount of water was added to prepare a coating agent for an overcoat layer having a solid content concentration of 12.

(4) Production of Thermal Recording Paper

The coating agent for a thermal coloring layer prepared in the above section (2) was applied on the surface of a base paper (a premium quality paper having a grammage of 52 g/m$^2$) in an amount of 6 g/m$^2$ in terms of solid content equivalent using a wire bar coater, and dried at 50° C. for 5 min. The obtained coated paper was surface-treated with a supercalendar (linear pressure: 30 kg/cm). Then, the coating agent for an overcoat layer prepared in the above section (3) was applied on the surface of the coated paper in an amount of 3 g/m$^2$ in terms of solid content equivalent using a wire bar coater, and dried at 50° C. for 10 min. Furthermore, the coated paper was surface-treated with a supercalendar (linear pressure: 30 kg/cm) to produce a thermal recording paper.

Immediately after the production of the thermal recording paper, the thermal recording paper was subjected to printing using a thermal printer for facsimiles (manufactured by Ricoh Company, Ltd.: RIFAX 300) to produce a printed article, and water resistance and resistance to plasticizers of the printed article were evaluated in accordance with the following methods. The results are shown in Table 13.

Water Resistance

The printed thermal recording paper (printed article) was immersed in distilled water at 30° C. for 24 hours, and the recording density and the wet abrasion resistance thereof were evaluated in accordance with the following methods.

Recording Density

The color density of the printed area was measured using a Macbeth densitometer (manufactured by Macbeth, model: RD-514) before and after the immersion in distilled water. A smaller decrease of the color density of the printed area after the immersion in distilled water as compared with the color density of the printed area before the immersion in distilled water was considered to be an indicative of more excellent water resistance of the thermal recording paper, and the color density of the printed area was evaluated on a 5-point scale of A to E with A indicating the most excellent water resistance and E indicating the poorest water resistance.

Wet Abrasion Resistance Test

After the immersion in distilled water, the surface of the printed area was rubbed with fingertips, and the state of elution of the overcoat layer of the thermal recording paper was observed. Less elution of the overcoat layer of the thermal recording paper was considered to be an indicative of excellent water resistance of the thermal recording paper, and the state of elution was evaluated on a 5-point scale of S to E with A indicating the most excellent water resistance and E indicating the poorest water resistance.

Resistance to Plasticizers

A soft polyvinyl chloride film (containing a plasticizer) was overlaid on the printed thermal recording paper (printed article), and the both were brought into contact at 30° C. for 24 hours under a load of 300 g/m$^2$. The color density of the printed area was measured using a Macbeth densitometer (manufactured by Macbeth, model: RD-514) before and after the contact. A smaller decrease of the color density of the printed area after the contact as compared with the color density of the printed area before the contact was considered to be an indicative of the thermal recording paper exhibiting more excellent resistance to plasticizers, and the color density of the printed area was evaluated on a 5-point scale of A to E with A indicating the most excellent resistance to plasticizers and E indicating the poorest resistance to plasticizers.

Examples 4-2 to 4-21 and Comparative Examples 4-1 to 4-15

Thermal recording papers were produced in a similar manner to Example 4-1 except that the PVA shown in Table 13 was used in place of PVA4-1 used in the overcoat layer in Example 4-1, and water resistance and resistance to plasticizers thereof were evaluated. The results are shown together in Table 13.

TABLE 13

| PVA used in overcoat layer | recording density | wet abrasion resistance | resistance to plasticizers |
|---|---|---|---|
| Example 4-1 | PVA4-1 | A | A | A |
| Example 4-2 | PVA4-2 | B | B | A |
| Example 4-3 | PVA4-3 | B | C | A |
| Example 4-4 | PVA4-4 | B | B | A |
| Example 4-5 | PVA4-5 | B | B | A |
| Example 4-6 | PVA4-6 | A | B | A |
| Example 4-7 | PVA4-7 | B | C | A |
| Example 4-8 | PVA4-8 | B | C | A |
| Example 4-9 | PVA4-9 | A | A | A |
| Example 4-10 | PVA4-10 | A | A | A |
| Example 4-11 | PVA4-11 | B | B | B |
| Example 4-12 | PVA4-12 | B | B | B |
| Example 4-13 | PVA4-13 | A | A | B |
| Example 4-14 | PVA4-14 | B | B | B |
| Example 4-15 | PVA4-15 | A | A | A |
| Example 4-16 | PVA4-16 | A | A | A |
| Example 4-17 | PVA4-17 | A | S | A |
| Example 4-18 | PVA4-18 | A | S | B |
| Example 4-19 | PVA4-19 | A | S | B |
| Example 4-20 | PVA4-20 | A | B | A |
| Example 4-21 | PVA4-21 | A | B | B |
| Comparative Example 4-1 | PVA4-22 | —*1 | —*1 | —*1 |
| Comparative Example 4-2 | PVA4-23 | D | D | D |
| Comparative Example 4-3 | PVA4-24 | D | D | D |
| Comparative Example 4-4 | PVA4-25 | E | E | E |
| Comparative Example 4-5 | PVA4-26 | —*1 | —*1 | —*1 |
| Comparative Example 4-6 | PVA4-27 | D | E | D |
| Comparative Example 4-7 | PVA4-28 | C | C | B |
| Comparative Example 4-8 | PVA4-29 | C | C | B |
| Comparative Example 4-9 | PVA4-30 | C | C | B |
| Comparative Example 4-10 | PVA4-31 | C | C | B |
| Comparative Example 4-11 | PVA4-32 | C | D | C |
| Comparative Example 4-12 | PVA4-33 | C | C | B |
| Comparative Example 4-13 | PVA4-34 | D | D | C |
| Comparative Example 4-14 | PVA4-35 | —*1 | —*1 | —*1 |
| Comparative Example 4-15 | PVA4-36 | —*1 | —*1 | —*1 |

*1PVA was not completely dissolved in the aqueous solution.

As shown in Table 13, it can be seen that when the coating agents according to Examples 4-1 to 4-21 were used to provide an overcoat layer and produce thermal recording papers, the water resistance and the resistance to plasticizers of the thermal recording paper were favorable even when PVA was used alone without a crosslinking agent. Regarding the evaluation criteria, A to C or S and A to C for each evaluation item, and A to B or S and A to B for at least two items among the three items suggested an evaluation to be favorable. Furthermore, the thermal recording papers in Examples 4-1, 4-2, 4-4 to 4-6, 4-9, 4-10, 4-13, 4-15 to 4-18, 4-19 and 4-20 in which the viscosity average degree of polymerization (P), the degree of saponification and the structure of the monomer unit of the PVA, the percentage content (S) of the monomer unit, and the product (P×S) of the viscosity average degree of polymerization (P) and the percentage content (S) of the PVA were as specified exhibited particularly superior water resistance and resistance to plasticizers, with the evaluation criteria of: A to B or S and A to B for the wet abrasion resistance and the resistance to plasticizers; and A or A and S for either one of the two items. In addition, it can be seen that the thermal recording papers in, for example, Examples 4-3, 4-7, 4-8, 4-11, 4-12, 4-14 and 4-21 resulted in slight deterioration of the water resistance and the resistance to plasticizers. This may be attributed to a low viscosity average degree of polymerization (P) and/or a low degree of saponification, and/or a small or great product (P×S) of the viscosity average degree of polymerization (P) and the percentage content (S), as well as the difference of the structure of the monomer unit. In particular, in regard to Examples 4-3, 4-7 and 4-8, it is believed that the coating agent has a high viscosity due to a large value of the product (P×S) of the viscosity average degree of polymerization (P) and the percentage content (S), and is unlikely to penetrate into paper (substrate), leading to deterioration of the wet abrasion resistance performances, although detailed reason for this are not clear.

On the other hand, it can be seen that when the PVA did not satisfy the above specified requirements (Comparative Examples 4-1 to 4-15), the water resistance and the resistance to plasticizers of the thermal recording paper were deteriorated, or the solubility in water of the PVA itself was decreased. It is believed that this is attributed to impairment of the water resistant due to the difference of the structure of the monomer unit and a decrease in the product (P×S) of the viscosity average degree of polymerization (P) and the percentage content (5), as well as impairment of the handleability of the coating agent due to an increase in (P×S), and the like.

Base Paper for Release Paper

Further, base papers for a release paper were prepared using the PVAs, and performances of the base paper for a release paper were evaluated in accordance with the following evaluation methods.

Synthesis Examples 5-1 to 5-21 and Comparative Synthesis Examples 5-1 to 5-15

Production of PVA5-1 to PVA5-36

PVA5-1 to PVA5-36 were produced in a similar manner to Synthesis Example 2-1 except that: polymerization conditions such as the amount of vinyl acetate and methanol charged, and the type and the amount of addition of the monomer A; and saponification conditions such as the concentration of PVAc, and the molar ratio of sodium hydroxide to vinyl acetate unit in saponification were changed as shown in Table 14 and Table 15. Results of analyses of each PVA obtained are shown in Table 14 and Table 15.

TABLE 14

| | Type of PVA | Polymerization conditions | | | | | | | |
|---|---|---|---|---|---|---|---|---|---|
| | | vinyl acetate (g) | methanol (g) | amount of initially added initiator (g) | polymerization time (h) | modifier | | | |
| | | | | | | monomer A | initially added amount (g)*1 | concentration of sequentially added liquid (methanol liquid) (%) | sequentially added amount (g) |
| Synthesis Example 5-1 | PVA5-1 | 1,500 | 500 | 0.8 | 2.7 | MAmPTMS | 1.87 | 8 | 99 |
| Synthesis Example 5-2 | PVA5-2 | 1,500 | 500 | 0.8 | 2.7 | MAmPTMS | 0.93 | 5 | 79 |
| Synthesis Example 5-3 | PVA5-3 | 1,500 | 70 | 0.8 | 1.0 | MAmPTMS | 5.66 | 50 | 24 |
| Synthesis Example 5-4 | PVA5-4 | 1,500 | 70 | 0.8 | 1.0 | MAmPTMS | 0.37 | 1 | 80 |
| Synthesis Example 5-5 | PVA5-5 | 1,500 | 167 | 0.8 | 1.8 | MAmPTMS | 3.75 | 50 | 25 |
| Synthesis Example 5-6 | PVA5-6 | 1,500 | 265 | 0.8 | 2.1 | MAmPTMS | 3.75 | 20 | 70 |
| Synthesis Example 5-7 | PVA5-7 | 1,500 | 320 | 0.8 | 2.5 | MAmPTMS | 11.5 | 40 | 102 |
| Synthesis Example 5-8 | PVA5-8 | 1,500 | 1,000 | 1.5 | 3.0 | MAmPTMS | 23.75 | 30 | 41 |
| Synthesis Example 5-9 | PVA5-9 | 1,500 | 1,000 | 1.5 | 3.0 | MAmPTMS | 7.58 | 25 | 161 |
| Synthesis Example 5-10 | PVA5-10 | 1,500 | 1,000 | 1.5 | 3.0 | MAmPTMS | 1.87 | 8 | 124 |
| Synthesis Example 5-11 | PVA5-11 | 1,500 | 2,250 | 3.0 | 3.8 | MAmPTMS | 23.75 | 80 | 201 |
| Synthesis Example 5-12 | PVA5-12 | 1,500 | 2,250 | 3.0 | 3.8 | MAmPTMS | 3.75 | 50 | 51 |
| Synthesis Example 5-13 | PVA5-13 | 1,500 | 500 | 0.8 | 2.7 | MAmPTMS | 1.87 | 8 | 99 |
| Synthesis Example 5-14 | PVA5-14 | 1,500 | 500 | 0.8 | 2.7 | MAmPTMS | 1.87 | 8 | 99 |
| Synthesis Example 5-15 | PVA5-15 | 1,500 | 500 | 0.8 | 2.7 | MAmPTES | 2.18 | 10 | 93 |
| Synthesis Example 5-16 | PVA5-16 | 1,500 | 500 | 0.8 | 2.7 | MAmBTMS | 1.97 | 10 | 84 |
| Synthesis Example 5-17 | PVA5-17 | 1,500 | 500 | 0.8 | 2.7 | MAmOTMS | 2.34 | 10 | 100 |
| Synthesis Example 5-18 | PVA5-18 | 1,500 | 500 | 0.8 | 2.7 | MAmDDTMS | 2.82 | 10 | 119 |
| Synthesis Example 5-19 | PVA5-19 | 1,500 | 500 | 0.8 | 2.7 | MAmODTMS | 3.45 | 15 | 98 |
| Synthesis Example 5-20 | PVA5-20 | 1,500 | 500 | 0.8 | 2.7 | AMBTMS | 1.97 | 10 | 83 |
| Synthesis Example 5-21 | PVA5-21 | 1,500 | 500 | 0.8 | 2.7 | 4-PTMS | 14.49 | 1 | 65 |

| | Saponification conditions | | Results of analyses | | | |
|---|---|---|---|---|---|---|
| | PVAc concentration (%) | NaOH molar ratio | viscosity average degree of polymerization (P) | percentage content (S) (mol %) | P × S | degree of saponification (mol %) |
| Synthesis Example 5-1 | 30 | 0.04 | 1,700 | 0.5 | 850 | 98.6 |
| Synthesis Example 5-2 | 30 | 0.04 | 1,700 | 0.25 | 425 | 98.4 |
| Synthesis Example 5-3 | 15 | 0.04 | 4,000 | 1.5 | 6,000 | 98.4 |
| Synthesis Example 5-4 | 15 | 0.04 | 4,000 | 0.1 | 400 | 98.7 |
| Synthesis Example 5-5 | 20 | 0.04 | 3,000 | 1.0 | 3,000 | 98.8 |
| Synthesis Example 5-6 | 20 | 0.04 | 2,400 | 1.0 | 2,400 | 98.4 |
| Synthesis Example 5-7 | 20 | 0.04 | 2,000 | 2.9 | 5,800 | 98.8 |
| Synthesis Example 5-8 | 30 | 0.04 | 1,000 | 5.8 | 5,800 | 98.5 |
| Synthesis Example 5-9 | 30 | 0.04 | 1,000 | 2.0 | 2,000 | 98.6 |
| Synthesis Example 5-10 | 30 | 0.04 | 1,000 | 0.5 | 500 | 98.4 |
| Synthesis Example 5-11 | 35 | 0.04 | 500 | 6.0 | 3,000 | 98.8 |
| Synthesis Example 5-12 | 35 | 0.04 | 500 | 1.0 | 500 | 98.3 |
| Synthesis Example 5-13 | 30 | 0.01 | 1,700 | 0.5 | 850 | 93.5 |
| Synthesis Example 5-14 | 30 | 0.009 | 1,700 | 0.5 | 850 | 89.2 |
| Synthesis Example 5-15 | 30 | 0.04 | 1,700 | 0.5 | 850 | 98.5 |
| Synthesis Example 5-16 | 30 | 0.04 | 1,700 | 0.5 | 850 | 98.6 |
| Synthesis Example 5-17 | 30 | 0.04 | 1,700 | 0.5 | 850 | 98.4 |
| Synthesis Example 5-18 | 30 | 0.04 | 1,700 | 0.5 | 850 | 98.4 |
| Synthesis Example 5-19 | 30 | 0.04 | 1,700 | 0.5 | 850 | 98.5 |
| Synthesis Example 5-20 | 30 | 0.04 | 1,700 | 0.5 | 850 | 98.4 |
| Synthesis Example 5-21 | 30 | 0.04 | 1,700 | 0.5 | 950 | 98.7 |

*1Monomer A was directly charged without dilution with methanol.
MAmPTMS: 3-methacrylamidopropyltrimethoxysilane
MAmPTES: 3-methacrylamidopropyltriethoxysilane
MAmBTMS: 4-methacrylamidobutyltrimethoxysilane
MAmOTMS: 8-methacrylamidooctyltrimethoxysilane
MAmDDTMS: 12-methacrylamidododecyltrimethoxysilane
MAmODTMS: 18-methacrylamidooctadecyltrimethoxysilane
AMBTMS: 3-acrylamido-3-methylbutyltrimethoxysilane
4-PTMS: 4-pentenyltrimethoxysilane

TABLE 15

| | Type of PVA | Polymerization conditions | | | | | | | | Saponification conditions | | | Results of analyses | | | |
|---|---|---|---|---|---|---|---|---|---|---|---|---|---|---|---|---|
| | | vinyl acetate (g) | methanol (g) | amount of initially added initiator (g) | polymerization time (h) | monomer A | initially added amount (g)*1 | concentration of sequentially added liquid (methanol liquid) (%) | sequentially added amount (g) | PVAc concentration (%) | NaOH molar ratio | viscosity average degree of polymerization (P) | percentage content (S)*2 (mol %) | P × S | degree of saponification (mol %) |
| Comparative Synthesis Example 5-1 | PVA5-22 | 1,500 | 500 | 0.8 | 3.0 | VMS | 11.29 | 1 | 73 | 30 | 0.03 | 1,700 | 0.5 | 850 | 98.4 |
| Comparative Synthesis Example 5-2 | PVA5-23 | 1,500 | 500 | 0.8 | 3.0 | VMS | 5.63 | 0.5 | 73 | 30 | 0.03 | 1,700 | 0.25 | 425 | 98.3 |
| Comparative Synthesis Example 5-3 | PVA5-24 | 1,500 | 500 | 0.8 | 3.0 | VMS | 4.5 | 0.5 | 58 | 30 | 0.03 | 1,700 | 0.2 | 340 | 98.7 |
| Comparative Synthesis Example 5-4 | PVA5-25 | 1,500 | 643 | 0.4 | 2.6 | — | — | — | — | 30 | 0.02 | 1,700 | 0 | 0 | 98.5 |
| Comparative Synthesis Example 5-5 | PVA5-26 | 1,500 | 265 | 0.8 | 1.9 | VMS | 11.29 | 0.5 | 105 | 20 | 0.03 | 2,400 | 0.5 | 1,200 | 98.8 |
| Comparative Synthesis Example 5-6 | PVA5-27 | 1,500 | 265 | 0.8 | 1.9 | VMS | 2.25 | 0.1 | 105 | 20 | 0.03 | 2,400 | 0.1 | 240 | 98.1 |
| Comparative Synthesis Example 5-7 | PVA5-28 | 1,500 | 1,000 | 1.5 | 3.0 | VMS | 11.29 | 0.5 | 170 | 30 | 0.03 | 1,000 | 0.5 | 500 | 98.4 |
| Comparative Synthesis Example 5-8 | PVA5-29 | 1,500 | 2,250 | 3.0 | 3.6 | VMS | 22.7 | 2 | 105 | 35 | 0.03 | 500 | 1 | 500 | 98.2 |
| Comparative Synthesis Example 5-9 | PVA5-30 | 1,500 | 500 | 0.8 | 2.9 | MAmMTMS | 1.66 | 10 | 74 | 30 | 0.03 | 1,700 | 0.5 | 850 | 98.1 |
| Comparative Synthesis Example 5-10 | PVA5-31 | 1,500 | 500 | 0.8 | 2.8 | AMPTMS | 1.86 | 10 | 81 | 30 | 0.03 | 1,700 | 0.5 | 850 | 98.6 |
| Comparative synthesis Example 5-11 | PVA5-32 | 1,500 | 2,250 | 3.0 | 3.8 | MAmPTMS | 1.87 | 50 | 26 | 35 | 0.04 | 500 | 0.5 | 250 | 98.4 |
| Comparative Synthesis Example 5-12 | PVA5-33 | 1,500 | 167 | 0.8 | 1.9 | MAmPTMS | 0.37 | 1 | 130 | 20 | 0.04 | 3,000 | 0.1 | 300 | 98.7 |
| Comparative Synthesis Example 5-13 | PVA5-34 | 1,500 | 1,000 | 1.5 | 3.0 | MAmPTMS | 25.8 | 30 | 45 | 30 | 0.04 | 1,000 | 6.5 | 6,500 | 98.5 |
| Comparative Synthesis Example 5-14 | PVA5-35 | 1,500 | 265 | 0.8 | 2.1 | MAmPTMS | 11.5 | 40 | 105 | 20 | 0.04 | 2,400 | 3.0 | 7,200 | 98.4 |
| Comparative Synthesis Example 5-15 | PVA5-36 | 1,500 | 70 | 0.8 | 1.0 | MAmPTMS | 6.9 | 50 | 29 | 15 | 0.04 | 4,000 | 1.8 | 7,200 | 98.3 |

*1Monomer A was directly charged without dilution with methanol.
*2Including the percentage content of the monomer unit having a silyl group other than the monomer unit having a group represented by the formula (1).
VMS: vinyltrimethoxysilane
MAmMTMS: methacrylamidomethyltrimethoxysilane
AMPTMS: 2-acrylamido-2-methylpropyltrimethoxysilane
MAmPTMS: 3-methacrylamidopropyltrimethoxysilane

Example 5-1

Production of Base Paper for Release Paper

Base papers for a release paper were produced in accordance with the following method, and sealability (air permeance and toluene barrier property) and water resistance thereof were evaluated.

An aqueous solution of PVA5-1 having a concentration of 4% was applied by hand using a Mayer Bar on a semi-glassine paper having a grammage of 80 g/m² and an air permeance of 140 sec so that the amount of the application in terms of solid content equivalent was 0.5 g/m². Next, the aqueous solution was dried at 110° C. for 1 min using a hot-air dryer and humidity conditioning was carried out at 20° C. and 65% RH for 72 hours, and subjected once to a supercalendar treatment under the conditions involving 150° C., 250 kg/cm, and 10 m/min to obtain a base paper for a release paper. An air permeance (sealability) test, a toluene barrier property test and a water resistance test were carried out on the obtained base paper for a release paper in accordance with the method described below.

Air Permeance

Air permeance of the base paper for a release paper was measured in accordance with JIS-P8117 using an Oken type smoothness and air-permeability tester, and the air permeance (i.e., sealability) was evaluated in accordance with the following criteria:

A: 100,000 sec or higher;
B: 50,000 sec or higher and lower than 100,000 sec;
C: 30,000 sec or higher and lower than 50,000 sec;
D: 10,000 sec or higher and lower than 30,000 sec; and
E: lower than 10,000 sec.

Toluene Barrier Property

Colored toluene (red) was applied on an area of 5×5 cm on the surface of the coating layer of the base paper for a release paper, and thereafter the toluene barrier property (i.e., sealability) was evaluated as a degree of strike-through to the back face (uncoated face) indicated by small red spots or coloring of the uncoated face in accordance with the following criteria:

A: no spots found on the back face;
B: a few (at most 3) spots found;
C: a lot of spots found (less than 20% of the coated area colored);
D: 20% or more and less than 50% of the coated area colored; and
E: 50% or more of the coated area colored.

Water Resistance (Wet Abrasion Resistance Test)

One ml of ion exchanged water at 20° C. was dripped on the surface of the coating layer of the base paper for a release paper, thereafter the wet portion was rubbed with fingertips, and the number of feelings of sliminess on the finger was counted and the evaluation was made in accordance with the following criteria:

S: 120 times or more;
A: 100 times or more and less than 120 times;
B: 50 times or more and less than 100 times;
C: 30 times or more and less than 50 times;
D: 10 times or more and less than 30 times; and
E: less than 10 times.

Examples 5-2 to 5-21 and Comparative Examples 5-1 to 5-15

Base papers for a release paper were produced in a similar manner to Example 5-1 except that the PVA shown in Table 16 was used in place of PVA5-1 used in Example 5-1, and the air permeance, the toluene barrier property and the water resistance of the base paper for a release paper were evaluated. The results are shown together in Table 16.

TABLE 16

| | | Evaluations | | |
|---|---|---|---|---|
| | Type of PVA | air permeance | toluene barrier property | water resistance |
| Example 5-1 | PVA5-1 | A | A | A |
| Example 5-2 | PVA5-2 | A | A | B |
| Example 5-3 | PVA5-3 | A | A | C |
| Example 5-4 | PVA5-4 | B | A | C |
| Example 5-5 | PVA5-5 | A | A | B |
| Example 5-6 | PVA5-6 | A | A | A |
| Example 5-7 | PVA5-7 | A | A | C |
| Example 5-8 | PVA5-8 | B | A | C |
| Example 5-9 | PVA5-9 | A | A | A |
| Example 5-10 | PVA5-10 | A | A | A |
| Example 5-11 | PVA5-11 | B | B | C |
| Example 5-12 | PVA5-12 | C | B | B |
| Example 5-13 | PVA5-13 | B | A | A |
| Example 5-14 | PVA5-14 | B | B | B |
| Example 5-15 | PVA5-15 | A | A | A |
| Example 5-16 | PVA5-16 | A | A | A |
| Example 5-17 | PVA5-17 | A | A | S |
| Example 5-18 | PVA5-18 | B | B | S |
| Example 5-19 | PVA5-19 | B | B | S |
| Example 5-20 | PVA5-20 | A | A | B |
| Example 5-21 | PVA5-21 | A | A | B |
| Comparative Example 5-1 | PVA5-22 | —*1 | —*1 | —*1 |
| Comparative Example 5-2 | PVA5-23 | D | D | D |
| Comparative Example 5-3 | PVA5-24 | E | D | D |
| Comparative Example 5-4 | PVA5-25 | E | E | E |
| Comparative Example 5-5 | PVA5-26 | —*1 | —*1 | —*1 |
| Comparative Example 5-6 | PVA5-27 | E | E | D |
| Comparative Example 5-7 | PVA5-28 | D | C | C |
| Comparative Example 5-8 | PVA5-29 | D | C | C |
| Comparative Example 5-9 | PVA5-30 | B | D | C |
| Comparative Example 5-10 | PVA5-31 | B | D | C |
| Comparative Example 5-11 | PVA5-32 | D | D | D |
| Comparative Example 5-12 | PVA5-33 | C | C | D |
| Comparative Example 5-13 | PVA5-34 | D | C | A |
| Comparative Example 5-14 | PVA5-35 | —*1 | —*1 | —*1 |
| Comparative Example 5-15 | PVA5-36 | —*1 | —*1 | —*1 |

*1 PVA was not completely dissolved in the aqueous solution.

As shown in Table 16, it can be seen that the base papers for a release paper according to Examples 5-1 to 5-21 exhibited favorable air permeance, toluene barrier property and water resistance as a base paper for a release paper. Regarding the evaluation criteria, A to C or S and A to C for each evaluation item, and A to B or S and A to B for at least two items among the three items suggested an evaluation to be favorable. Furthermore, the base papers for a release paper in Examples 5-1, 5-2, 5-5, 5-6, 5-9, 5-10, 5-13, 5-15, 5-16, 5-17, 5-20 and 5-21 in which the viscosity average degree of polymerization (P), the degree of saponification and the structure of the monomer unit of the PVA, the percentage content (S) of the monomer unit, and the product (P×S) of the viscosity average degree of polymerization (P) and the percentage content (S) of the PVA were as specified exhibited particularly superior air permeance, toluene barrier property and water resistance, with the evaluation criteria of: A to B or S and A to B for one item; and A or A and S for two or more items. In addition, it can be seen that the base papers for a release paper in, for example, Examples 5-3, 5-4, 5-7, 5-8, 5-11, 5-12, 5-14, 5-18 and 5-19 resulted in slightly inferior air permeance, toluene barrier property or water resistance. It is believed that this is attributed to a low or high viscosity average degree of polymerization (P), a low or high percentage content (S), a low or high product (P×S) of the viscosity average degree of polymerization (P) and the percentage content (S), a low degree of saponification, and/or the difference of the structure of the monomer unit.

On the other hand, it can be seen that when the PVA did not satisfy the above specified requirements (Comparative Examples 5-1 to 5-15), deterioration of the air permeance, the toluene barrier property, and the water resistance of the base paper for a release paper occurs, or the solubility in water of the PVA itself was impaired. It is believed that this is attributed to the difference of the structure of the monomer unit, and/or a small or great product (P×S) of the viscosity average degree of polymerization (P) and the percentage content (S).

INDUSTRIAL APPLICABILITY

The PVA according to the embodiment of the present invention can be used in, for example, coating agents for paper, internal sizing agents, fiber coating agents, dyes, coating agents for glass fibers, surface coating agents for metals and glass, and coating materials such as anti-fogging agents; adhesives for woods, paper, aluminum foils, plastics and the like; binders for nonwoven fabrics, fibrous binders, binders for building materials such as gypsum boards and fiberboards; thickening agents for various types of emulsion adhesives; additives for urea resin adhesives; additives for cement and mortar; various types of adhesives such as hot melt adhesives and pressure-sensitive adhesives; dispersants for emulsion polymerization of various types of ethylenic unsaturated monomers such as ethylene, vinyl acetate and vinyl chloride; stabilizers for dispersing a pigment in paints, adhesives and the like; dispersion stabilizers for suspension polymerization of various types of ethylenic unsaturated monomers such as vinyl chloride, vinylidene chloride, styrene, (meth)acrylic acid and vinyl acetate; molded article such as fibers, films, sheets, pipes, tubes, water-soluble fibers and temporary coating films; agents for imparting hydrophilicity to hydrophobic resins; compounding agents for synthetic resins such as additives for composite fibers, films and other molded articles; soil conditioners, soil stabilizers, and the like. In addition, the PVA is contained. In addition, the coating agent according to the embodiment of the present invention that contains the PVA can be suitably used in, for example, the production of coated paper. In addition, the ink jet recording material according to the embodiment of the present invention that contains the PVA has superior coating film strength and water resistance, and reduced generation of printing unevenness, and therefore can be suitably used as ink jet recording materials. In addition, the thermal recording material according to the embodiment of the present invention that contains the PVA has superior water resistance and resistance to plasticizers, and therefore can be suitably used as thermal recording paper, and the like. Furthermore, the base paper for a release paper according to the embodiment of the present invention that contains the PVA has superior sealability and water resistance, and therefore can be suitably used in the production of release paper.

The invention claimed is:

1. A vinyl alcohol polymer, comprising a monomer unit represented by formula (1):

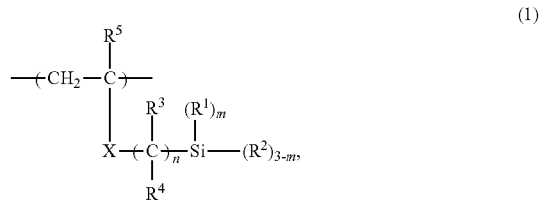

wherein:
X represents a direct bond, a divalent hydrocarbon group, or a divalent organic group having an oxygen atom or a nitrogen atom;
$R^1$ represents a hydrogen atom or an alkyl group having 1 to 5 carbon atoms;
$R^2$ represents an alkoxyl group, an acyloxyl group or a group represented by OM, wherein M represents a hydrogen atom, an alkali metal or an ammonium group;
$R^3$ and $R^4$ each independently represent a hydrogen atom or an alkyl group, wherein hydrogen atoms included in the alkyl group, the alkoxyl group and the acyloxyl group represented by $R^1$ to $R^4$ are unsubstituted or substituted with a substituent having an oxygen atom or a nitrogen atom;
$R^5$ represents a hydrogen atom or a methyl group;
m is an integer of 0 to 2; and
n is an integer of 6 to 20,
wherein in a case where $R^1$ to $R^5$ are each present in a plurality of number, a plurality of $R^1$s are each independently as defined above, a plurality of $R^2$s are each independently as defined above, a plurality of $R^3$s are each independently as defined above, a plurality of $R^4$s are each independently as defined above, and a plurality of $R^5$s are each independently as defined above,
and inequalities (I), (II), and (III) are satisfied:

$$370 \leq P \times S \leq 6{,}000 \tag{I}$$

$$200 \leq P \leq 4{,}000 \tag{II}$$

$$0.1 \leq S \leq 10 \tag{III};$$

wherein:
P represents a viscosity average degree of polymerization of the vinyl alcohol polymer; and
S represents a percentage content (mol %) of the monomer unit.

2. The vinyl alcohol polymer according to claim 1, wherein:
X in formula (1) is represented by —CO—$NR^6$—*;
$R^6$ represents a hydrogen atom or an alkyl group having 1 to 5 carbon atoms;
* denotes a binding site on a side where a Si atom is included in formula (1); and
n is an integer of 6 to 12.

3. An aqueous solution, comprising water and the vinyl alcohol polymer according to claim 1 in an amount of 4% by mass or more and 20% by mass or less, and having a pH of 4 or higher and 8 or lower.

4. A coating agent, comprising:
 at least one of water and a non-aqueous solvent, and
 the vinyl alcohol polymer according to claim 1.

5. An ink jet recording material, comprising the vinyl alcohol polymer according to claim 1.

6. A thermal recording material, comprising the vinyl alcohol polymer according to claim 1.

7. A base paper for a release paper, the base paper comprising the vinyl alcohol polymer according to claim 1.

8. The vinyl alcohol polymer according to claim 1, wherein X represents a direct bond.

9. The vinyl alcohol polymer according to claim 1, wherein X represents a divalent hydrocarbon group selected from the group consisting of a divalent aliphatic hydrocarbon group having 1 to 10 carbon atoms and a divalent aromatic hydrocarbon group having 6 to 10 carbon atoms.

10. The vinyl alcohol polymer according to claim 1, wherein X represents a divalent organic group having an oxygen atom or a nitrogen atom selected from the group consisting of an ether group, an ester group, a carbonyl group, an amide group, a group derived by linking an ether group, an ester group, a carbonyl group, or an amide group with a divalent hydrocarbon group, an imino group, an amide group, and a group derived by linking an imino group or an amide group with a divalent hydrocarbon group.

11. The vinyl alcohol polymer according to claim 1, wherein $400 \leq P \times S \leq 3{,}000$, $500 \leq P \leq 3{,}000$ and $0.25 \leq S \leq 6$.

12. The vinyl alcohol polymer according to claim 1, wherein $500 \leq P \times S \leq 2{,}000$, $1{,}000 \leq P \leq 2{,}400$ and $0.5 \leq S \leq 5$.

13. The vinyl alcohol polymer according to claim 11, wherein X represents a direct bond, a divalent hydrocarbon group selected from the group consisting of a divalent aliphatic hydrocarbon group having 1 to 10 carbon atoms and a divalent aromatic hydrocarbon group having 6 to 10 carbon atoms, or a divalent organic group having an oxygen atom or a nitrogen atom selected from the group consisting of an ether group, an ester group, a carbonyl group, an amide group, a group derived by linking an ether group, an ester group, a carbonyl group, or an amide group with a divalent hydrocarbon group, an imino group, an amide group, and a group derived by linking an imino group or an amide group with a divalent hydrocarbon group.

14. The vinyl alcohol polymer according to claim 12, wherein X represents a direct bond, a divalent hydrocarbon group selected from the group consisting of a divalent aliphatic hydrocarbon group having 1 to 10 carbon atoms and a divalent aromatic hydrocarbon group having 6 to 10 carbon atoms, or a divalent organic group having an oxygen atom or a nitrogen atom selected from the group consisting of an ether group, an ester group, a carbonyl group, an amide group, a group derived by linking an ether group, an ester group, a carbonyl group, or an amide group with a divalent hydrocarbon group, an imino group, an amide group, and a group derived by linking an imino group or an amide group with a divalent hydrocarbon group.

* * * * *